United States Patent [19]

Sakaguchi et al.

[11] Patent Number: 5,427,711
[45] Date of Patent: Jun. 27, 1995

[54] SYNTHESIZED INORGANIC ION EXCHANGE MATERIAL AND DETERGENT COMPOSITION CONTAINING THE SAME

[75] Inventors: Mikio Sakaguchi; Ichiro Sakamoto, both of Wakayama; Mutsumi Kuroda, Utsunomiya; Masaki Tsumadori, Wakayama; Motomitsu Hasumi, Wakayama; Yuichi Sakamoto, Wakayama; Ryuichi Akagi, Wakayami; Fumio Sai, Utsunomiya, all of Japan

[73] Assignee: Kao Corporation, Tokyo, Japan

[21] Appl. No.: 246,711

[22] Filed: May 20, 1994

Related U.S. Application Data

[63] Continuation-in-part of Ser. No. 997,928, Dec. 29, 1992, abandoned.

[30] Foreign Application Priority Data

| Dec. 29, 1991 | [JP] | Japan | 3-359269 |
| Dec. 29, 1991 | [JP] | Japan | 3-359271 |
| Dec. 29, 1991 | [JP] | Japan | 3-359272 |
| Oct. 8, 1992 | [JP] | Japan | 4-297845 |
| Oct. 8, 1992 | [JP] | Japan | 4-297846 |
| Oct. 8, 1992 | [JP] | Japan | 4-297847 |
| Oct. 8, 1992 | [JP] | Japan | 4-297848 |
| Oct. 8, 1992 | [JP] | Japan | 4-297849 |
| Oct. 8, 1992 | [JP] | Japan | 4-297850 |
| Oct. 8, 1992 | [JP] | Japan | 4-297851 |
| Nov. 12, 1992 | [JP] | Japan | 4-328417 |
| Jun. 26, 1993 | [JP] | Japan | 5-179839 |

[51] Int. Cl.⁶ .................... C11D 3/12; C11D 7/02; C01B 33/24; C01B 33/32
[52] U.S. Cl. .................... 252/174.25; 252/95; 252/100; 252/174.12; 252/174.24; 423/331; 423/593
[58] Field of Search .......... 252/174.25, 95, 100, 252/174.12, 174.24, 174.21; 423/331, 593

[56] References Cited

U.S. PATENT DOCUMENTS

| 4,105,574 | 8/1978 | Culmone et al. | 252/154 |
| 4,264,466 | 4/1981 | Carleton et al. | 252/99 |
| 4,277,457 | 7/1981 | Taga et al. | 423/331 |
| 4,321,157 | 3/1982 | Harris et al. | 252/174.25 |
| 4,595,520 | 6/1986 | Heile et al. | 252/160 |

(List continued on next page.)

FOREIGN PATENT DOCUMENTS 488868  6/1992  European Pat. Off. .
0550048 7/1993  European Pat. Off. .

(List continued on next page.)

OTHER PUBLICATIONS

Johan et al., Bull. Soc. fr. Mineral. Cristallogr., 95, pp. 371–382 (1972) No month available.

(List continued on next page.)

*Primary Examiner*—Paul Lieberman
*Assistant Examiner*—Lorna M. Douyon
*Attorney, Agent, or Firm*—Birch, Stewart, Kolasch & Birch

[57] ABSTRACT

The synthesized crystalline ion exchange material or a hydrate thereof has a chain structure and a composition represented by the following general formula (A) in an anhydride form:

$$xM_2O \cdot ySiO_2 \cdot zM'O, \quad (A)$$

wherein M represents Na and/or K; M' represents Ca and/or Mg; y/x is 0.5 to 2.0; and z/x is 0.005 to 1.0. The chain structure exhibits at least one main scattering peak at $970\pm20$ cm$^{-1}$ in Raman spectra. The detergent composition contains the above synthesized inorganic crystalline ion exchange material. The inorganic ion exchange material of the present invention is excellent in both cationic exchange capacity and anti-solubility, making it useful to be used for a water softener and alkalinity regulator in detergents. The detergent composition of the present invention contains an inorganic ion exchange material which has anti-solubility as well as excellent ion exchange capacity and alkaline capacity, thereby offering excellent washing effects and is suitable for the concentration of detergent.

28 Claims, 6 Drawing Sheets

U.S. PATENT DOCUMENTS

| | | | |
|---|---|---|---|
| 4,664,839 | 5/1987 | Rieck | 252/175 |
| 4,820,439 | 4/1989 | Rieck | 252/135 |
| 5,004,716 | 4/1991 | Ogawa et al. | 501/141 |
| 5,108,646 | 4/1992 | Beerse et al. | 252/174.25 |

FOREIGN PATENT DOCUMENTS

| | | |
|---|---|---|
| 2434117 | 7/1979 | France . |
| 227616 | 9/1985 | Germany . |
| 279234 | 5/1990 | Germany . |
| 50-12381 | 2/1975 | Japan . |
| 51-12805 | 1/1976 | Japan . |
| 60-239320 | 11/1985 | Japan . |
| 61-59245 | 12/1986 | Japan . |
| 2055214 | 2/1990 | Japan . |
| 2271910 | 11/1990 | Japan . |
| 393649 | 4/1991 | Japan . |
| 5279013 | 10/1993 | Japan . |
| 2226553 | 12/1988 | United Kingdom . |
| 247265 | 3/1967 | U.S.S.R. . |

OTHER PUBLICATIONS

Beneke et al., American Mineralogist, 62, pp. 673–771 (1977) No month available.

SYNTHESIZED INORGANIC ION EXCHANGE MATERIAL AND DETERGENT COMPOSITION CONTAINING THE SAME

This application is a continuation-in-part of application Ser. No. 07/997,928, filed Dec. 29, 1992, now abandoned, the entire contents of which are incorporated herein by reference.

BACKGROUND OF THE INVENTION

1. Field of the Invention

The present invention relates to a synthesized inorganic ion exchange material and a detergent composition containing the same, and more specifically to a synthesized inorganic ion exchange material excellent in ion exchange capacity and alkaline capacity, and having anti-solubility in water, and a detergent composition containing such a synthesized inorganic ion exchange material.

2. Discussion of the Related Art

To date, a large number of chelating agents, ion exchange materials, precipitants, dispersants and other substances have been reported to be used for detergent builders. In recent years, the use of tripolyphosphates has decreased, since they can cause eutrophication in closed freshwater areas such as lakes and marshes. Instead, crystalline aluminosilicates, typically those disclosed in Japanese Patent Laid-Open Nos. 50-12381 and 51-12805, have been commonly used.

Although sodium silicate has an ion exchange capacity not less than that of zeolite, its use has been limited since it is soluble in water. As a means for solving this problem, a method in which sodium silicate is thermally dehydrated, baked and powdered is disclosed in Japanese Patent Laid-Open No. 60-239320, and a method in which part of the silicon of sodium silicate is isomorphously replaced with aluminum in a similar manner is disclosed in Japanese Patent Laid-Open No. 3-93649. However, both methods have problems in that the obtained anti-solubility is insufficient and the ion exchange capacity is low. Also, crystalline calcium silicate alkali hydrates obtained by hydrothermal synthesis are disclosed in Japanese Patent Examined Publication No. 61-59245, but they are substantially unsuitable as detergent builders because of their low ion exchange capacity, though they have sufficient anti-solubility in water. Moreover, because their grain shape is in the form of coarse long fiber or mica, their aqueous dispersibility is low so that the actual ion exchange capacity shows further reduction. Also, DD-279234A1 publication discloses a crystalline magnesium-containing silicate obtained by hydrothermal synthesis, but there is a problem in that this silicate is extremely low in ion exchange capacity, making it impossible to be practically used as a detergent builder.

Crystalline silicates can be structurally classified by their anion form (Friedrich Liebau, "Structural Chemistry of Silicates," p. 72, Springer-Verlag published in 1985). For example, the 4A type zeolite, which is a representative inorganic builder having the structural formula $Na_2O.Al_2O_3.2SiO_2$, is classified as a tectosilicate structure, wherein Si is partially isomorphously replaced with Al. Dimetasilicate (layered silicate), having the structural formula $Na_2O.2SiO_2$, is classified as a phyllosilicate structure. Also, the metasilicate having the structural formula $CaO.MgO.2SiO_2.nH_2O$ (diopside) and the metasilicate such as sodium metasilicate having the structural formula $Na_2O.SiO_2$ are classified as an inosilicate (polysilicate) structure.

In more detail, crystalline silicates can be classified by the number of Si-crosslinking oxygen atoms (Si—O—Si). Si-crosslinking oxygen numbers of 4, 3, 2, 1 and 0 are assigned to the $Q_4$, $Q_3$, $Q_2$, $Q_1$ and $Q_0$ units, respectively (Y. Tsunawaki, N. Iwamoto, T. Hattori and A. Mitsuishi, "J. Non-Cryst. Solids," vol. 44, p. 369, 1981). With an Si-crosslinking oxygen number of 4, the tectosilicate structure is formed from the $Q_4$ unit alone. With an Si-crosslinking oxygen number of 3, the phyllosilicate structure is formed from the $Q_3$ unit alone. With an Si-crosslinking oxygen number of 2.0 to 2.5, the inosilicate structure is formed from the $Q_2$ unit alone or from the $Q_2$ and $Q_3$ units. Specifically, the silicates formed from at least the $Q_2$ unit such as those defined by the $Q_2$ unit alone and those defined by both $Q_2$ unit and $Q_3$ unit are said to have a chain structure. By contrast, the silicates consisting of the $Q_3$ unit alone are said to have a layered structure. Therefore, these silicates are clearly distinguishable from each other in view of their structures.

As viewed as inorganic builders for detergents, the above-mentioned silicate compounds can be described as follows: Having the tectosilicate structure formed from the $Q_4$ unit alone, the 4A type zeolite is so low in aqueous dispersibility that its amount in a detergent is limited, though it possesses a high cationic exchange capacity. Layered silicates having the phyllosilicate structure formed from the $Q_3$ unit alone, methods for whose preparation are disclosed in Japanese Patent Laid-Open Nos. 60-239320 and 3-93649 as described above, are excellent in aqueous dispersibility because of their hydration property, but they are undesirably highly soluble in water and their cationic exchange capacity is lower than that of the 4A type zeolite. Therefore, these types of silicates do not serve well as builders for detergents.

On the other hand, with the inosilicate structure formed from the $Q_2$ unit alone or from the $Q_2$ and $Q_3$ units, diopside exhibits almost no cationic exchange capacity so that it does not serve well as an inorganic builder. Also, there is another type of inosilicate ($Na_2O.SiO_2$), which has a theoretically high cationic exchange capacity, in the form of a crystalline metasilicate, but its water solubility is extremely high so that its structure is destroyed, which results in an extreme decrease in actual cationic exchange capacity. It is, therefore, unsuitable as an inorganic builder.

As described above, it has been difficult to obtain an inorganic ion exchange material which is excellent in both anti-solubility in water and ion exchange capacity, and the development of such an inorganic ion exchange material having improvements in these properties has been in demand.

SUMMARY OF THE INVENTION

Accordingly, it is an object of the present invention to provide a synthesized inorganic crystalline ion exchange material and a hydrate thereof which are excellent in ion exchange capacity and alkaline capacity and has anti-solubility in water.

Another object of the present invention is to provide a detergent composition containing the above-mentioned synthesized inorganic crystalline ion exchange material.

The present invention is concerned with the following:

(1) A synthesized inorganic crystalline ion exchange material having a chain structure and comprising a composition having the following general formula (A) in an anhydride form:

$$xM_2O \cdot ySiO_2 \cdot zM'O, \quad (A)$$

wherein M represents Na and/or K; M' represents Ca and/or Mg; y/x is 0.5 to 2.0; and z/x is 0.005 to 1.0, said chain structure exhibiting at least one main scattering peak at $970\pm20$ cm$^{-1}$ in Raman spectra, or a hydrate thereof.

A particular embodiment of the inorganic ion exchange material having the general formula (A) is:

(2) A synthesized inorganic crystalline ion exchange material comprising a composition having the following general formula (A') in an anhydride form:

$$xM_2O \cdot ySiO_2 \cdot zM'O, \quad (A')$$

wherein M represents Na and/or K; M' represents Ca and/or Mg; y/x is 1.4 to 1.9; z/x is 0.005 to 1.0; K/Na in $M_2O$ is 0 to 8.0; and Mg/Ca in M'O is 0 to 10, wherein the synthesized inorganic crystalline inorganic ion exchange material exhibits an X-ray diffraction pattern such that the intensity ratio of a peak corresponding to $d=2.84\pm0.05$ Å to a peak corresponding to $d=4.00\pm0.05$ Å is 10/100 to 100/10, d being calculated from the equation

$$2d \cdot \sin\theta = n\gamma,$$

wherein n is equal to 1, and $\gamma$ is 1.54 Å, the characteristic X-ray wavelength of CuK$\alpha$, or a hydrate thereof.

The present invention is also concerned with:

(3) A detergent composition containing the synthesized inorganic crystalline ion exchange material as described in (1) or (2) above.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

The synthesized inorganic ion exchange materials of the present invention are described in detail by means of the following embodiments.

(1) FORMULA (A):

The synthesized inorganic ion exchange material of the present invention comprises a composition having the general formula (A) in an anhydride form:

$$xM_2O \cdot ySiO_2 \cdot zM'O,$$

and according to the classification by anion form, they are classified as an inosilicate structure and relate to crystalline silicate compounds formed from the $Q_2$ unit alone or from the $Q_2$ and $Q_3$ units. Said another way, the crystalline silicate has a chain structure wherein the ion exchange material contains at least a $Q_2$ unit (see FIG. 1(a)).

Figure 1:
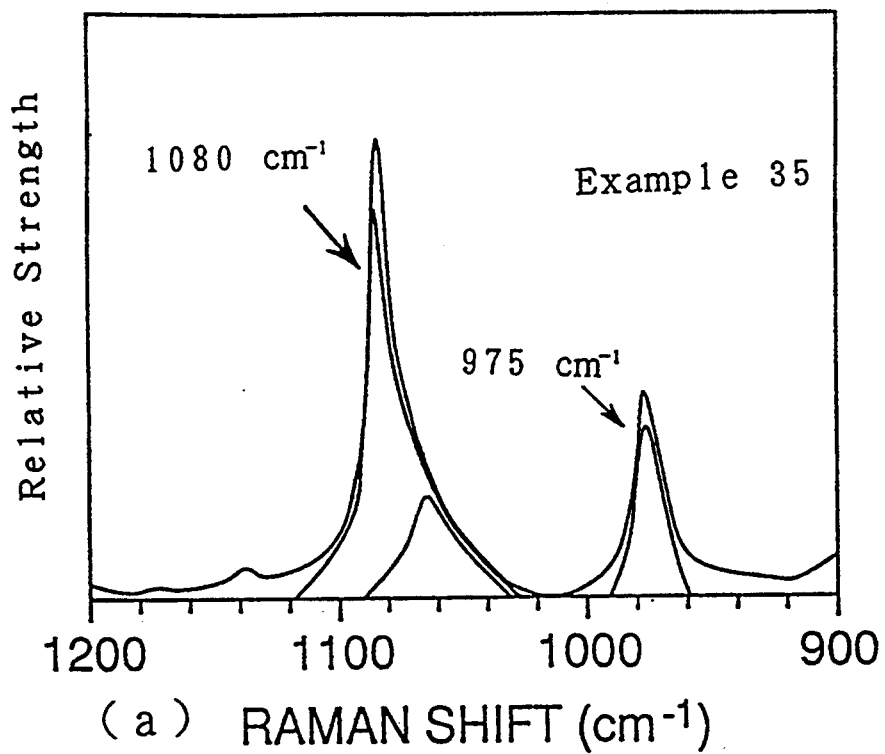
FIGS. 1(a) and 1(b) are Raman spectra obtained by Raman spectrometry measurement, wherein 1(a) is a Raman spectrum of a synthesized inorganic ion exchange material obtained in Example 35; and 1(b) is that of sodium disilicate ($Na_2Si_2O_5$) obtained in Comparative Example 1.
Figure 1:
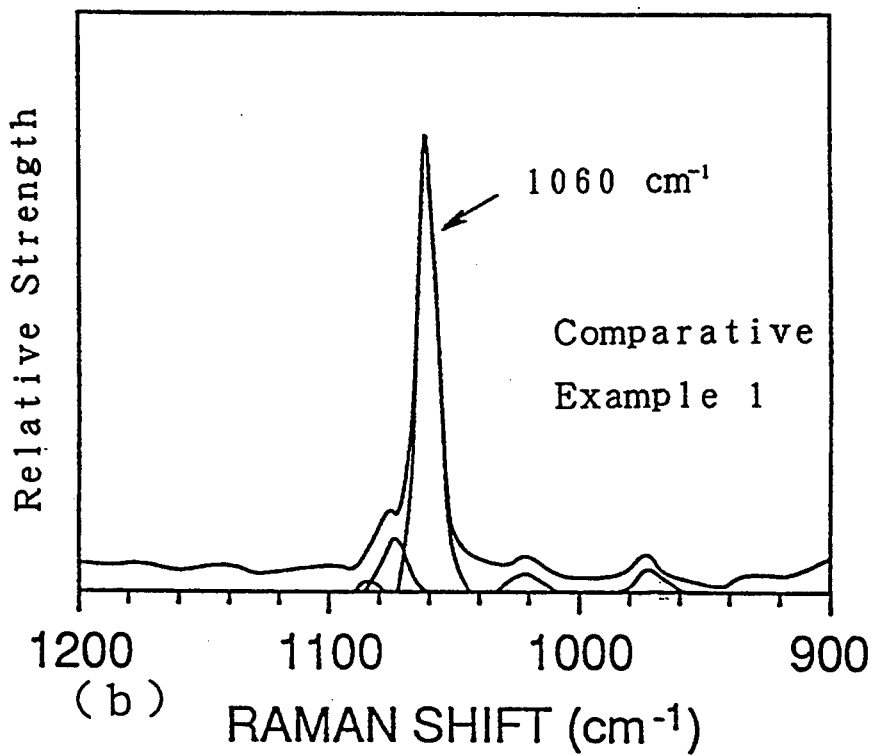

Specifically, the presence of the $Q_3$ and $Q_2$ units can be confirmed by Raman spectrometry. FIG. 1 shows an example of Raman spectrum taken using an FT-Raman spectrophotometer (JRS-FT6500 model, manufactured by JEOL Ltd.; excitation light source, YAG laser; wavelength, 1064 nm; detector, InGaAs type). A synthesized inorganic ion exchange material of the present invention (Example 35), which is a crystalline inosilicate compound exhibiting in FIG. 1(a) a scattering peak pattern clearly different from that of a layered silicate (Comparative Example 1) having the phyllosilicate structure shown in FIG. 1(b), exhibiting the characteristic main scattering peak for the ion exchange material of the present invention at least at $970\pm20$ cm$^{-1}$, which is assigned to the $Q_2$ unit. Here, "the main scattering peak pattern" refers to a peak substantially, clearly defined in Raman scattering spectrometry in the range of 900 to 1200 cm$^{-1}$. On the other hand, the peak assigned to the $Q_3$ unit is observed at $1070\pm30$ cm$^{-1}$. Since the silicate compounds used for the ion exchange materials of the present invention comprises $Q_2$ unit alone or $Q_1$ and $Q_2$ units, in Raman scattering spectra in the range of 900 to 1200 cm$^{-1}$, they exhibit the characteristic main scattering peak alone at $970\pm20$ cm$^{-1}$, or two peaks at $970\pm20$ cm$^{-1}$ and $1070\pm30$ cm$^{-1}$. Also, since the silicate compounds are crystalline, peaks assigned to $Q_0$ and $Q_1$ units do not substantially exist. When a silicate compound contains $Q_0$ and $Q_1$ units, the cationic exchange capacity is very low. When a silicate compound consists of a $Q_2$ unit and a $Q_3$ unit, as shown in Raman scattering spectra obtained by Raman spectrometry measurements described in Examples 1 to 38, the ratio of the scattering peak assigned to the $Q_2$ unit to the scattering peak assigned to the $Q_3$ unit is 0.1 to 100. Here, the peak ratio is calculated as the ratio of the peak height at $970\pm20$ cm$^{-1}$ to the peak height at $1070\pm30$ cm$^{-1}$.

Also from the measurements of cationic exchange capacity and the amount of Si dissolved, it is evident that the structural stability in water of the synthesized inorganic ion exchange material of the present invention is high, despite the $Q_2$ unit structure, owing to the fact that suitable amounts of Ca and/or Mg ions are contained in the silica network.

The synthesized inorganic ion exchange material of the present invention having the structure described above comprises a composition having the general formula (A) in an anhydride form:

$xM_2O \cdot ySiO_2 \cdot zM'O$.

Here, M represents Na and/or K, and although any one is acceptable with no limitations, a preference is given to the case of using both Na and K, from the viewpoint of the cationic exchange capacity. In this case, the preferred molar ratio of K/Na is 0.01 to 10.0.

M' represents Ca and/or Mg, although any one is acceptable with no limitations. In the case of both Ca and Mg, the preferred molar ratio of Mg/Ca is 0.01 to 10.0.

With respect to the general formula (A), y/x is 0.5 to 2.0, preferably 1.0 to 1.8. When y/x is less than 0.5, the obtained composition has insufficient anti-solubility in water, and when y/x exceeds 2.0, the obtained composition has a low ion exchange capacity, making it insufficient to be used as an inorganic ion exchange material. With respect to z/x, it is 0.005 to 1.0, preferably 0.01 to 0.9, and more preferably 0.01 to 0.58. When z/x is less than 0.005, the obtained composition has insufficient anti-solubility, and when z/x exceeds 1.0, the obtained composition has a low ion exchange capacity, making it insufficient to be used as an inorganic ion exchange material. With respect to x, y and z, there are no limitations, provided that y/x and z/x have the above relationships. When $xM_2O$, for example, is $x'Na_2O \cdot x''K_2O$ as described above, x equals to $x'+x''$. Likewise, when $zM'O$, for example, is $z'CaO \cdot z''MgO$, z equals to $z'+z''$.

The inorganic ion exchange material having the general formula (A) of the present invention may be a hydrate, wherein the amount of hydration is normally 0 to 20 moles of $H_2O$ in the above general formula.

(2) FORMULA (A'):

In a particular embodiment of the synthesized inorganic ion exchange material having the general formula (A), the synthesized inorganic ion exchange material comprises a composition having the following general formula (A') in an anhydride form:

$xM_2O \cdot ySiO_2 \cdot zM'O$.  (A')

Here, M represents Na and/or K, and M' represents Ca and/or Mg. y/x is 1.4 to 1.9, preferably 1.5 to 1.85, and more preferably 1.6 to 1.8. When y/x is between 1.4 and 1.9, the resulting inorganic ion exchange material has improved cationic exchange speed and has good ion exchange capacity.

z/x is 0.005 to 1.0, preferably 0.005 to 0.9, and more preferably 0.01 to 0.6. When z/x is less than 0.005, the resulting inorganic ion exchange material has insufficient anti-solubility in water, and when z/x exceeds 1.0, the resulting inorganic ion exchange material has low ion exchange capacity, thereby making it insufficient to be used as an ion exchange material. With respect to x, y and z, there are no limitations, provided that y/x and z/x have the above relationships.

With respect to increased cationic exchange speed, it has been found that K/Na is normally 0 to 8.0, preferably 0.005 to 8.0, and more preferably 0.01 to 6.0, and with respect to increased cationic exchange capacity, it has been found that Mg/Ca is normally 0 to 10, preferably 0.01 to 10, and more preferably 0.2 to 5.0.

Figure 2:
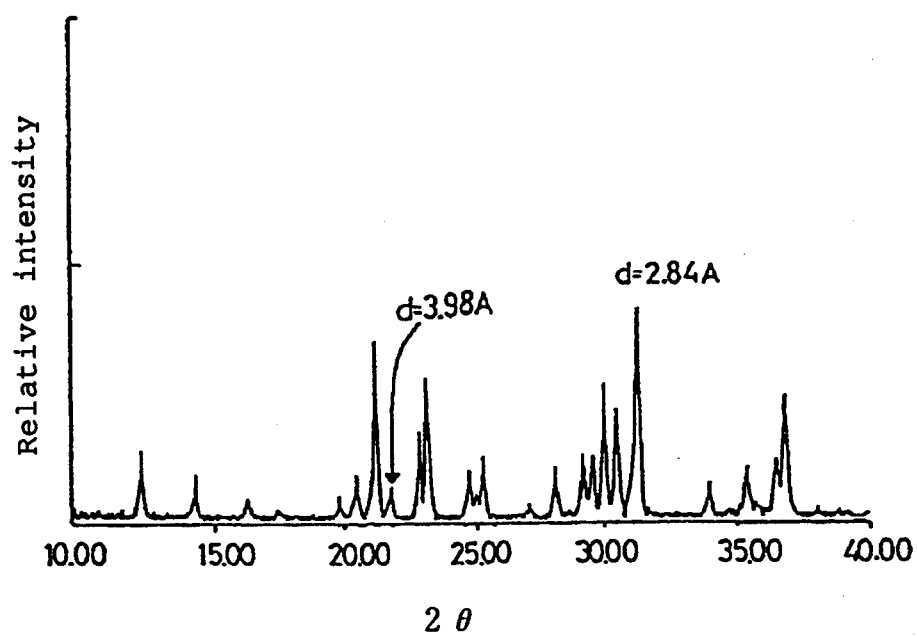
FIG. 2 is an X-ray diffraction pattern obtained by X-ray diffraction analysis of the inorganic ion exchange material obtained in Example 107.

The synthesized inorganic ion exchange material according to the particular embodiment of the present invention comprising a composition having the general formula (A') is a crystalline inorganic builder, which is characterized by the intensity ratio of a peak corresponding to d=2.84±0.05 Å to a peak corresponding to d=4.00±0.05 Å. Specifically, an X-ray diffraction pattern obtained by X-ray diffraction analysis of the inorganic ion exchange material in the particular embodiment of the present invention having the general formula (A') is shown in FIG. 2. As shown in FIG. 2, the inorganic ion exchange material exhibits an X-ray diffraction pattern such that the intensity ratio of a peak corresponding to d=2.84±0.05 Å to a peak corresponding to d=4.00±0.05 Å, namely, $I_{d=2.84}/I_{d=4.00}$, is 10/100 to 100/10. Here, d is calculated from the equation $2d \cdot \sin\theta = n\gamma$, wherein n is equal to 1, and $\gamma$ is 1.54 Å, i.e. the characteristic X-ray wavelength of $CuK\alpha$.

The synthesized inorganic crystalline ion exchange material comprising a composition having the general formula (A') above shows its main shift peaks (i.e., scattering peaks) at 968±6 cm$^{-1}$ and 1058±6 cm$^{-1}$ (see FIG. 4, for instance), or at 968±6 cm$^{-1}$, 1058±6 cm$^{-1}$ and 1078±6 cm$^{-1}$ (see FIG. 5, for instance) in Raman scattering spectrum range of from 900 to 1200 cm$^{-1}$. Here, 968±6 cm$^{-1}$ is assigned to the $Q_2$ unit, and 1058±6 cm$^{-1}$ and 1078±6 cm$^{-1}$ are assigned to the $Q_3$ unit.

Figure 4:
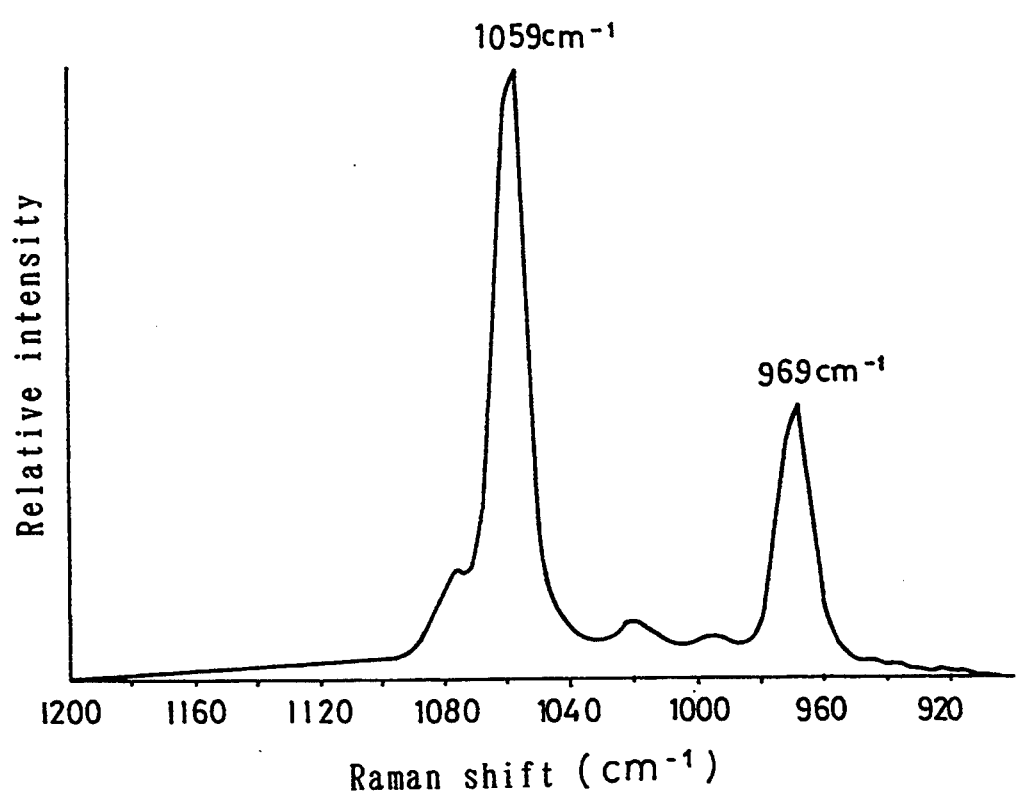
FIG. 4 is a Raman spectrum obtained by Raman spectrometry measurement of the inorganic ion exchange material obtained in Example 105.
Figure 5:
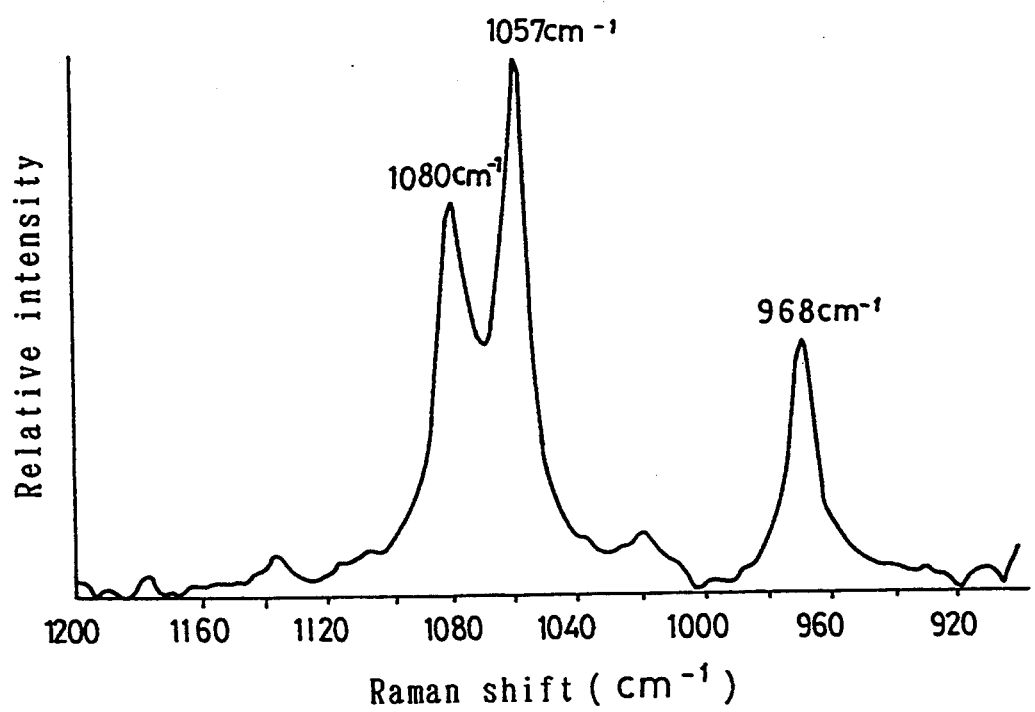
FIG. 5 is a Raman spectrum obtained by Raman spectrometry measurement of the inorganic ion exchange material obtained in Example 106.

The presence of these Raman shift peaks can be confirmed by Raman spectrometry. FIGS. 4 and 5 show examples of Raman spectra taken using an FT-Raman spectrophotometer (JRS-FT6500 model, manufactured by JEOL Ltd.; excitation light source: YAG laser; wavelength: 1064 nm; detector: InGaAs type) for the synthesized inorganic ion exchange material of the present invention having the general formula (A').

The synthesized inorganic ion exchange material of the present invention having the general formula (A') has an intensity ratio of the shift peak at 968±6 cm$^{-1}$ to the shift peak at 1058±6 cm$^{-1}$ of 0.05 to 100, or it has two intensity ratios, wherein one intensity ratio of the shift peak at 968±6 cm$^{-1}$ to the shift peak at 1058±6 cm$^{-1}$ is 0.05 to 100, and the other intensity ratio of the shift peak at 1078±6 cm$^{-1}$ to the shift peak at 1058±6 cm$^{-1}$ is 0.05 to 200.

The inorganic ion exchange material having the general formula (A') of the present invention may be a hydrate, wherein the amount of hydration is normally 0 to 20 moles of $H_2O$ in the above general formula.

Next, the method for producing the synthesized inorganic ion exchange material of the present invention will be explained below.

The synthesized inorganic ion exchange material of the present invention is obtained by chemical synthesis, which comprises three components, $M_2O$, $SiO_2$ and M'O as indicated by the general formulas (A) and (A'), above. Materials which can be converted as each of these components, therefore, is indispensable as starting materials for producing the inorganic ion exchange material of the present invention. In the present invention, known compounds can be appropriately used as starting materials without limitations. Examples of the $M_2O$ component and the M'O component include simple or complex oxides, hydroxides and salts of respective elements; and minerals containing respective elements. Specifically, examples of the starting materials for the $M_2O$ component include NaOH, KOH, $Na_2CO_3$, $K_2CO_3$ and $Na_2SO_4$. Examples of the starting materials for the M'O component include $CaCO_3$, $Ca(OH)_2$, $CaCl_2$, $Ca(NO_3)_2$, $MgCO_3$, $Mg(OH)_2$, MgO, $MgCl_2$, $Mg(NO_3)_2$, and dolomite. Examples of the starting materials for the $SiO_2$ component include silica, silica sand, cristobalite, kaolin, talc, fused silica and sodium silicate.

In the present invention, a method of producing the synthesized inorganic ion exchange material may be exemplified by mixing these starting material components to provide the desired compositions for the synthesized inorganic ion exchange material, and baking the resulting mixture at a temperature in the range of normally from 300° to 1300° C., preferably from 500° to 1000° C., more preferably from 600° to 900° C., to crystallize it. Alternative methods may also be exemplified by mixing in the same manner as above, melting the mixture at a temperature of 1100° to 1600° C. to yield a glassified product, followed by baking, or melting to produce a water glass and baking it. In this case, when the heating temperature is less than 300° C., the crystallization is insufficient, thereby making the anti-solubility of the resulting inorganic ion exchange material poor, and when it exceeds 1300° C., coarse grains and noncrystalline phases are likely to be formed, thereby decreasing the ion exchange capacity of the resulting inorganic ion exchange material. The heating time is normally 0.1 to 24 hours. Such baking can normally be carried out in a heating furnace such as an electric furnace or a gas furnace. The baked product may be milled as necessary to a given granularity. This milling is achieved using a ball mill, a roller mill or another mechanical mill.

The synthesized inorganic ion exchange material of the present invention having the structural characteristics as described above can be obtained by the above-mentioned processes.

The hydrate of the inorganic ion exchange material of the present invention can easily be prepared by any known method without limitations. For example, a hydride of an inorganic ion exchange material can be obtained by suspending the anhydride of the above inorganic ion exchange material in ion exchanged water to form a hydrate, and dried to yield a powder.

The properties of the synthesized inorganic ion exchange material of the present invention will now be described hereinbelow.

The inorganic ion exchange material having the general formula (A) of the present invention or the hydrate thereof thus obtained has an ion exchange capacity of not less than 100 mg $CaCO_3$/g, preferably 200 to 600 mg $CaCO_3$/g. The term "ion exchange capacity" used herein is a value obtained by the measurement method described below in the Examples, with exception that when the ion exchange capacity is not less than 500 mg $CaCO_3$/g, the amount of the calcium chloride solution is changed from 100 ml to 200 ml.

In the present invention, the term "anti-solubility" or "anti-solubility in water" refers to the stability of the inorganic ion exchange material in water. Accordingly, when the anti-solubility is insufficient, the stability in water is poor, leading to an increase in the amount of Si dissolved in water. By contrast, the term "anti-solubility in water is excellent" means that the stability in water of the inorganic ion exchange material is good, leading to a remarkable lowering in the amount of Si dissolved in water.

In the synthesized inorganic ion exchange material having the general formula (A) of the present invention, the amount of Si dissolved in water is normally not more than 120 mg/g, when calculated as $SiO_2$, preferably not more than 90 mg/g, more preferably not more than 60 mg/g, which can be said to be substantially insoluble in water. Here, the term "substantially insoluble in water" means stability in water of the chemical structure concerned with the cationic exchange capacity, so that the amount of Si dissolved, when calculated as $SiO_2$, is normally not more than 100 mg/g when a 2 g sample is added to 100 g of ion exchanged water and the mixture is stirred at 25° C. for 30 minutes.

Furthermore, the synthesized inorganic ion exchange material having the general formula (A) of the present invention is excellent in the alkaline capacity. Here, "alkaline capacity" refers to the capacity of buffering action to acids. In the synthesized inorganic ion exchange material having the general formula (A) of the present invention, even when 15 ml of 0.25N hydrochloric acid is added to a 1000 ml of aqueous dispersion having a concentration of 0.1% by weight ion exchange material, the solution has a pH of 9 to 11. Moreover, the inorganic ion exchange material having the general formula (A) is also excellent in alkaline buffering effect, having a superior alkaline buffering effect to those of sodium carbonate or ordinary amorphous sodium silicate.

The synthesized inorganic ion exchange material having the general formula (A') of the present invention or the hydrate thereof have an ion exchange capacity of not less than 200 mg $CaCO_3$/g, preferably 250 to 600 mg $CaCO_3$/g.

In the synthesized inorganic ion exchange material having the general formula (A') of the present invention, the amount of Si dissolved in water is normally not more than 120 mg/g, when calculated as $SiO_2$. Also, the synthesized inorganic ion exchange material having the general formula (A') of the present invention is excellent in alkaline capacity, as indicated by the fact that even when 15 ml of 0.25N hydrochloric acid is added to a 1000 ml of aqueous dispersion having a concentration of 0.1% by weight ion exchange material, the solution has a pH of 9 to 12. Further, the synthesized inorganic ion exchange material having the general formula (A') has an excellent alkaline buffering effect, superior alkaline buffering effect to the alkaline buffering effect of sodium carbonate or ordinary amorphous sodium silicate.

Also, the synthetic inorganic ion exchange materials having the general formula (A') include those having excellent cationic exchange speed.

Since the inorganic ion exchange materials of the present invention possess excellent ion capturing capacity and stability in water, the detergent compositions of the present invention containing such inorganic ion exchange materials possess excellent washing performance.

Next, the detergent compositions of the present invention will be described in detail below.

The detergent composition of the present invention contains at least the above-mentioned inorganic ion exchange material and/or the hydrate thereof, and a surfactant.

In the case of the synthesized inorganic ion exchange material having the general formula (A) of the present invention, the amount of the above-mentioned inorganic ion exchange material and/or the hydrate thereof is normally 0.5 to 70% by weight, preferably 2 to 60% by weight based on the whole composition. When the amount is lower than 0.5% by weight, sufficient effects of the inorganic ion exchange material cannot be achieved in the composition. When it exceeds 70% by weight, the amounts of the other components contained in the detergent are restricted, thereby making the balance of the components poor as a detergent.

In the case of the synthesized inorganic ion exchange material having the general formula (A') of the present invention, the amount of the above-mentioned inorganic ion exchange material and/or the hydrate thereof is normally 0.1 to 90% by weight, preferably 0.5 to 80% by weight, more preferably 1 to 75% by weight based on the whole composition. When the amount is lower than 0.1% by weight, sufficient washing performance cannot be achieved. When it exceeds 90% by weight, the dispersability of the inorganic ion exchange material becomes poor.

Particularly in the case where the inorganic ion exchange material having the general formula (A') is used for a clothes detergent, the amount of the synthesized inorganic ion exchange material is normally 0.1 to 70% by weight, preferably 1 to 60% by weight, more preferably 2 to 55% by weight. When the amount is less than 0.1% by weight, sufficient effects of the inorganic ion exchange material cannot be achieved in the composition. When it exceeds 70% by weight, the amounts of the other components contained in the detergent are restricted, thereby making the balance of the components poor as a detergent.

The surfactant used in the present invention is not limitative to particular ones as long as they are those generally used for detergents. Specifically, they may be one or more surfactants selected from the group consisting of anionic surfactants, nonionic surfactants, cationic surfactants and ampholytic surfactants as exemplified below. For instance, the surfactants can be chosen such that the surfactants of the same kind are chosen, as in the case where a plurality of the cationic surfactants are chosen. Alternatively, the surfactants of the different kinds are chosen, as in the case where the cationic surfactant and the nonionic surfactant are respectively chosen.

The anionic surfactants used for the detergent composition are exemplified as follows:

(1) Linear or branched alkylbenzenesulfonates having alkyl groups with an average carbon number of 10 to 16.

(2) Alkyl or alkenyl ether sulfates having linear or branched alkyl groups or alkenyl groups with an average carbon number of 10 to 20 and having 0.5 to 8 mol on an average of ethylene oxide, propylene oxide, butylene oxide, ethylene oxide/propylene oxide in a ratio of 0.1/9.9 to 9.9/0.1, or ethylene oxide/butylene oxide in a ratio of 0.1/9.9 to 9.9/0.1 added in one molecule.

(3) Alkyl or alkenyl sulfates having alkyl groups or alkenyl groups with an average carbon number 10 to 20.

(4) Olefinsulfonates having on an average of 10 to 20 carbon atoms in one molecule.

(5) Alkanesulfonates having on an average of 10 to 20 carbon atoms in one molecule.

(6) Saturated or unsaturated fatty acid salts having on an average of 10 to 24 carbon atoms in one molecule.

(7) Alkyl or alkenyl ether carbonates having alkyl groups or alkenyl groups with an average carbon number of 10 to 20 and having 0.5 to 8 mol on an average of ethylene oxide, propylene oxide, butylene oxide, ethylene oxide/propylene oxide in a ratio of 0.1/9.9 to 9.9/0.1, or ethylene oxide/butylene oxide in a ratio of 0.1/9.9 to 9.9/0.1 added in one molecule.

(8) α-sulfofatty acid salts or α-sulfofatty acid esters having the following general formula:

wherein Y represents an alkyl group of carbon number 1 to 3 or a counter ion; Z represents a counter ion; and R represents an alkyl group or alkenyl group of carbon number 10 to 20.

Examples of the counter ions of the anionic surfactants used herein include alkali metal ions such as sodium and potassium; alkaline earth metal ions such as calcium and magnesium; ammonium ion; and alkanolamines (e.g., monoethanolamine, diethanolamine, triethanolamine, and triisopropanolamine) having 1 to 3 alkanol groups of carbon number 2 or 3.

(9) Amino acid-type surfactants having the following general formulas:

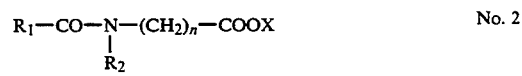

wherein $R_1$ represents an alkyl group or alkenyl group of carbon number 8 to 24; $R_2$ represents a hydrogen atom or an alkyl group of carbon number 1 to 2; $R_3$ represents an amino acid residue; and X represents an alkali metal ion or alkaline earth metal ion;

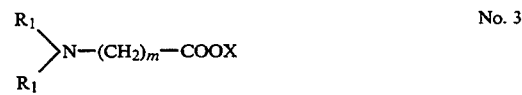

wherein $R_1$, $R_2$ and X are as defined above; and n represents an integer of 1 to 5;

wherein $R_1$ and X are as defined above; and m represents an integer of 1 to 8;

wherein $R_1$, $R_3$ and X are as defined above; and $R_4$ represents a hydrogen atom or an alkyl group or hydroxyalkyl group of carbon number 1 to 2;

$$R_5\text{—N—CH—COOX} \quad \text{No. 5}$$
$$\phantom{R_5\text{—N}}|\phantom{\text{—CH}}|$$
$$\phantom{R_5\text{—N}}R_2\phantom{\text{—C}}R_3$$

wherein $R_2$, $R_3$ and X are as defined above; and $R_5$ represents a β-hydroxyalkyl group or β-hydroxyalkenyl group of carbon number 6 to 28; and $$\begin{matrix} R_5 \\ \phantom{R_5}\diagdown \\ \phantom{R_5}\phantom{\diagdown}N-CH-COOX \\ R_5\diagup \phantom{N-}| \\ \phantom{R_5\diagup N-}R_3 \end{matrix} \quad \text{No. 6}$$

wherein $R_3$, $R_5$ and X are as defined above.

(10) Phosphate ester surfactants:

No. 1 Alkyl (or alkenyl) acid phosphates having the following general formula:

$$(R'O)_{n'}-\overset{O}{\underset{\|}{P}}-(OH)_{m'}$$

wherein R' represents an alkyl group or alkenyl group of carbon number 8 to 24; and $n'+m'=3$, and $n'=1$ to 2;

No. 2 Alkyl (or alkenyl) phosphates having the following general formula:

$$(R'O)_{n''}-\overset{O}{\underset{\|}{P}}-(OH)_{m''},$$

wherein R' is as defined above; and $n''+m''=3$, and $n''=1$ to 3; and

No. 3 Alkyl (or alkenyl) phosphates having the following general formula:

$$(R'O)_{n'''}-\overset{O}{\underset{\|}{P}}-(OM)_{m'''},$$

wherein R', $n''$ and $m''$ are as defined above; and M represents Na, K or Ca.

The nonionic surfactants used for the detergent composition are exemplified as follows:

(11) Polyoxyethylene alkyl (or alkenyl) ethers having alkyl groups or alkenyl groups with an average carbon number 10 to 20 and having 1 to 20 mol of ethylene oxide. added.

(12) Polyoxyethylene alkyl phenyl ethers having alkyl groups with an average carbon number 6 to 12 and having 1 to 20 mol of ethylene oxide added.

(13) Polyoxypropylene alkyl (or alkenyl) ethers having alkyl groups or alkenyl groups with an average carbon number 10 to 20 and having 1 to 20 mol of propylene oxide added.

(14) Polyoxybutylene alkyl (or alkenyl) ethers having alkyl groups or alkenyl groups with an average carbon number 10 to 20 and having 1 to 20 mol of butylene oxide added.

(15) Nonionic surfactants having alkyl groups or alkenyl groups with an average carbon number 10 to 20 and having 1 to 30 mol in total of ethyleneoxide and propylene oxide or ethylene oxide and butylene oxide added, the molar ratio of ethylene oxide to propylene oxide or butylene oxide being 0.1/9.9 to 9.9/0.1.

(16) Higher fatty acid alkanolamides or alkylene oxide adducts thereof having the general formula:

$$R'_{11}CON\begin{matrix} \phantom{xx}R'_{12} \\ \phantom{xx}| \\ (CHCH_2O)_{n3}H \\ \phantom{xx} \\ (CHCH_2O)_{m3}H \\ \phantom{xx}| \\ \phantom{xx}R'_{12} \end{matrix}$$

wherein $R'_{11}$ is an alkyl group or alkenyl group of carbon number 10 to 20; $R'_{12}$ is an H atom or $CH_3$ group; n3 is an integer of 1 to 3; and m3 is an integer of 0 to 3.

(17) Sugar fatty acid esters composed of sugar and fatty acid with an average carbon number 10 to 20.

(18) Fatty acid glycerine monoesters composed of glycerine and fatty acid with an average carbon number 10 to 20.

(19) Alkylamine oxides having the general formula:

$$\begin{matrix} \phantom{xxx}R'_{14} \\ \phantom{xxx}| \\ R'_{13}-N\longrightarrow O \\ \phantom{xxx}| \\ \phantom{xxx}R'_{15} \end{matrix}$$

wherein $R'_{13}$ is an alkyl group or alkenyl group of carbon number 10 to 20; and $R'_{14}$ and $R'_{15}$ are independently alkyl groups of carbon number 1 to 3.

Among these nonionic surfactants, a preference is given to the polyoxyethylene alkyl ethers having alkyl groups with an average carbon number 10 to 15 and having 5 to 15 mol of ethylene oxide added, particularly to the polyoxyethylene alkyl ethers having alkyl groups with an average carbon number 12 to 14 and having 6 to 10 mol of ethylene oxide added.

The cationic surfactants used for the detergent composition are exemplified as follows:

(20) Cationic surfactants having the following general formulas:

$$\left[\begin{matrix} \phantom{xx}R'_2 \\ \phantom{xx}| \\ R'_1-N^+-R'_4 \\ \phantom{xx}| \\ \phantom{xx}R'_3 \end{matrix}\right] X'^- \quad \text{No. 1}$$

wherein at least one of $R'_1$, $R'_2$, $R'_3$ and $R'_4$ represents an alkyl group or alkenyl group of carbon number 8 to 24 and the others represent an alkyl group of carbon number 1 to 5; and X' represents a halogen;

$$\left[\begin{matrix} \phantom{xx}R'_2 \\ \phantom{xx}| \\ R'_1-N^+-CH_2C_6H_5 \\ \phantom{xx}| \\ \phantom{xx}R'_3 \end{matrix}\right] X'^- \quad \text{No. 2}$$

wherein $R'_1$, $R'_2$, $R'_3$ and X' are as defined above; and $$\left[\begin{matrix} (R'_5O)_{n4}H \\ | \\ R'_1-N^+-R'_2 \\ | \\ (R'_5O)_{n4}H \end{matrix}\right] X'^- \quad \text{No. 3}$$

wherein $R'_1$, $R'_2$ and $X'$ are as defined above; $R'_5$ represents an alkylene group of carbon number 2 to 3; and n4 is an integer of 1 to 20.

(21) Alkylamines or alkenylamines having the following general formula:

No. 1    $R''_1 R''_2 NH$ wherein $R''_1$ represents an alkyl group or alkenyl group of carbon number 12 to 26; $R''_2$ represents an alkyl group of carbon number 1 to 7, or an alkyl group or alkenyl group of carbon number 12 to 26;

$$\begin{array}{c} R''_1 \\ \phantom{R''_1} \diagdown \\ \phantom{R''_1} \phantom{\diagdown} N-R''_4 \quad \text{No. 2}\\ \phantom{R''_1} \diagup \\ R''_3 \end{array}$$

wherein $R''_1$ and $R''_3$, which may be the same or different, respectively represent alkyl groups of carbon number 12 to 22; $R''_4$ represents methyl group, ethyl group, or $-(R''_5 O)_{n5} H$ group, wherein $R''_5$ represents an alkylene group of carbon number 2 to 3; and n5 is an integer of 1 to 20.

The ampholytic surfactants used for the detergent composition are exemplified as follows:

(22) Sulfonate-type ampholytic surfactants having the following general formulas:

$$R_{11}CONH-R_{12}-\underset{\underset{R_{13}}{|}}{\overset{\overset{R_{13}}{|}}{N^+}}-R_{14}-SO_3^- \quad \text{No. 1}$$

wherein $R_{11}$ represents an alkyl group or alkenyl group of carbon number 8 to 24; $R_{12}$ represents an alkylene group of carbon number 1 to 4; $R_{13}$ represents an alkyl group of carbon number 1 to 5; and $R_{14}$ represents an alkylene group or hydroxyalkylene group of carbon number 1 to 4;

$$R_{11}-\underset{\underset{R_{16}}{|}}{\overset{\overset{R_{15}}{|}}{N^+}}-R_{14}-SO_3^- \quad \text{No. 2}$$

wherein $R_{11}$ and $R_{14}$ are as defined above; $R_{15}$ and $R_{16}$, which may be the same or different, independently represent an alkyl group of carbon number 8 to 24 or an alkenyl group of carbon number 1 to 5; and $$R_{11}-\underset{\underset{(C_2H_4O)_{n1}H}{|}}{\overset{\overset{(C_2H_4O)_{n1}H}{|}}{N^+}}-R_{14}-SO_3^- \quad \text{No. 3}$$

wherein $R_{11}$ and $R_{14}$ are as defined above; and n1 represents an integer of 1 to 20.

(23) Betaine-type ampholytic surfactants having the following general formulas:

$$R_{21}-\underset{\underset{R_{22}}{|}}{\overset{\overset{R_{22}}{|}}{N^+}}-R_{23}-COO^- \quad \text{No. 1}$$

wherein $R_{21}$ represents an alkyl group, alkenyl group, $\beta$-hydroxyalkyl group, or $\beta$-hydroxyalkenyl group of carbon number 8 to 24; $R_{22}$ represents an alkyl group of carbon number 1 to 4; and $R_{23}$ represents an alkylene group or a hydroxyalkylene group of carbon number 1 to 6;

$$R_{21}-\underset{\underset{(C_2H_4O)_{n2}H}{|}}{\overset{\overset{(C_2H_4O)_{n2}H}{|}}{N^+}}-R_{23}-COO^- \quad \text{No. 2}$$

wherein $R_{21}$ and $R_{23}$ are as defined above; and n2 represents an integer of 1 to 20; and $$R_{21}-\underset{\underset{R_{24}}{|}}{\overset{\overset{R_{24}}{|}}{N^+}}-R_{23}-COO^- \quad \text{No. 3}$$

wherein $R_{21}$ and $R_{23}$ are as defined above; and $R_{24}$ represents a carboxyalkyl group or hydroxyalkyl group of carbon number 2 to 5.

Among the above surfactants, preferences are given to surfactant nos. (1), (2), (3), (4), (5), (6), (11), (12), (13), (15), (16), No. 2 of (22), and No. 1 of (23).

Particularly, those containing surfactant nos. (1), (2), (3) or (11) as the main surfactant are preferred.

Also, the anionic surfactants and the nonionic surfactants are particularly preferred to be used as the main surfactant from the viewpoint of concentration of the detergent composition.

In the case of the synthesized inorganic ion exchange material having the general formula (A), the amount of the above surfactants is preferably 1 to 60% by weight, more preferably 5 to 50% by weight based on the whole composition. When the amount is less than 1% by weight, the resulting composition fails to show its inherent properties as a detergent, and when it exceeds 60% by weight, the amounts of other components in the detergent composition are restricted, failing to have a good balance of components as a detergent.

In the synthesized inorganic ion exchange material having the general formula (A') of the present invention, the amount of the surfactants is normally 0.1 to 90% by weight.

As described above, the detergent composition of the present invention contains the inorganic ion exchange material and/or the hydrate thereof, and the surfactants. Besides them, the detergent composition of the present invention may further contain other components, depending upon various purposes.

Specifically, the detergent compositions of the present invention will be described in detail below by means of Embodiments I to IV containing various additives as described below.

(1) Embodiment I:

Conventionally, in washing at home, etc., a problem has been pointed out that mud dirt once removed from a washing item during washing sticks back to the washing item, thereby re-contaminating the washing item.

Such a problem is eliminated by providing a detergent composition suitable for concentration and excellent in washing power for mud stains.

Accordingly, such a detergent composition comprises:

(a) a surfactant;

(b) the inorganic ion exchange material as described above and/or a hydrate thereof; and (c) a polymer or a copolymer having a repeating unit having the following general formula:

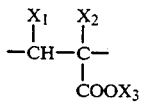

wherein $X_1$ represents methyl group, a hydrogen atom or $COOX_3$ group; $X_2$ represents methyl group, a hydrogen atom or a hydroxyl group; and $X_3$ represents a hydrogen atom, an alkali metal element, an alkaline earth metal element, $NH_4$ group or ethanolamine group.

The surfactant (a) and the above inorganic ion exchange material and/or the hydrate thereof (b) in Embodiment I are as described above.

The polymer or copolymer used for the present invention contains the repeat unit having the following general formula:

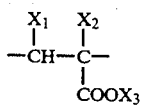

wherein $X_1$ represents methyl group, a hydrogen atom or $COOX_3$ group; $X_2$ represents methyl group, a hydrogen atom or a hydroxyl group; and $X_1$ represents a hydrogen atom, an alkali metal element, an alkaline earth metal element, $NH_4$ group or ethanolamine group.

With respect to the above general formula, the alkali metals are exemplified by Na, K and Li, and the alkaline earth metals are exemplified by Ca and Mg.

The polymer or copolymer used for the present invention is synthesized by a polymerization reaction of, for example, acrylic acid, (anhydrous) maleic acid, methacrylic acid, α-hydroxyacrylic acid, crotonic acid, isocrotonic acid, or a salt thereof; or a copolymerization reaction of each monomer; or a copolymerization reaction with other polymerizable monomers. Examples of the other polymerizable monomers used in this copolymerization include aconitic acid, itaconic acid, citraconic acid, fumaric acid, vinylphosphonic acid, sulfonated maleic acid, diisobutylene, styrene, methyl vinyl ether, ethylene, propylene, isobutylene, pentene, butadiene, isoprene, vinyl acetate (and vinyl alcohol in the case of hydrolysis following copolymerization) and acrylates. These examples are not to be construed as limitative.

The polymerization reaction can be achieved by known ordinary methods without limitations.

In the present invention, the polymer or copolymer described above has a weight-average molecular weight of 800 to 1,000,000, preferably 5,000 to 200,000. When the weight-average molecular weight is less than 800, the effects of the present invention attributable to the polymer cannot be obtained. When it exceeds 1,000,000, the re-contamination takes place due to the influence of the polymer, thereby hampering the washing performance.

Although the copolymerization ratio of the repeating unit of the above general formula and the other copolymerizable monomer is not subject to limitation, the copolymerization ratio of [the repeating unit of the above general formula]/[the other copolymerizable monomer] is preferably in the range of from 1/100 to 90/10.

In the present invention, the polymer or copolymer described above is present in an amount of 0.2 to 8% by weight, preferably 1 to 6% by weight based on the whole composition. When the amount is less than 0.2% by weight, the desired effects of the present invention cannot be obtained. When it exceeds 8% by weight, further addition of the polymer or copolymer to the composition show no significant effects, but merely increases the costs thereof.

(2) Embodiment II:

Conventionally, for difficult-to-remove dirt containing skin fat and other fatty acids, lipids and other substances, the addition of a silicate for the purpose of increasing their washing power can reduce their solubility with time in long-term storage in systems containing a large amount of zeolite such as concentrated, highly dense detergents. Thus, there has long been a demand for overcoming this drawback by improving washing performance.

Such a problem is eliminated by providing a detergent composition excellent in solubility at the time of use and having improved washing power for dirt caused by fatty acids.

Accordingly, such a nonionic powdery detergent composition comprises:

(a) 12 to 50% by weight of a nonionic surfactant;
(b) 0.5 to 70% by weight of the inorganic ion exchange material as described above and/or a hydrate thereof; and
(c) 5 to 30% by weight of a porous oil-absorbing carrier having an oil-absorbing capacity of not less than 80 ml/100 g.

The nonionic surfactant (a) and the above inorganic ion exchange material and/or the hydrate thereof (b) in Embodiment II are as described above. The nonionic surfactant (a) is preferably used in an amount of 12 to 35% by weight.

The porous oil-absorbing carrier used in the present invention (hereinafter, it may simply be referred to as "oil-absorbing carrier") has an oil-absorbing capacity of normally not less than 80 ml/100 g, preferably not less than 150 ml/100 g, more preferably not less than 200 ml/100 g. Here, the oil-absorbing capacity is measured according to JIS K6220.

The above porous oil-absorbing carriers may preferably be silica derivatives containing silicon, when calculated as $SiO_2$ in an anhydrous state, in an amount of not less than 30% by weight, preferably not less than 40% by weight. Examples of such porous oil-absorbing carriers include amorphous silica, clayey substances and amorphous aluminosilicates. Specifically, examples of amorphous silica derivatives having an average particle diameter of not more than 200 μm include oil-absorbing carriers commercially available under the tradenames of Tokusil (manufactured by Tokuyama Soda Co., Ltd.), Nipsil (manufactured by Nippon Silica Industries), Tixolex (Kofran Chemical), etc.

Among these silica derivatives, when porous oil-absorbing carriers giving a water dispersion with a pH of not less than 9 are used, the solubility which becomes poor in high humidity storage can be further improved. Therefore, the oil-absorbing carriers containing silicon in an amount of not less than 30% by weight, when calculated as $SiO_2$, and giving a water dispersion with a pH of not less than 9 may be preferably used. Among these porous oil-absorbing carriers, examples of the amorphous silicas include Tokusil AL-1 (manufactured by Tokuyama Soda Co., Ltd.), Nipsil NA (manufactured by Nippon Silica Industries), Carplex #100 (manufactured by Shionogi Pharmacy), Sipernart D10 (Degussa AG), etc. The porous oil-absorbing carriers satisfying the above-described requirements are also found in the clayey substances, and examples thereof include sodium mordenite HSZ-640 NAA (manufactured by Tosoh Corporation), etc. Examples of the amorphous aluminosilicates include commercially available oil-absorbing carriers under the tradename of Tixolex 25 (Kofran Chemical).

In general, the porous oil-absorbing carriers illustrated above have scarcely any cationic exchange capacity. Therefore, the oil-absorbing carriers having good cationic exchanging are advantageous, since they also act as a builder for the detergent. Examples of the oil-absorbing carriers having a high oil-absorbency and a high cationic exchange capacity include oil-absorbing amorphous aluminosilicates having the following general formula:

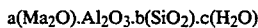

$$a(Ma_2O) \cdot Al_2O_3 \cdot b(SiO_2) \cdot c(H_2O)$$

wherein Ma represents an alkali metal atom; and a, b and c each represent the molar number of the respective components, which are usually as follows: $0.7 \leq a \leq 2.0$, $0.8 \leq b \leq 4$, and c is an arbitrary positive number.

Particularly preferred are those having the following general formula:

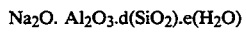

$$Na_2O \cdot Al_2O_3 \cdot d(SiO_2) \cdot e(H_2O)$$

wherein d represents a number of 1.8 to 3.2 and e represents a number of 1 to 6.

The amorphous aluminosilicates having a high oil absorbency and a high ion exchange capacity usable in the present invention are prepared by adding an aqueous solution of a low-alkali alkali metal aluminate having a molar ratio of $Ma_2O$ to $Al_2O_3$ (Ma being an alkali metal) of $Ma_2O/Al_2O_3 = 1.0$ to 2.0 and a molar ratio of $H_2O$ to $Ma_2O$ of $H_2O/Ma_2O = 6.0$ to 500 to an aqueous solution of an alkali metal silicate having a molar ratio of $SiO_2$ to $Ma_2O$ of $SiO_2/Ma_2O = 1.0$ to 4.0 and a molar ratio of $H_2O$ to $Ma_2O$ of $H_2O/Ma_2O = 12$ to 200 under vigorous stirring at 15° to 60° C., preferably 30° to 50° C. The intended product can be advantageously obtained by heat-treating a white slurry of precipitates thus formed at 70° to 100° C., preferably 90° to 100° C., for 10 minutes to 10 hours, preferably not more than 5 hours, followed by filtration, washing and drying. Incidentally, the aqueous solution of an alkali metal silicate may be added to the aqueous solution of a low-alkali alkali metal aluminate.

By this method, the oil-absorbing amorphous aluminosilicate carrier having an ion exchange capacity of not less than 100 $CaCO_3$ mg/g and an oil-absorbing capacity of not less than 200 ml/100 g can be easily obtained (refer to Japanese Patent Laid-Open Nos. 62-191417 and 62-191419).

The pH of the dispersion of the oil-absorbing carrier is determined according to JIS K 6220. In particular, about 5 g of the sample is weighed into a hard Erlenmeyer flask and 100 ml of water free from carbon dioxide is added thereto. The flask is stoppered and shaken for 5 minutes. The liquid thus obtained is used as a test solution to determine the pH by a glass electrode method (JIS Z 8802-7.2.3).

By selecting an oil-absorbing carrier which gives a water dispersion with a pH of not less than 9.0, a nonionic powdery detergent composition with a solubility which does not deteriorate during storage under high humidity conditions can be obtained.

When the detergent composition has a quite high alkalinity or the storage conditions are quite severe, it is preferable to select an oil-absorbing carrier which satisfies the severer condition such that the soluble amount in a 2% aqueous NaOH solution is not more than 0.5 g. Specifically, it is desired that the porous oil-absorbing carrier contains silicon in an amount of not less than 30% by weight, when calculated as $SiO_2$, and that the soluble amount in the 2% aqueous NaOH solution is not more than 0.5 g.

More specifically, it is preferable to select such an oil-absorbing carrier that when 10 g of the oil-absorbing carrier is dispersed in 100 ml of a 2% aqueous NaOH solution, the dispersion is stirred for 16 hours while the temperature is kept at 25° C., and $SiO_2$ in the filtrate is subjected to colorimetric determination (as for the colorimetric determination, refer to Yukagaku, Vol. 25, p. 156 (1976)), the soluble amount of the oil-absorbing carrier is not more than 0.5 g. The oil-absorbing carriers satisfying this condition include sodium mordenite HSZ-640 NAA (manufactured by Tosoh Corporation) and some of the amorphous aluminosilicates having the above general formula.

On the other hand, the oil-absorbing carriers include also one wherein the pH of a 5% dispersion thereof is less than 9.0 but the solubility thereof in a 2% aqueous NaOH solution is not more than 0.5 g. Such an oil-absorbing carrier is also within the scope of the present invention. For example, Perlite 4159, which is a clayey substance manufactured by Dicalite Orient Co., Ltd., has such properties and is usable as the porous oil-absorbing carrier in the present invention.

The oil-absorbing carrier described above is incorporated in an amount of 5 to 30% by weight, preferably 5 to 10% by weight, based on the whole composition. When the amount is less than 5% by weight, the occlusion of the nonionic surfactant used in the present invention becomes difficult, and when it exceeds 30% by weight, the amounts of the other components are undesirably restricted.

In the detergent composition of the present invention, carbonates may be added to the above components, if necessary. A preference is given to sodium carbonate and potassium carbonate. Examples of sodium carbonates include heavy sodium carbonate (heavy ash) and light sodium carbonate (light ash). It has an average particle diameter of 10 to 2000 μm, preferably 100 to 1000 μm.

These carbonates are normally incorporated in an amount of 5 to 35% by weight, preferably 5 to 30% by weight, based on the whole composition. When the amount is less than 5% by weight, the resulting composition cannot be said to have sufficient alkaline capacity, and when it exceeds 35% by weight, no further improvements in washing power is observed.

(3) Embodiment III:

Conventionally, it has been a common practice to blend clothing item detergents for households or professionals with oxygen-based bleaching agents for purposes such as maintaining whiteness of the clothing item, removing stains and other purposes.

The detergent composition in Embodiment III is suitable for concentration by incorporating the oxygen-based bleaching agent therewith, thereby optimally achieving the performance of the oxygen-based bleaching agent.

Accordingly, such a detergent composition comprises:

(a) a surfactant;
(b) the synthesized inorganic ion exchange material as described above and/or a hydrate thereof; and
(c) an oxygen-based bleaching agent, wherein the amount of said oxygen-based bleaching agent is 0.5 to 40% by weight based on the whole composition.

The surfactant (a) and the above inorganic ion exchange material and/or the hydrate thereof (b) in Embodiment III are as described above.

Examples of oxygen-based bleaching agents in the present invention include sodium percarbonate (hydrogen peroxide adduct of sodium carbonate), sodium perborate monohydrate, sodium perborate tetrahydrate, hydrogen peroxide adduct of urea, $4Na_2SO_4.2H_2O_2.$-NaCl, sodium peroxide and calcium peroxide. Among these bleaching agents, at least one member selected from the group consisting of sodium percarbonate, sodium perborate monohydrate and sodium perborate tetrahydrate are preferred from the viewpoint of storage stability and availability.

These oxygen-based bleaching agents may be coated or used in combination with a stabilizer to maintain the stability of the bleaching agent itself and the product blended therewith.

The oxygen-based bleaching agent is contained at normally 0.5 to 40% by weight, preferably 2 to 30% by weight in the whole composition. When the amount is less than 0.5% by weight, sufficient bleaching effects cannot be expected, and when it exceeds 40% by weight, the amounts of the other components contained in the detergent are restricted, failing to have a good balance of the components as a detergent.

When using an oxygen-based bleaching agent, the detergent composition of the present invention may further contain at least one bleaching activator (organic peracid precursor) selected from the group consisting of the following (A), (B) and (C):

(A) An organic peracid precursor which produces an organic peracid having an N+ group upon reaction with hydrogen peroxide.

(B) An organic peracid precursor which produces an organic peracid upon reaction with hydrogen peroxide wherein the leaving group is phenolsulfonic acid or a salt thereof.

(C) An organic peracid precursor which produces a peracetic acid upon reaction with hydrogen peroxide.

Examples of the bleaching activator (A) used for the present invention include organic peracid precursors such as those disclosed in Japanese Patent Laid-Open Nos. 63-233969, 63-315666, 64-68347, 1-190654 and 3-17196.

Such organic peracid precursors are preferably acyl compounds having the general formula (I):

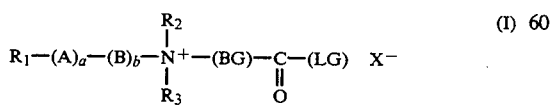

wherein $R_1$ is a linear or branched alkyl group of carbon number 1 to 18; $R_2$ and $R_3$ independently represent an alkyl group of carbon number 1 to 2; BG represents a binding group; LG represents a leaving group; $X^-$ represents an inorganic or organic counter ion; a and b are a=b=0 or a=b=1; A represents:

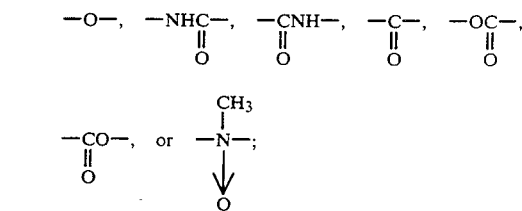

B represents:

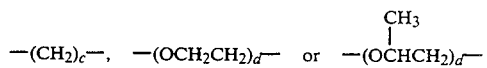

wherein c is an integer of 1 to 12, preferably 1 to 5; and d is an integer of 1 to 10, preferably 1 to 5.

With respect to the general formula (I), although the binding group is not particularly subject to limitations, it may be exemplified by alkylene groups, cycloalkylene groups, phenylene or alkylenephenylene groups and oxyalkylene groups ($-CH_2CH_2O-$).

In addition, although the leaving groups are not particularly limitative, examples thereof include:

(a) 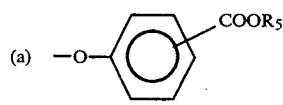

(b) 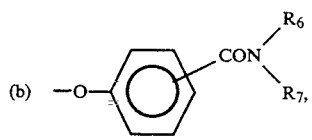

(c) 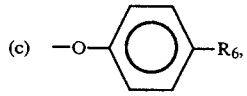

(d) 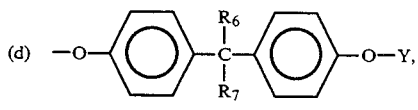

(e) 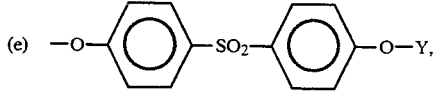

(f) 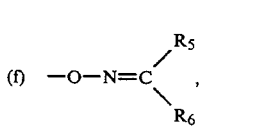, (g) 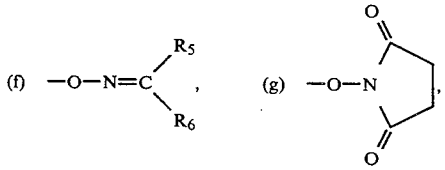

(h) 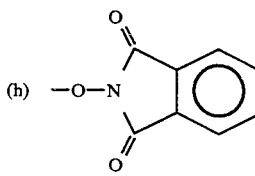, (i) 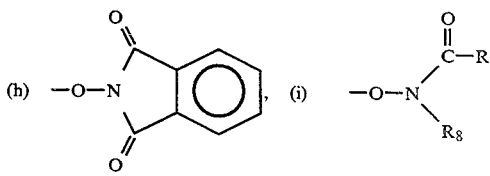

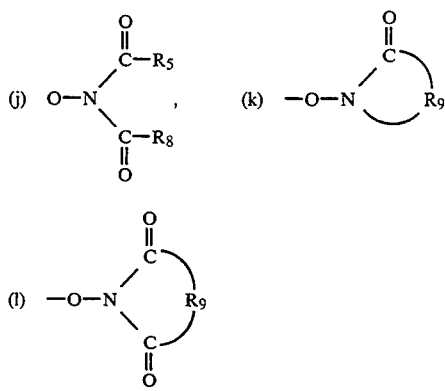

(m) glycerin residue, (n) sugar derivative residue,

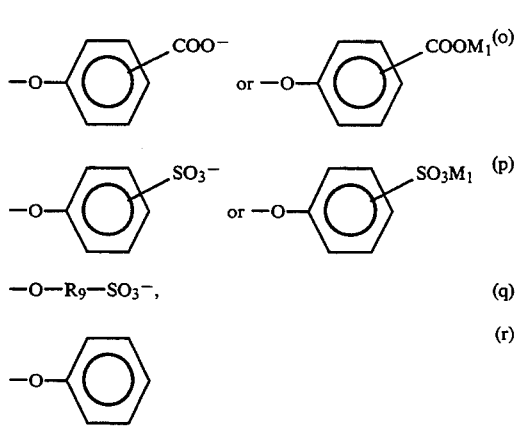

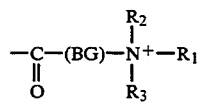

wherein $R_5$ and $R_8$ independently represent an alkyl group; $R_6$ and $R_7$ independently represent a hydrogen atom or an alkyl group; $R_9$ represents an alkylene group or alkenylene group; $M_1$ represents a hydrogen atom or an alkali metal atom; and Y represents a hydrogen atom or a group having the following general formula:

$$-\underset{\underset{O}{\|}}{C}-(BG)-\underset{\underset{R_3}{|}}{\overset{\overset{R_2}{|}}{N^+}}-R_1$$

wherein $R_1$, $R_2$, $R_3$ and BG are as defined above.

In the general formula ( I ), $X^-$ represents an inorganic or organic counter ion, but when the leaving group has the following general formula, $X^-$ does not exist.

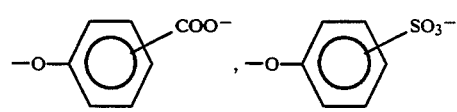

With respect to the compounds of the general formula (I), a preference is given to those wherein the binding group is $-(CH_2)_{1-12}-$, particularly $-(CH_2)_{1-5}$, the leaving group has the general structural formula (a), (b), (c), (d), (f), (g), (m), (n), (o), (p) or (q), $R_5$ is a $C_{1-2}$ alkyl group, each of $R_6$ and $R_7$ is H or a $C_{1-2}$ alkyl group, $R_8$ is a $C_{1-2}$ alkyl group and $R_9$ is a $C_{1-3}$ alkylene group, with a greater preference given to the compound having the general structural formula (o) or (p).

The nitrile compound having the following general formula is also useful as a bleaching activator.

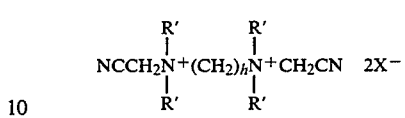

wherein R′ represents an alkyl group of carbon number 1 to 3; $X^-$ represents an organic or inorganic counter ion; and h represents an integer of 1 to 16.

Among the bleaching activator (A), particularly desirable ones are those shown by the following general formulas:

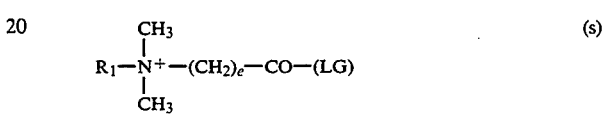  (s)

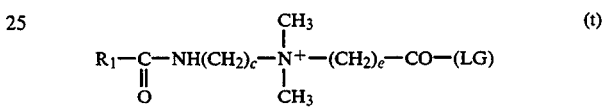  (t)

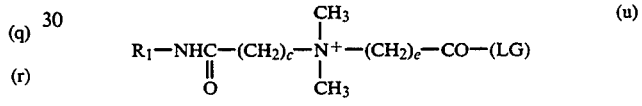  (u)

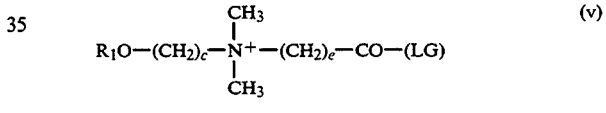  (v)

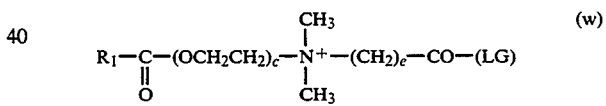  (w)

wherein $R_1$ and c are as defined above; e represents an integer of 1 to 10; LG represents a leaving group as defined (o) and (p) above.

The bleaching activator (B) used for the present invention is an organic peracid precursor which produces an organic peracid upon reaction with hydrogen peroxide wherein the leaving group is phenolsulfonic acid or a salt thereof, and is disclosed, for instance, in Japanese Patent Laid-Open Nos. 59-22999, 63-258447 and 63-31566.

Typical examples are compounds of the following two structures, which are not to be construed as limitative.

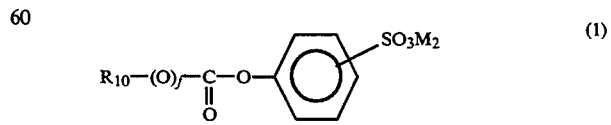  (1)

wherein $R_{10}$ represents an alkyl group of carbon number 1 to 14; f is an integer of 0 or 1; and $M_2$ represents a hydrogen atom or an alkali metal; and

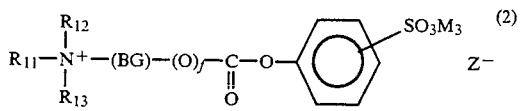

wherein $R_{11}$ represents an alkyl group of carbon number 1 to 14 or $R_{14}$—X—Q group, wherein $R_{14}$ represents an alkyl group of carbon number 1 to 14; and X represents:

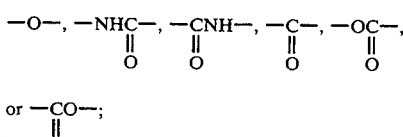

Q represents —(CH$_2$)$_g$— or —(OCH$_2$CH$_2$)$_g$—, wherein g represents an integer of 1 to 11;

$R_{12}$ and $R_{13}$ independently represents an alkyl group of carbon number 1 to 3; a binding group is usually —(CH$_2$)$_g$—, wherein g is as defined above; f is an integer of 0 or 1; M$_3$ and Z$^-$ may not be present, or when present, M$_3$ is a hydrogen atom or an alkali metal and Z$^-$ represents an anion such as a halogen ion.

The bleaching activator (C) used for the present invention is an organic peracid precursor which produces a peracetic acid upon reaction with hydrogen peroxide, and is exemplified by tetraacetylethylenediamine (TAED), acetoxybenzenesulfonic acid, tetraacetylglycoluril (TAGU) and glucose pentaacetate (GPAC).

The amount of the bleaching activator described above is normally 0.1 to 15% by weight, preferably 1 to 10% by weight in the whole composition. When the amount is less than 0.1% by weight, no bleaching activating effects are obtained. When it exceeds 15% by weight, further addition of the bleaching activator to the composition shows no significant effects, but merely increases the costs thereof.

(4) Embodiment IV:

In detergents for clothing items, detergents have recently been blended with enzymes to decompose and remove the target dirt in the field of the art. However, it has been pointed out that the components of the detergents and the chlorine dissolved in tap water decrease the enzymatic activities.

Such a problem is eliminated by providing a detergent composition excellent in stability of the enzyme during long-time storage and suitable for concentration. Accordingly, such a detergent composition comprises:

(a) a surfactant;

(b) the synthesized inorganic ion exchange material as described above and/or a hydrate thereof; and (c) an enzyme.

The surfactant (a) and the above inorganic ion exchange material and/or the hydrate thereof (b) in Embodiment IV are as described above.

The enzymes used for the present invention are enzymes capable of hydrolyzing dirt as a substrate. Such hydrolytic enzymes include the following:

Carboxylate hydrolase, thiol ester hydrolase, phosphate monoester hydrolase and phosphate diester hydrolase, all of which act on ester linkage; glycoxide hydrolase, which acts on glycoxy compounds; enzymes which hydrolyze N-glycosyl compounds; thioether hydrolase, which acts on ether linkage; α-amino-acyl-peptide hydrolase, peptidyl-amino acid hydrolase, acylamino acid hydrolase, dipeptide hydrolase and peptidyl-peptide hydrolase, all of which act on peptide linkage, with a preference given to carboxylate hydrolase, glycoside hydrolase and peptidyl-peptide hydrolase.

More specifically, the preferred hydrolyric enzymes are exemplified as follows:

1. Proteases belonging to the class peptidyl-peptide hydrolase

Examples suitable to the present invention include pepsin, pepsin B, rennin, trypsin, chymotrypsin A, chymotrypsin B, elastase, enterokinase, cathepsin C, papain, chymopapain, ficin, thrombin, fibrinolysin, renin, subtilisin, aspergillopeptidase A, collagenase, clostridiopeptidase B, kallikrein, gastrisin, cathepsin D, bromelain, keratinase, chymotrypsin C, pepsin C, cocoonase, aspergillopeptidase B and urokinase. Other proteases are carboxypeptidases A and B and aminopeptidase.

2. Glycoside hydrolases

Cellulase, a-amylase, β-amylase, isoamylase, pullulanase, glucoamylase, isopertase, lysozyme, pectinase, chitinase, dextranase and others are preferable, with a greater preference given to cellulase, α-amylase, β-amylase and pullulanase.

3. Carboxylate ester hydrolases

Examples of carboxylate ester hydrolases preferred for the present invention include carboxyl esterase, lipase, pectinesterase and chlorophyllase, and lipase is particularly effective.

These enzymes may be selected from the same type of the enzyme alone, as in the case of selection of two or more proteases. Alternatively, they may be selected from two or more types, as in the case where a protease and an amylase are selected.

The enzymes used in the present invention may be those widely distributed in animals, plants, bacteria and fungi, and partially purified fraction thereof, which are not construed to be limitative thereto.

Examples of commercially available enzyme products and manufacturers thereof are as follows: "Alkalase," "Esperase," "Sabinase," "AMG," "BAN," "Fungamill," "Sweetzyme," "Termamill," "Lipolase" (Novo Industry, Copenhagen, Denmark); "Maksatase P," "High-alkaline protease," "Amylase THC", "Lipase" (Gist Brocades, N.V., Delft, Holland); "Protease B-400," "Protease B-4000," "Protease AP" and "Protease AP 2100" (Scheweizerische Ferment A.G., Basel, Switzerland); "CRD-Protease" (Monsanto Company, St. Louis, Miss., U.S.A.); "Piocase" (Piopin Corporation, Monticello, Ill., U.S.A.); "Pronase-P," "Pronase-AS," "Pronase-AF" (Kaken Chemical Co., Ltd., Japan); "Lapidase P-2000" (Lapidas, Secran, France ); protease products ( Tyler standard sieve, 100% pass 16 mesh and 100% on 150 mesh) (Clington Corn Products (Division of Standard Brands Corp., New York); "Takamine," "Bromelain 1:10," "HT Protease 200," "Enzyme L-W" (obtained from fungi, not from bacteria) (Miles Chemical Company, Elkhart, Ind., U.S.A.); "Rozyme P-11 Conc.," "Pectinol," "Lipase B," "Rozyme pF," "Rozyme J-25" (Rohm & Haas, Philadelphia, U.S.A.); "Ambrozyme 200" (Jack Wolf & Co., Ltd., Subsidiary of Nopco Chemical Company, Newark, N.J., U.S.A. ); "ATP 40," "ATP 120," "ATP 160" (Lapidas, Secran, France ); "Oripase" (Nagase & Co., Ltd., Japan ); "API-21" (Showa Denko K.K.).

Examples of the commercially available cellulases may be as follows:

(1) Cellulase AP (Amano Pharmaceutical Co., Ltd.);
(2) Cellulosin AP (Ueda Chemical Co., Ltd.);
(3) Cellulosin AC (Ueda Chemical Co., Ltd.);
(4) Cellulase-Onozuka (Kinki Yakult Seizo Co., Ltd.);
(5) Pancellase(Kinki Yakult Seizo Co., Ltd.);
(6) Macerozyme (Kinki Yakult Seizo Co., Ltd.);
(7) Meicelase (Meiji Seika Kaisha, Ltd.);
(8) Celluzyme (Nagase Co., Ltd.);
(9) Soluble sclase (Sankyo Co., Ltd.);
(10) Sanzyme (Sankyo Co., Ltd.);
(11) Cellulase A-12-C (Takeda Chemical Industries, Ltd.);
(12) Toyo-Cellulase (Toyo Jozo Co., Ltd.);
(13) Driserase (Kyowa Hakko Kogyo Co., Ltd.);
(14) Luizyme (Luipold Werk);
(15) Takamine-Cellulase (Chemische Fabrik);
(16) Wallerstein-Cellulase (Sigma Chemicals);
(17) Cellulase Type 1 (Sigma Chemicals);
(18) Cellulase Serva (Serva Laboratory);
(19) Cellulase 36 (Rohm and Haas);
(20) Miles Cellulase 4,000 (Miles);
(21) R&H Cellulase 35,36,38 conc (Philip Morris);
(22) Combizym (Nysco Laboratory);
(23) Cellulase (Makor Chemicals);
(24) Cellucrust (NOVO Industry); and
(25) Cellulase (Gist-Brocades).

Other enzymes include "Splentase 200L" (tradename, Amano Pharmaceutical Co., Ltd.), "Promozyme" (tradename, NOVO Industry), "Isoamilase" (Reagent, Seikagaku Kogyo), etc.

Further, examples of proteases include those disclosed in European Patent Publication No. 496361, and examples of cellulase include those disclosed in U.S. Pat. Nos. 4,822,516 and 4,978,470, and WO8909259, WO9110732 and WO9117243.

These enzymes may be contained in an amount of normally 0.001 to 10% by weight, preferably 0.005 to 5% by weight, and more preferably 0.01 to 2% by weight. When the amount is less than 0.001% by weight, the effects of the present invention cannot be achieved, and when it exceeds 10% by weight, further addition of the enzymes to the composition shows no significant effects, but merely increases the costs thereof.

When using such an enzyme, a reducing agent may be contained at 0.01 to 5% by weight based on the whole composition in order to enhance the effects of the enzyme. The reducing agent is preferably an inorganic reducing agent, which reduces and removes the residual chlorine dissolved in tap water and should not decrease the enzyme activity.

The reducing agent used for the present invention is exemplified by sulfurous acid, disulfurous acid, thiosulfuric acid and salts thereof. These reducing agents may be used singly or in combination.

The amount of these reducing agents is normally 0.01 to 5% by weight, preferably 0.05 to 2% by weight based on the whole composition. When the amount is less than 0.01 % by weight, residual chlorine elimination is insufficient. When it exceeds 5% by weight, further addition of the reducing agents to the composition shows no significant effects, but merely increases the costs thereof.

The detergent compositions which are exemplified by the above-mentioned Embodiments I to IV of the present invention may incorporate the following various additives appropriately according to various purposes.

(1) Rinsing agents:

In washing clothing items at homes etc., rinsing ability such as good lather removal and disappearance of turbidity at the time of washing and rinsing is required for detergents from the viewpoint of users' convenience. To improve such rinsing ability, the following rinsing agents can be used appropriately in the present invention.

Although known ordinary rinsing agents can be used for this purpose, it is preferable to use at least one member selected from the group consisting of 1) through 3) described below from the viewpoint of the rinsing effects and compatibility with the inorganic ion exchange material.

1) Silicone
2) Salt of fatty acid of carbon number 8 to 20.
3) Polyoxyethylene polyoxypropylene alkyl ether having an alkyl group of carbon number 8 to 20, and having ethylene oxide added thereto in a molar number of 3 to 14 and propylene oxide added thereto in an average molar number of 1 to 14.

The silicones of 1) are exemplified by dimethylsilicone oil, silicone paste, silicone emulsion, organically modified polysiloxane and fluorosilicone oil, with a preference given to those prepared by absorbing them to silica powder.

The salt of fatty acid of 2), which has a carbon number 8 to 20, may be a salt of any saturated or unsaturated fatty acid, and is exemplified by palm acids based mainly on lauric acid, beef tallow fatty acids based mainly on oleic acid and palm fatty acids.

The polyoxyethylene polyoxypropylene alkyl ether of 3), which has an alkyl group of carbon number of 8 to 20, with ethylene oxide added thereto in a molar number of 3 to 14 and propylene oxide added thereto in an average molar number of 1 to 14, is a block type polyoxyethylene polyoxypropylene alkyl ether having the following general formula:

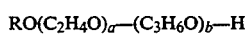

$$RO(C_2H_4O)_a-(C_3H_6O)_b-H$$

$C_2H_4O$: Ethylene oxide block
$C_3H_6O$: Propylene oxide block
wherein R is a linear or branched alkyl group of carbon number 8 to 20; "a" represents a number of 3 to 14; and "b" represents a number of 1 to 14.

With respect to the above general formula, the linear or branched alkyl group of carbon number 8 to 20 represented by R is exemplified by linear primary alcohols derived from natural materials and synthetic alcohols (primary, secondary) derived from petrochemical derivatives. "a" represents a number of 3 to 14. When "a" is less than 3, its solubility is poor. When "a" exceeds 14, the rinsing effects is lowered. "b" represents a number of 1 to 14. When "b" exceeds 14, its solubility is poor.

The amount of the rinsing agent described above is normally 0.02 to 5% by weight, preferably 0.05 to 3% by weight in the whole composition. When the amount is less than 0.02% by weight, no effects for improving rinsing ability are obtained. When it exceeds 5% by weight, no further improvements in rinsing ability are obtained, while turbidity undesirably takes place.

(2) Fluorescent dyes

In detergents for clothing items, it is a common practice to blend the detergent with a fluorescent dye for the purpose of maintaining whiteness for the laundry. The following fluorescent dyes can be used when it is intended to obtain a detergent offering good tone stability in storage.

Although said fluorescent dye may be a known ordinary fluorescent dye, it is preferable to use an anionic fluorescent dye, particularly an anionic fluorescent dye having a sulfone group. Specifically, it is preferable to use at least one fluorescent dye selected from the group consisting of the following 1) through 10) from the viewpoint of brightening effect of clothing item, price and other factors.

1) 4,4′-Bis[{4-anilino-6-(2-hydroxyethyl)amino-1,3,5 -triazin-2-yl}amino]stilbene-2,2′-disulfonic acid disodium salts 2) 4,4′-Bis{(4-anilino-6-morpholino-1,3,5-triazin-2 -yl)amino}stilbene-2,2′-disulfonic acid disodium salts 3) 4,4′-Bis[{4-anilino-6-bis(2-hydroxyethyl)amino-1,3,5 -triazin-2-yl}amino]stilbene-2,2′-disulfonic acid disodium salts 4) 4,4′-Bis{(4-amino-6-anilino-1,3,5-triazin-2-yl) -amino}stilbene-2,2′-disulfonic acid disodium salts 5) 4,4′-Bis[{4′anilino-6-(N-methyl-N-2-hydroxyethylamino)-1,3,5-triazin-2-yl}amino]stilbene-2,2′-disulfonic acid disodium salts 6) 4,4′-Bis{(4-anilino-6-methoxy-1,3,5-triazin-2-yl)-amino}stilbene-2,2′-disulfonic acid disodium salts 7) 4,4′-Bis{(4-toluidino-6-morpholino-1,3,5-triazin-2 -yl)amino}stilbene-2,2′-disulfonic acid disodium salts 8) 4,4′-Bis(2-sulfostyryl)biphenyl disodium salts 9) 4,4′-Bis(4-phenyl-1,2,3-triazol-2-yl)stilbene-2,2′- disulfonic acid disodium salts 10) 4-(2H-naphto[1,2-d]triazol-2-yl)stilbene-2-sulfonic acid sodium salts Although the amounts of the fluorescent dyes are not particularly limitative, they are normally 0.02 to 3% by weight, preferably 0.1 to 2% by weight based on the whole composition. When the amount is less than 0.2% by weight, sufficient improvement in whitening by the addition of fluorescent dye cannot be obtained, and when it exceeds 3% by weight, the toning of the powder detergent may be impaired.

(3) Detergent builders

The detergent composition of the present invention contains an inorganic ion exchange material as described above and/or a hydrate thereof, and a surfactant, and may further incorporate various additives which are normally added to detergents. Such additives are preferably detergent builders. Examples of usable detergent builders are the inorganic compounds and/or organic compounds exemplified below.

Examples of the detergent builders are crystalline or amorphous aluminosilicates as described below.

(1) Crystalline aluminosilicate salts having the following general formula:

wherein Mb represents an alkali metal atom; M″ represents an alkaline earth metal atom exchangeable with calcium; p, q and w represent mol numbers of the respective components, which generally fall in the ranges of $0.7 \leq p \leq 1.5$, $0.8 \leq q \leq 6$ and w is an arbitrary positive number.

Among them, those having the following general formula are preferred as detergent builders:

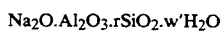

wherein r represents a number of 1.8 to 3.0, and w′ represents a number of 1 to 6.

(2) Amorphous aluminosilicate salts having the following general formula:

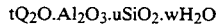

wherein Q represents a sodium atom and/or a potassium atom; t, u and w represent mol numbers of the respective components, which Generally fall in the ranges of $0.7 < t \leq 1.2$, $1.6 \leq u \leq 2.8$ and w is an arbitrary positive number.

Besides them, phosphates such as tripolyphosphate and pyrophosphate, aminotri(methylenephosphonic acid), 1-hydroxyethylidene-1,1-diphosphonic acid, ethylenediaminetetra(methylenephosphonic acid), diethylenetriaminepenta(methylenephosphonic acid), salts thereof, salts of phoshonocarboxylic acid such as 2-phosphonobutane-1,2-dicarboxylic acid, salts of amino acid such as aspartic acid or glutamic acid, aminopolyacetates such as nitrilotriacetate and ethylenediaminetetraacetate, polymeric electrolytes such as polyacrylic acid and polyaconitic acid, non-dissociative polymers such as polyethylene glycol, polyvinyl alcohol and polyvinylpyrrolidone, the polyacetal carboxylic acid polymer disclosed in Japanese Patent Laid-Open No. 54-52196, salts of organic acid such as diglycollate and oxycarboxylate, and other builders and divalent metal ion sequestering agents; alkali agents or inorganic electrolytes such as silicates, carbonates and sulfates; and re-contamination inhibitors such as the layered silicate described in Japanese Patent Laid-Open No. 60-227895, polyvinylpyrrolidone and carboxymethyl cellulose.

The detergent composition of the present invention may also contain caking inhibitors such as p-toluenesulfonates, sulfosuccinates, talc and calcium silicate, antioxidants such as tertiary butylhydroxytoluene and distyrenated cresol, blueing agents, flavoring agents and other substances, all of which may be added according to purposes of use without limitations.

The detergent compositions of the present invention containing each of the components described above may be produced by any of the conventionally known methods without limitation.

Examples of the methods for producing the high density detergent include those disclosed in Japanese Patent Laid-Open Nos. 61-69897, 61-69899 and 61-69900 and EP Publication No. 513824A.

Although the detergent compositions of the present invention can be used without particular restriction, they may be used as clothes detergents, softeners, tableware detergents, house detergents used for floor cleaning and bathroom cleaning, toothpastes, body detergents and metalware detergents.

The inorganic ion exchange material of the present invention is excellent in both cationic exchange capacity and anti-solubility, making it useful to be used for a water softener and alkalinity regulator in detergents.

The detergent composition of the present invention contains an inorganic ion exchange material which has anti-solubility as well as excellent ion exchange capacity and alkaline capacity, thereby offering excellent washing effects and is suitable for the concentration of detergent. The detergent composition of the present invention is also excellent in washing power for dirt.

Moreover, the detergent composition of the present invention is excellent in washing power for dirt caused by fatty acids and change in solubility with time owing to the containing of a porous oil-absorbing carrier.

Also, the detergent composition of the present invention offers high bleaching rates by fully utilizing the performance of an oxygen-based bleaching agent when it is contained therein.

EXAMPLES

The present invention will be further described by means of the following working examples, comparative examples, detergent compositions, comparative detergent compositions and test examples, without intending to restrict the scope of the present invention thereto.

The measurements shown in Examples and Comparative Examples are obtained as follows:

(1) Cationic exchange capacity

A 0.1 g sample is accurately weighed and added to 100 ml of a calcium chloride aqueous solution (500 ppm concentration, when calculated as $CaCO_3$), followed by stirring at 25° C. for 60 minutes, after which the mixture is filtered using Membrane Filter (made of nitrocellulose; manufactured by Advantech) of 0.2 $\mu$m pore size. 10 ml of the filtrate is assayed for Ca content by an EDTA titration, and the calcium ion exchange capacity (cationic exchange capacity) of the sample is calculated from the titer. When a cationic exchange capacity is not less than 500 $CaCO_3$mg/g, the amount of the calcium chloride aqueous solution is changed from 100 ml to 200 ml.

(2) Amount of Si dissolved

A 2 g sample is added to 100 g of ion exchanged water, followed by stirring at 25° C. for 30 minutes. Centrifugation is then conducted, and the supernatant is filtered through Membrane Filter of 0.2 $\mu$m pore size. The Si concentration in the filtrate is determined by inductively coupled plasma (ICP) emission analysis, and the amount of Si dissolved is calculated when calculated as $SiO_2$.

(3) X-ray diffraction peak intensity ratio

Figure 3:
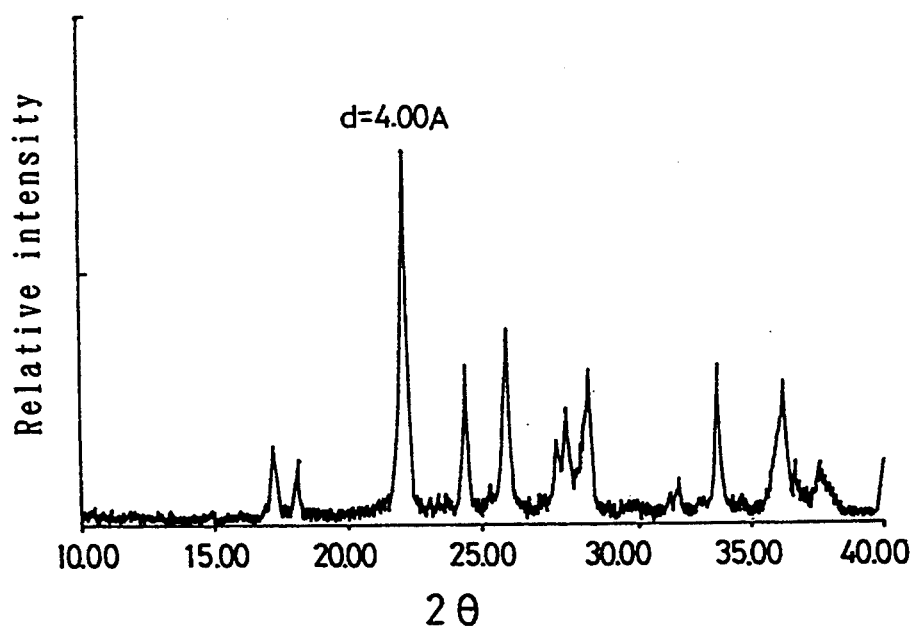
FIG. 3 is an X-ray diffraction pattern obtained by X-ray diffraction analysis of the inorganic ion exchange material obtained in Comparative Example 6.

The analysis by X-ray diffraction is conducted using an X-ray diffractometer (Model RAD-200 manufactured by Rigaku Industrial Corporation; $CuK\alpha$ beam, 40 kV, 80 mA). The intensity of diffraction peaks corresponding to d=2.84 ±0.05 Å and d=4.00±0.05 Å (at $2\theta=31.5\pm1°$ and $2\theta=22.5\pm1°$) is measured, and the ratio of the peak intensity ($I_{d=2.84}/I_{d=4.00}$) is calculated. The X-ray diffraction pattern of the inorganic ion exchange material 107 obtained in Example 107 is shown in FIG. 2, and the X-ray diffraction pattern of the comparative ion exchange material powder 6 obtained in Comparative Example 6 is shown in FIG. 3.

(4) Raman peak relative intensity ratio

Figure 6:
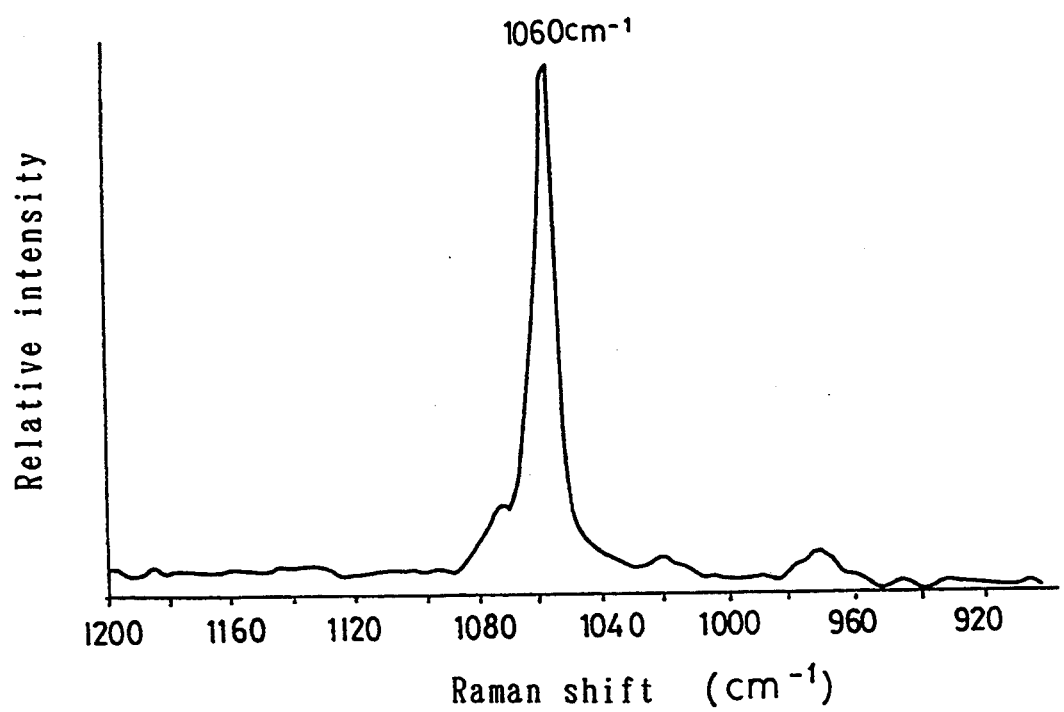
FIG. 6 is a Raman spectrum obtained by Raman spectrometry measurement of the inorganic ion exchange material obtained in Comparative Example 6.

In the Raman scattering spectrometry obtained by using the Fourier transform Raman spectrophotometer JSR-FT6500 model (manufactured by JEOL Ltd.; excitation light source: YAG laser; wavelength: 1064 nm; detector: InGaAs type; resolution: wavenumber=2 $cm^{-1}$, integrated frequency=500), the $Q_2/Q_3$ Raman peak strength ratio (Examples 1 to 38, Comparative Examples 1 to 5) is calculated by determining the scattering strength of respective peaks of $Q_2$ and $Q_3$ as the peak top value of the peaks appearing at $970\pm20$ $cm^{-1}$ and $1070\pm30$ $cm^{-1}$. The Raman peak intensity ratio of $Q_2/Q_3$ ($I_{968}/I_{1058}$) is calculated by determining the peak top values of the shift peaks at $968\pm6$ $cm^{-1}$ and at $1058\pm6$ $cm^{-1}$ (Examples 101 to 120, Comparative Examples 6 to 8). Also, the Raman peak intensity ratio ($I_{1078}/I_{1058}$) is calculated by determining the peak top values of the shift peaks at $1078\pm6$ $cm^{-1}$ and at $1058\pm6$ $cm^{-1}$. The Raman spectra of the inorganic ion exchange materials 105 and 106 obtained in Examples 105 and 106 are respectively shown in FIGS. 4 and 5, and the Raman spectra of the comparative ion exchange material powder 6 obtained in Comparative Example 6 is shown in FIG. 6.

EXAMPLE 1

To 100 parts by weight of No. 2 sodium silicate ($SiO_2/Na_2O=2.55$; moisture content: 59.9%), 10.4 parts by weight of sodium hydroxide is added, followed by stirring using a homomixer to dissolve the sodium hydroxide. To this solution, 6.3 parts by weight of finely milled anhydrous calcium carbonate is added, and they are mixed by using a homomixer. A given amount of the mixture is transferred into a nickel crucible and baked in the air at a temperature of 700° C. for 1 hour, followed by rapid cooling. The obtained baked product is milled to yield an inorganic ion exchange material 1 of the present invention. As is seen in Table 1, this powder is found to have a high cationic exchange capacity of 303 $CaCO_3$ mg/g and an excellent anti-solubility of 46.0 $SiO_2$ mg/g as of the amount of Si dissolved.

EXAMPLES 2 THROUGH 6

Inorganic ion exchange materials 2 through 4 are obtained in the same manner as in Example 1 except that the amount of anhydrous calcium carbonate added is changed to provide the compositions shown in Table 1. Also, inorganic ion exchange materials 5 and 6 are obtained in the same manner as in Example 1 except that anhydrous magnesium carbonate is used in the place of the anhydrous calcium carbonate to provide the compositions shown in Table 1. The obtained powders are analyzed for cationic exchange capacity and the amount of Si dissolved. As seen from the results given in Table 1, these powder materials are excellent in both cationic exchange capacity and anti-solubility in the same manner as in the inorganic ion exchange material 1.

EXAMPLE 7

An inorganic ion exchange material 7 is obtained in the same manner as in Example 1 except that No. 1 sodium silicate ($SiO_2/Na_2O=2.14$; moisture content: 44.9%) is used in the place of the No. 2 sodium silicate to provide the composition shown in Table 1. The obtained powder is analyzed for cationic exchange capacity and the amount of Si dissolved. As seen from the results given in Table 1, the powder material is excellent in both cationic exchange capacity and anti-solubility in the same manner as in the inorganic ion exchange material 1.

EXAMPLE 8l

An inorganic ion exchange material 8 is obtained in the same manner as in Example 7 except that anhydrous magnesium carbonate is used in the place of the anhydrous calcium carbonate to provide the composition shown in Table 1. The obtained powder is analyzed for cationic exchange capacity and the amount of Si dissolved. As seen from the results given in Table 1, the powder material is excellent in both cationic exchange capacity and anti-solubility in the same manner as in the inorganic ion exchange material 1.

EXAMPLE 9

To 100 parts by weight of No. 1 sodium silicate powder ($SiO_2/Na_2O = 2.11$; moisture content: 22.1%), 1.8 parts by weight of sodium hydroxide, 0.9 parts by weight of anhydrous calcium carbonate and 1.5 parts by weight of magnesium hydroxide are added, and they are mixed by using a ball-mill. A given amount of the mixture is transferred into a nickel crucible and baked in the air at a temperature of 600° C. for 1 hour, followed by rapid cooling. The obtained baked product is milled to yield an inorganic ion exchange material 9 of the present invention. The obtained powder is analyzed for cationic exchange capacity and the amount of Si dissolved. As seen from the results given in Table 1, the powder material is excellent in both cationic exchange capacity and anti-solubility in the same manner as in the inorganic ion exchange material 1.

EXAMPLE 10

An inorganic ion exchange material 10 is obtained in the same manner as in Example 9 except that the amounts of anhydrous calcium carbonate and magnesium hydroxide added are changed to provide the compositions shown in Table 1. The obtained powder is analyzed for cationic exchange capacity and the amount of Si dissolved. As seen from the results given in Table 1, the powder material is excellent in both cationic exchange capacity and anti-solubility in the same manner as in the inorganic ion exchange material 1.

EXAMPLES 11 THROUGH 13

Inorganic ion exchange materials 11 through 13 are obtained in the same manner as in Example 9 except that 325 mesh-passed silica rock powder ($SiO_2$ purity: 99.9%) and potassium hydroxide are used in the place of the powdery No. 1 sodium silicate and the sodium hydroxide to provide the compositions shown in Table 1. The obtained powders are analyzed for cationic exchange capacity and the amount of Si dissolved. As seen from the results given in Table 1, the powder materials are excellent in both cationic exchange capacity and anti-solubility in the same manner as in the inorganic ion exchange material 1.

EXAMPLES 14 AND 15

Silica rock powder, potassium hydroxide and magnesium hydroxide are mixed in the same manner as in Example 11 to provide the compositions shown in Table 1. This mixture is melted at a temperature of 1300° C. for 8 hours, followed by rapid cooling to obtain cullets. To 1 part by weight of the cullets exceeding 100 mesh, 5 parts by weight of ion exchange water is added, and the mixture is subjected to a hydrothermal treatment at a pressure of 3 kg/cm² for 1 hour using an autoclave to yield water glass. A given amount of each water glass is transferred into a nickel crucible and baked in the air at a temperature of 650° C. for 1 hour, followed by rapid cooling. The obtained baked product is milled to yield the powders of inorganic ion exchange materials 14 and 15 of the present invention. The obtained powders are analyzed for cationic exchange capacity and the amount of Si dissolved. As seen from the results given in Table 1, the powder materials are excellent in both cationic exchange capacity and anti-solubility in the same manner as in the inorganic ion exchange material 1.

EXAMPLES 16 THROUGH 18

Silica sand ($SiO_2$ purity: 99.7%), potassium hydroxide, anhydrous calcium carbonate and magnesium hydroxide are mixed in the same manner as in Example 11 to provide the compositions shown in Table 1. Each of the mixture is melted at a temperature of 1300° C. for 20 hours, followed by rapid cooling to obtain a glassified product (cullets). To 1 part by weight of the 100 mesh-passed cullets, 4 parts by weight of ion exchange water is added, and a given amount of the mixture is transferred into a nickel crucible and baked in the air at a temperature of 600° C. for 2 hours, followed by rapid cooling. The obtained baked product is milled to yield inorganic ion exchange materials 16 through 18 of the present invention. The obtained powders are analyzed for cationic exchange capacity and the amount of Si dissolved. As seen from the results given in Table 1, the powder materials are excellent in both cationic exchange capacity and anti-solubility in the same manner as in the inorganic ion exchange material 1.

EXAMPLES 19 AND 20

Inorganic ion exchange materials 19 and 20 are obtained in the same manner as in Example 1 except that potassium hydroxide is used together with the sodium hydroxide and that anhydrous magnesium carbonate is used together with the anhydrous calcium carbonate to provide the compositions shown in Table 1. The obtained powders are analyzed for cationic exchange capacity and the amount of Si dissolved. As seen from the results given in Table 1, these powder materials are excellent in both cationic exchange capacity and anti-solubility in the same manner as in the inorganic ion exchange material 1.

EXAMPLES 21 AND 22

Inorganic ion exchange materials 21 and 22 are obtained in the same manner as in Example 7 except that potassium hydroxide is used together with the sodium hydroxide and that magnesium hydroxide is used together with the anhydrous calcium carbonate to provide the compositions shown in Table 1. The obtained powders are analyzed for cationic exchange capacity and the amount of Si dissolved. As seen from the results given in Table 1, these powder materials are excellent in both cationic exchange capacity and anti-solubility in the same manner as in the inorganic ion exchange material 1.

EXAMPLES 23 THROUGH 27

Inorganic ion exchange materials 23 through 27 are obtained in the same manner as in Example 9 except that potassium hydroxide is used together with the sodium hydroxide to provide the compositions shown in Table 1. The obtained powders are analyzed for cationic exchange capacity and the amount of Si dissolved. As seen from the results given in Table 1, these powder materials are excellent in both cationic exchange capacity and anti-solubility in the same manner as in the inorganic ion exchange material 1.

EXAMPLES 28 THROUGH 32

Inorganic ion exchange materials 28 through 32 are obtained in the same manner as in Example 14 except that sodium hydroxide is used together with the potassium hydroxide and that anhydrous calcium carbonate and magnesium hydroxide are used together therewith to provide the compositions shown in Table 1. The obtained powders are analyzed for cationic exchange capacity and the amount of Si dissolved. As seen from the results given in Table 1, these powder materials are excellent in both cationic exchange capacity and anti-solubility in the same manner as in the inorganic ion exchange material 1.

EXAMPLES 33 THROUGH 37

Inorganic ion exchange materials 33 through 37 are obtained in the same manner as in Example 16 except that sodium hydroxide is used together with the potassium hydroxide and that anhydrous calcium carbonate and magnesium hydroxide are used together therewith to provide the compositions shown in Table 1. The obtained powders are analyzed for cationic exchange capacity and the amount of Si dissolved. As seen from the results given in Table 1, these powder materials are excellent in both cationic exchange capacity and anti-solubility in the same manner as in the inorganic ion exchange material 1.

FIG. 1 shows the Raman spectrum of the inorganic ion exchange material obtained in Example 35, in comparison with the spectrum of the sodium disilicate ($Na_2Si_2O_5$) obtained in Comparative Example 1 described below. As is clear from FIG. 1(a), the inorganic ion exchange material is a substance having a chain structure by the appearance of the characteristic main scattering peak at $970 \pm 20$ cm$^{-1}$ assigned to the $Q_2$ unit.

EXAMPLE 38

A powder having the composition shown in Table 1 is prepared as an anhydrous product in the same manner as in Example 1. 10 g of the powder is dispersed in 500 ml of an ion exchange water for 1 hour, followed by filtration using a Membrane Filter having a pore size of 0.2 μm. The residue on the filter is dried at a temperature of 100° C. for 16 hours to yield an inorganic ion exchange material 38 in the form of a hydrate. The obtained powder is analyzed for cationic exchange capacity and the amount of Si dissolved. As seen from the results given in Table 1, the powder material is excellent in both cationic exchange capacity and anti-solubility in the same manner as in the inorganic ion exchange material 1.

COMPARATIVE EXAMPLE 1

To 100 parts by weight of No. 2 sodium silicate, 4.2 parts by weight of sodium hydroxide is added, and the sodium hydroxide is dissolved by using a homomixer. A given amount of the solution is transferred into a nickel crucible and baked in the air at a temperature of 700° C. for 1 hour, followed by rapid cooling. The obtained baked product is milled to yield a comparative powder material 1. As is seen in Table 1, although this powder material is found to have a cationic exchange capacity of 224 $CaCO_3$ mg/g, it has a poor anti-solubility of 133 $SiO_2$ mg/g as of the amount of Si dissolved. The reasons for such poor anti-solubility are presumably that although this powder material has sufficient cationic exchange sites, since the Ca or Mg component having a function for the structural stability is not included in the structure thereof, the solubility becomes high.

COMPARATIVE EXAMPLE 2

325 mesh-passed silica rock powder and potassium hydroxide are mixed by a V-type mixer to provide the composition shown in Table 1, and a given amount of the mixture is transferred into a nickel crucible and baked in the air at a temperature of 700° C. for 1 hour, followed by rapid cooling. The obtained baked product is milled to yield a comparative powder material 2. As is seen from Table 1, although this powder material is found to have a cationic exchange capacity of 462 $CaCO_3$ mg/g, it has a poor anti-solubility of 531 $SiO_2$ mg/g as of the amount of Si dissolved for the same reasons as in Comparative Example 1. Therefore, it is insufficient property for a detergent builder.

COMPARATIVE EXAMPLE 3

To an aqueous solution of No. 2 sodium silicate, potassium hydroxide is added to provide the composition shown in Table 1, and a given amount of the mixture is transferred into a nickel crucible and baked in the air at a temperature of 650° C. for 1 hour, followed by rapid cooling. The obtained baked product is milled to yield a comparative powder material 3. As is seen in Table 1, although this powder material is found to have a cationic exchange capacity of 399 $CaCO_3$ mg/g, it has a poor anti-solubility of 309 $SiO_2$ mg/g as of the amount of Si dissolved for the same reasons as in Comparative Example 1. Therefore, it is insufficient property for a detergent builder.

COMPARATIVE EXAMPLE 4

Slaked lime is mixed in an aqueous solution of No. 2 sodium silicate, and this mixture is subjected to hydrothermal synthesis in an autoclave at a pressure of 9 kg/cm$^2$ for 20 hours to yield a comparative powder material 4 of the composition shown in Table 1. As is seen in Table 1, although this powder is found to be excellent in anti-solubility as demonstrated by the low amount of Si dissolved, it has an insufficient cationic exchange capacity of not more than 200 $CaCO_3$ mg/g. The reasons for such an insufficient cationic exchange capacity are presumable that the Ca or Mg component having a function for the structural stability is excessively included in the structure thereof, resulting in a undesirable decrease in the cationic exchange sites, while remarkably decreasing the amount of Si dissolved.

COMPARATIVE EXAMPLE 5

No. 1 sodium silicate, potassium hydroxide, anhydrous calcium carbonate and magnesium hydroxide are mixed to provide the composition shown in Table 1. A given amount of the mixture is transferred into a nickel crucible and baked in the air at a temperature of 700° C. for 1 hour, followed by rapid cooling. The obtained baked product is milled to yield a comparative powder material 5. As is seen in Table 1, although this powder is found to be excellent in anti-solubility as demonstrated by the low amount of Si dissolved, it has an insufficient cationic exchange capacity of not more than 200 $CaCO_3$ mg/g for the same reasons as in Comparative Example 4.

TABLE 1

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $M_2O$ | $Na_2O$ | $Na_2O$ | $Na_2O$ | $Na_2O$ | $Na_2O$ | $Na_2O$ | $Na_2O$ | $Na_2O$ | $Na_2O$ | $Na_2O$ | $K_2O$ | $K_2O$ |

TABLE 1-continued

| K/Na | — | — | — | — | — | — | — | — | — | — | — | — |
|---|---|---|---|---|---|---|---|---|---|---|---|---|
| y/x | 1.50 | 1.70 | 2.00 | 1.00 | 1.00 | 1.20 | 1.80 | 1.60 | 2.00 | 1.75 | 2.00 | 1.00 |
| M'O | CaO | CaO | CaO | CaO | MgO | MgO | CaO | MgO | CaO.MgO | CaO.MgO | CaO | CaO |
| z/x | 0.20 | 0.40 | 0.20 | 0.30 | 0.20 | 0.30 | 0.03 | 0.01 | 0.08 | 0.008 | 0.10 | 0.10 |
| Mg/Ca | — | — | — | — | — | — | — | — | 3.00 | 0.75 | — | — |
| Cationic Exchange Capacity ($CaCO_3$ mg/g) | 303 | 222 | 243 | 264 | 418 | 258 | 251 | 321 | 242 | 299 | 252 | 450 |
| Amount of Si Dissolved ($SiO_2$ mg/g) | 46.0 | 14.1 | 19.7 | 59.1 | 68.8 | 44.6 | 91.1 | 96.5 | 87.4 | 105 | 49.4 | 90.4 |
| $Q_2/Q_3$ Raman Peak Strength Ratio | 7.69 | 0.17 | 0.12 | 6.67 | $Q_3 = 0$ | 8.33 | 0.14 | 0.50 | 0.11 | 0.17 | 0.12 | 7.14 |

| | Example No. | | | | | | | | | |
|---|---|---|---|---|---|---|---|---|---|---|
| | 13 | 14 | 15 | 16 | 17 | 18 | 19 | 20 | 21 | 22 |
| $M_2O$ | $K_2O$ | $K_2O$ | $K_2O$ | $K_2O$ | $K_2O$ | $K_2O$ | $Na_2O.K_2O$ | $Na_2O.K_2O$ | $Na_2O.K_2O$ | $Na_2O.K_2O$ |
| K/Na | — | — | — | — | — | — | 0.50 | 0.25 | 1.00 | 1.03 |
| y/x | 1.70 | 1.50 | 1.20 | 1.50 | 1.00 | 1.25 | 1.25 | 1.70 | 1.00 | 1.50 |
| M'O | MgO | MgO | MgO | CaO | CaO.MgO | CaO.MgO | CaO | MgO | CaO.MgO | CaO.MgO |
| z/x | 0.20 | 0.30 | 0.30 | 0.008 | 0.06 | 0.75 | 0.40 | 0.02 | 0.16 | 0.05 |
| Mg/Ca | — | — | — | — | 1.00 | 2.00 | — | — | 0.25 | 0.50 |
| Cationic Exchange Capacity ($CaCO_3$ mg/g) | 253 | 242 | 247 | 318 | 249 | 287 | 269 | 307 | 351 | 326 |
| Amount of Si Dissolved ($SiO_2$ mg/g) | 44.9 | 33.3 | 45.0 | 111 | 86.4 | 10.5 | 20.3 | 89.7 | 50.4 | 44.4 |
| $Q_2/Q_3$ Raman Peak Strength Ratio | 0.18 | 0.68 | 4.76 | 0.39 | 1.27 | 0.53 | 0.90 | 0.30 | 5.26 | 0.92 |

| | Example No. | | | | | | |
|---|---|---|---|---|---|---|---|
| | 23 | 24 | 25 | 26 | 27 | 28 | 29 |
| $M_2O$ | $Na_2O.K_2O$ | $Na_2O.K_2O$ | $Na_2O.K_2O$ | $Na_2O.K_2O$ | $Na_2O.K_2O$ | $Na_2O.K_2O$ | $Na_2O.K_2O$ |
| K/Na | 0.05 | 4.00 | 0.25 | 1.25 | 0.10 | 2.00 | 0.80 |
| y/x | 0.80 | 2.00 | 1.80 | 1.50 | 1.25 | 1.75 | 1.25 |
| M'O | CaO | MgO | CaO.MgO | CaO.MgO | CaO.MgO | CaO | MgO |
| z/x | 0.80 | 0.04 | 0.40 | 0.15 | 0.35 | 0.01 | 0.22 |
| Mg/Ca | — | — | 0.33 | 3.00 | 0.10 | — | — |
| Cationic Exchange Capacity ($CaCO_3$ mg/g) | 216 | 307 | 277 | 265 | 311 | 333 | 301 |
| Amount of Si Dissolved ($SiO_2$ mg/g) | 18.3 | 88.8 | 20.4 | 60.0 | 18.8 | 98.3 | 20.6 |
| $Q_2/Q_3$ Raman Peak Strength Ratio | $Q_3 = 0$ | 0.12 | 0.17 | 0.34 | 3.57 | 0.16 | 1.89 |

| | Example No. | | | | | | |
|---|---|---|---|---|---|---|---|
| | 30 | 31 | 32 | 33 | 34 | 35 | 36 |
| $M_2O$ | $Na_2O.K_2O$ | $Na_2O.K_2O$ | $Na_2O.K_2O$ | $Na_2O.K_2O$ | $Na_2O.K_2O$ | $Na_2O.K_2O$ | $Na_2O.K_2O$ |
| K/Na | 0.08 | 0.06 | 0.10 | 2.50 | 1.50 | 0.10 | 2.00 |
| y/x | 1.50 | 1.75 | 2.00 | 2.00 | 1.50 | 1.75 | 1.25 |
| M'O | CaO.MgO | CaO.MgO | CaO.MgO | CaO | MgO | CaO.MgO | CaO.MgO |
| z/x | 0.08 | 0.03 | 0.006 | 0.20 | 0.12 | 0.006 | 0.35 |
| Mg/Ca | 4.00 | 0.25 | 0.20 | — | — | 0.05 | 0.40 |
| Cationic Exchange Capacity ($CaCO_3$ mg/g) | 312 | 300 | 248 | 348 | 299 | 333 | 291 |
| Amount of Si Dissolved ($SiO_2$ mg/g) | 64.4 | 90.0 | 106 | 52.1 | 61.2 | 110 | 28.3 |
| $Q_2/Q_3$ Raman Peak Strength Ratio | 0.85 | 0.19 | 0.13 | 0.11 | 0.61 | 0.42 | 3.23 |

| | Example No. | | Comparative Example No. | | | | |
|---|---|---|---|---|---|---|---|
| | 37 | 38 | 1 | 2 | 3 | 4 | 5 |
| $M_2O$ | $Na_2O.K_2O$ | $Na_2O.H_2O$ | $Na_2O$ | $K_2O$ | $Na_2O.K_2O$ | $Na_2O$ | $Na_2O.K_2O$ |
| K/Na | 3.25 | H/Na = 1 | — | — | 0.50 | — | 0.12 |
| y/x | 1.60 | 1.00 | 2.00 | 1.00 | 1.00 | 4.00 | 1.50 |
| M'O | CaO.MgO | CaO | — | — | — | CaO | CaO.MgO |
| z/x | 0.18 | 0.50 | — | — | — | 1.50 | 1.50 |
| Mg/Ca | 1.25 | — | — | — | — | — | 1.00 |
| Cationic Exchange Capacity ($CaCO_3$ mg/g) | 303 | 230 | 224 | 462 | 399 | 175 | 154 |
| Amount of Si Dissolved ($SiO_2$ mg/g) | 59.8 | 55.5 | 133 | 531 | 309 | 4.8 | 7.3 |
| $Q_2/Q_3$ Raman | 0.21 | 3.70 | 0.07 | — | — | 0.01 | — |

TABLE 1-continued

Peak Strength Ratio

Examples of Detergent Compositions:

Detergent Compositions 1—1 through 1-73

The synthesized inorganic ion exchange materials A through G obtained in the above Examples are used to prepare the detergent compositions of the present invention having the compositions shown in Tables 2 through 8 by the method described below. The synthesized inorganic ion exchange materials A through G are, respectively, the synthesized inorganic ion exchange materials obtained in Examples 3, 35, 31, 34, 5, 12 and 38.

Specifically, for Detergent Compositions 1—1 through 1-14, the components other than the synthesized inorganic ion exchange material are prepared as an aqueous slurry of 60% solid content, which is spray dried to yield grains, in which inorganic ion exchange material powder is mixed. For Detergent Compositions 1-15 through 1-25 and Detergent Compositions 1-39 through 1-68, the components other than the inorganic ion exchange material are prepared as a slurry of 60% solid content, which is spray dried to yield grains, which are granulated in the presence of a corresponding amount of inorganic ion exchange material powder in a mixer granulator. For Detergent Compositions 1-26 through 1-38 and Detergent Compositions 1-69 through 1-73, the starting material powder is placed in a tumbling mixer granulator and subjected to mixing granulation while gradually introducing a liquid nonionic surfactant.

Powdery detergent compositions of average grain size of 200 to 500 μm are thus obtained.

Comparative Detergent Compositions 1—1 through 1-10

The detergent compositions having the compositions shown in Tables 2 through 6 are prepared in the same manner as in Detergent Compositions except that Zeolite 4A is used in place of the synthesized inorganic ion exchange material powder, or that the synthesized inorganic ion exchange material powder is omitted.

Comparative Detergent Compositions 1-11 and 1-12

The detergent compositions having the compositions shown in Table 7 are prepared in the same manner as in Detergent Compositions 1-46 through 1-68 except that Zeolite 4A or trisodium citrate, dihydrate is used in place of the synthesized inorganic ion exchange material powder and that the amount of each component is adjusted so as to give a pH equivalent to those of Detergent Compositions 1-46 through 1-68.

Comparative Detergent Compositions 1-13 and 1-14

The detergent compositions having the compositions shown in Table 8 are prepared in the same manner as in Detergent Compositions 1-69 through 1-73 except that Zeolite 4A or trisodium citrate, dihydrate is used in the place of the synthesized inorganic ion exchange material powder and that the amount of each component is adjusted so as to give a pH equivalent to those of Detergent Compositions 1-69 through 1-73.

Test Example 1

Detergent Compositions 1—1 through 1-14 and Comparative Detergent Compositions 1—1 and 1-2 are used to carry out a deterging test under the following conditions:

(Preparation of Artificially Stained Cloth)

Cotton test pieces of 10 cm × 10 cm stained with oil and fat having the following compositions and trace amounts of carbon black are prepared.

| | |
|---|---|
| Cotton seed oil | 60% |
| Cholesterol | 10% |
| Oleic acid | 10% |
| Palmitic acid | 10% |
| Liquid and solid paraffins | 10% |

(Deterging Conditions)

Washing is carried out using a twin tub type washing machine ("Ginga," manufactured by Toshiba Corporation) by washing at a temperature of 20° C. for 10 minutes in 3° DH (Ca/Mg=3/1) water having a detergent concentration of 0.133%; rinsing with running water for 8 minutes.

(Calculation of Deterging Rate)

Reflectivities of the original cloth before the washing and those of the stained cloth before and after the washing are measured at 550 mμ by means of an automatic recording colorimeter (manufactured by Shimadzu Corporation), and the deterging rate D(%) is calculated by the following equation. The results thereof are shown in Table 2.

$$D=(L_2-L_1)/(L_0-L_1)\times 100(\%)$$

wherein $L_0$: Reflectivity of the original cloth; $L_1$: Reflectivity of the stained cloth before washing; and $L_2$: Reflectivity of the stained cloth after washing.

TABLE 2

| | Detergent Composition 1- | | | | | | | | | | | | | | | Comparative Detergent Composition | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1-1 | 1-2 |
| LAS-Na(C12–14) | 16 | 16 | 16 | — | — | 16 | 16 | 16 | 16 | 16 | 16 | 16 | 16 | 16 | 16 | 16 |
| AS-Na (C12–18) | 6 | — | — | — | — | 6 | 6 | 6 | 6 | 6 | 6 | 6 | 6 | 6 | 6 | 6 |
| AOS-Na(C12–18) | — | 6 | — | — | 11 | — | — | — | — | — | — | — | — | — | — | — |
| α-SFE-Na(C14–18) | — | — | 6 | 22 | 11 | — | — | — | — | — | — | — | — | — | — | — |
| Sodium tripolyphosphate | — | — | — | — | — | — | — | — | — | — | — | 10 | — | — | — | — |
| Zeolite 4A | — | — | — | — | — | — | — | — | — | — | — | — | 10 | — | 20 | — |
| Trisodium citrate.2H₂O | — | — | — | — | — | — | — | — | — | — | — | — | — | 10 | — | — |
| Sodium carbonate | 17 | 17 | 17 | 23 | 17 | 17 | 17 | 17 | 17 | 17 | 17 | 17 | 17 | 17 | 17 | 17 |
| Sodium silicate (JIS No. 2) | 6 | 6 | 6 | — | 6 | 6 | 6 | 6 | 6 | 6 | 6 | 6 | 6 | 6 | 6 | 6 |
| Sodium sulfate | Bal. | Bal. | Bal. | Bal. | Bal. | Bal. | Bal. | Bal. | Bal. | Bal. | Bal. | Bal. | Bal. | Bal. | Bal. | Bal. |

TABLE 2-continued

|  | Detergent Composition 1- | | | | | | | | | | | | | | Comparative Detergent Composition | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1-1 | 1-2 |
| CMC-Na | 2 | 2 | 2 | 2 | 2 | 2 | 2 | 2 | 2 | 2 | 2 | 2 | 2 | 2 | 2 | 2 |
| Water | 5 | 5 | 5 | 5 | 5 | 5 | 5 | 5 | 5 | 5 | 5 | 5 | 5 | 5 | 5 | 5 |
| Ion Exchange Material A | 20 | 20 | 20 | 20 | 20 | — | — | — | — | — | — | 10 | — | — | — | — |
| Ion Exchange Material B | — | — | — | — | — | 20 | — | — | — | — | — | — | — | — | — | — |
| Ion Exchange Material C | — | — | — | — | — | — | 20 | — | — | — | — | — | — | — | — | — |
| Ion Exchange Material D | — | — | — | — | — | — | — | 20 | — | — | — | — | — | — | — | — |
| Ion Exchange Material E | — | — | — | — | — | — | — | — | 20 | — | — | — | 10 | — | — | — |
| Ion Exchange Material F | — | — | — | — | — | — | — | — | — | 20 | — | — | — | 10 | — | — |
| Ion Exchange Material G | — | — | — | — | — | — | — | — | — | — | 20 | — | — | — | — | — |
| Deterging Rate (%) | 65.2 | 64.0 | 63.3 | 60.1 | 62.0 | 66.8 | 68.3 | 64.3 | 66.0 | 64.0 | 63.8 | 67.0 | 65.5 | 65.8 | 65.0 | 49.8 |

Incidentally, the abbreviations used in Table 2 and hereinafter are as follows:

LAS-Na: Sodium linear alkylbenzene sulfonate;
AS-Na: Sodium alkyl sulfate;
AOS-Na: Sodium α-olefinsulfonate;
AOS-K: Potassium α-olefinsulfonate;
α-SFE-Na: α-Sulfofatty acid methyl ester sodium salt;
CMC-Na: Carboxymethylcellulose sodium salt;
ES-Na: Sodium alkyl ether sulfate;
TAED: Tetraacetylethylenediamine; and
Bal.: Balance.

Test Example 2

The washing test is carried out in the same manner as in Test Example 1 except Detergent Compositions 1-15 through 1-25 and Comparative Detergent Compositions 1-3 and 1-4 are used, and that the deterging conditions are changed as shown below:

(Deterging Conditions)

Washing is carried out using a fully automatic washing machine ("Aisaigo," manufactured by Matsushita Electric Industrial Co., Ltd.) by washing in a standard cycle at a temperature of 20° C. in 3.5° DH (Ca/Mg=3/1) water having a detergent concentration of 0.0833%. The results thereof are shown together in Table 3.

TABLE 3

|  | Detergent Composition 1- | | | | | | | | | | | Comparative Detergent Composition | |
|---|---|---|---|---|---|---|---|---|---|---|---|---|---|
|  | 15 | 16 | 17 | 18 | 19 | 20 | 21 | 22 | 23 | 24 | 25 | 1-3 | 1-4 |
| LAS-Na(C12–14) | 25 | 16 | 20 | 25 | 25 | 25 | 25 | 25 | 25 | 25 | 25 | 25 | 25 |
| AS-Na (C10–18) | 7 | — | 7 | 7 | 7 | 7 | 7 | 7 | 7 | 7 | 7 | 7 | 7 |
| AOS-K (C14–18) | — | 16 | — | — | — | — | — | — | — | — | — | — | — |
| Soap (C12–18) | 3 | 3 | 3 | 3 | 3 | 3 | 3 | 3 | 3 | 3 | 3 | 3 | 3 |
| Zeolite 4A | — | — | — | — | — | — | — | — | — | 20 | — | 30 | — |
| Trisodium citrate.2H$_2$O | — | — | — | — | — | — | — | — | — | — | 10 | — | — |
| Sodium carbonate | Bal. | Bal. | Bal. | Bal. | Bal. | Bal. | Bal. | Bal. | Bal. | Bal. | Bal. | Bal. | Bal. |
| Potassium carbonate | — | 4 | — | — | — | — | — | — | — | — | — | — | — |
| Polyethylene glycol | 1 | 2 | 2 | 1 | 1 | 1 | 1 | 1 | 1 | 1 | 1 | 1 | 1 |
| Sodium polyacrylate | 4 | 0 | 4 | 4 | 4 | 4 | 4 | 4 | 4 | 4 | 4 | 4 | 4 |
| Water | 5 | 5 | 5 | 5 | 5 | 5 | 5 | 5 | 5 | 5 | 5 | 5 | 5 |
| Ion Exchange Material A | 30 | 30 | 30 | — | — | — | — | — | — | 10 | 20 | — | — |
| Ion Exchange Material B | — | — | — | 30 | — | — | — | — | — | — | — | — | — |
| Ion Exchange Material C | — | — | — | — | 30 | — | — | — | — | — | — | — | — |
| Ion Exchange Material D | — | — | — | — | — | 30 | — | — | — | — | — | — | — |
| Ion Exchange Material E | — | — | — | — | — | — | 30 | — | — | — | — | — | — |
| Ion Exchange Material F | — | — | — | — | — | — | — | 30 | — | — | — | — | — |
| Ion Exchange Material G | — | — | — | — | — | — | — | — | 30 | — | — | — | — |
| Deterging Rate (%) | 68.2 | 62.2 | 62.0 | 68.1 | 67.6 | 65.1 | 67.0 | 66.6 | 64.8 | 68.2 | 66.7 | 67.1 | 52.0 |

Test Example 3

The washing test is carried out in the same manner as in Test Example 1 except that Detergent Compositions 1-26 through 1-38 and Comparative Detergent Compositions 1-5 and 1-6 are used, and that the deterging conditions are changed as shown below:

(Deterging Conditions)

Washing is carried out using a Turgotometer by washing at a rotational speed of 100 rpm, at a temperature of 20° C. for 10 minutes in 3° DH (Ca/Mg=3/1) water having a detergent concentration of 0.0833%. The results thereof are shown together in Table 4.

TABLE 4

|  | Detergent Composition 1- | | | | | | | | | | | | | Comparative Detergent Composition | |
|---|---|---|---|---|---|---|---|---|---|---|---|---|---|---|---|
|  | 26 | 27 | 28 | 29 | 30 | 31 | 32 | 33 | 34 | 35 | 36 | 37 | 38 | 1-5 | 1-6 |
| Polyoxyethylene primary alcohol C12 alkyl ether EOp = 8 | 25 | — | — | — | 25 | 25 | 25 | 25 | 25 | 25 | 25 | 25 | 25 | 25 | 25 |
| Polyoxyethylene secondary alcohol C12–14 alkyl ether EOp = 7 | — | 10 | 30 | 20 | — | — | — | — | — | — | — | — | — | — | — |

TABLE 4-continued

|  | Detergent Composition 1- | | | | | | | | | | | | | Comparative Detergent Composition | |
|---|---|---|---|---|---|---|---|---|---|---|---|---|---|---|---|
|  | 26 | 27 | 28 | 29 | 30 | 31 | 32 | 33 | 34 | 35 | 36 | 37 | 38 | 1-5 | 1-6 |
| Fatty acid diethanolamide (C12-16) | — | — | — | 5 | — | — | — | — | — | — | — | — | — | — | — |
| Zeolite 4A | — | — | — | — | — | — | — | — | — | — | 10 | — | — | 35 | — |
| Sodium tripolyphosphate | — | — | — | — | — | — | — | — | — | — | — | 10 | — | — | — |
| Trisodium citrate.2H$_2$O | — | — | — | — | — | — | — | — | — | — | — | — | 20 | — | — |
| Sodium carbonate | Bal. | Bal. | Bal. | Bal. | Bal. | Bal. | Bal. | Bal. | Bal. | Bal. | Bal. | Bal. | Bal. | Bal. | Bal. |
| Amorphous silica | 10 | 4 | 20 | 10 | 10 | 10 | 10 | 10 | 10 | 10 | 10 | 10 | 10 | 10 | 10 |
| CMC-Na | 2 | 2 | 2 | 2 | 2 | 2 | 2 | 2 | 2 | 2 | 2 | 2 | 2 | 2 | 2 |
| Water | 5 | 5 | 5 | 5 | 5 | 5 | 5 | 5 | 5 | 5 | 5 | 5 | 5 | 5 | 5 |
| Ion Exchange Material A | 35 | 50 | 25 | 35 | — | — | — | — | — | — | 20 | 20 | 10 | — | — |
| Ion Exchange Material B | — | — | — | — | 35 | — | — | — | — | — | — | — | — | — | — |
| Ion Exchange Material C | — | — | — | — | — | 35 | — | — | — | — | — | — | — | — | — |
| Ion Exchange Material D | — | — | — | — | — | — | 35 | — | — | — | — | — | — | — | — |
| Ion Exchange Material E | — | — | — | — | — | — | — | 35 | — | — | — | — | — | — | — |
| Ion Exchange Material F | — | — | — | — | — | — | — | — | 35 | — | — | — | — | — | — |
| Ion Exchange Material G | — | — | — | — | — | — | — | — | — | 35 | — | — | — | — | — |
| Deterging Rate (%) | 69.0 | 60.2 | 69.2 | 67.0 | 69.3 | 68.5 | 65.7 | 69.8 | 66.2 | 64.3 | 68.8 | 68.0 | 66.7 | 68.7 | 56.0 |

Test Example 4

The washing test is carried out in the same manner as in Test Example 1 except that Detergent Compositions 1-39 through 1-49 and Comparative Detergent Compositions 1-7 and 1-8 are used, and that the deterring conditions are changed as shown below:

(Deterging Conditions)

Washing is carried out using a fully automatic washing machine ("Model LA5580XT," manufactured by Whirlpool, U.S.A.) by washing in a standard cycle at a temperature of 35° C. in 8° DH (Ca/Mg=2/1) water having a detergent concentration of 0.1%. The results thereof are shown together in Table 5.

Test Example 5

The washing test is carried out in the same manner as in Test Example 1 except that Detergent Compositions 1-50 through 1-60 and Comparative Detergent Compositions 1-9 and 1-10 are used, and that the deterging conditions are changed as shown below:

(Deterging Conditions)

Washing is carried out using a fully automatic washing machine ("WFK4000," manufactured by Bosch, drumtype) by washing in a standard cycle at a temperature of 60° C. in 16° DH (Ca/Mg=2/1) water having a detergent concentration of 0.8%. The results thereof are shown together in Table 6.

TABLE 5

|  | Detergent Composition 1- | | | | | | | | | | | Comparative Detergent Composition | |
|---|---|---|---|---|---|---|---|---|---|---|---|---|---|
|  | 39 | 40 | 41 | 42 | 43 | 44 | 45 | 46 | 47 | 48 | 49 | 1-7 | 1-8 |
| LAS-Na(C12-14) | 13 | 10 | 13 | 13 | 13 | 13 | 13 | 13 | 13 | 13 | 13 | 13 | 13 |
| AS-Na (C10-18) | 5 | — | 5 | 5 | 5 | 5 | 5 | 5 | 5 | 5 | 5 | 5 | 5 |
| ES-Na(C10-18 EOp = 2) | — | 5 | — | — | — | — | — | — | — | — | — | — | — |
| Soap (C12-18) | 1 | 1 | 1 | 1 | 1 | 1 | 1 | 1 | 1 | 1 | 1 | 1 | 1 |
| Polyoxyethylene alkyl ether C12-15 EOp = 8 | 2 | 5 | 2 | 2 | 2 | 2 | 2 | 2 | 2 | 2 | 2 | 2 | 2 |
| Zeolite 4A | — | — | — | — | — | — | — | — | 20 | — | — | 40 | — |
| Sodium tripolyphosphate | — | — | — | — | — | — | — | — | — | 20 | — | — | — |
| Trisodium citrate.2H$_2$O | — | — | — | — | — | — | — | — | — | — | 20 | — | — |
| Sodium carbonate | Bal. | Bal. | Bal. | Bal. | Bal. | Bal. | Bal. | Bal. | Bal. | Bal. | Bal. | Bal. | Bal. |
| Sodium silicate (JIS No. 1) | 3 | 3 | 3 | 3 | 3 | 3 | 3 | 3 | 3 | 3 | 3 | 3 | 3 |
| Water | 5 | 5 | 5 | 5 | 5 | 5 | 5 | 5 | 5 | 5 | 5 | 5 | 5 |
| Ion Exchange Material A | 40 | 40 | — | — | — | — | — | — | 20 | 20 | 20 | — | — |
| Ion Exchange Material B | — | — | 40 | — | — | — | — | — | — | — | — | — | — |
| Ion EKehange Material C | — | — | — | 40 | — | — | — | — | — | — | — | — | — |
| Ion Exchange Material D | — | — | — | — | 40 | — | — | — | — | — | — | — | — |
| Ion Exchange Material E | — | — | — | — | — | 40 | — | — | — | — | — | — | — |
| Ion Exchange Material F | — | — | — | — | — | — | 40 | — | — | — | — | — | — |
| Ion Exchange Material G | — | — | — | — | — | — | — | 40 | — | — | — | — | — |
| Deterging Rate (%) | 71.0 | 72.0 | 73.3 | 71.7 | 69.9 | 72.1 | 70.3 | 69.2 | 72.0 | 72.7 | 70.8 | 70.6 | 62.0 |

TABLE 6

|  | Detergent Composition 1- | | | | | | | | | | | Comparative Detergent Composition | |
|---|---|---|---|---|---|---|---|---|---|---|---|---|---|
|  | 50 | 51 | 52 | 53 | 54 | 55 | 56 | 57 | 58 | 59 | 60 | 1-9 | 1-10 |
| LAS (C12-15) | 8.0 | 8.0 | 8.0 | 8.0 | 8.0 | 8.0 | 8.0 | 8.0 | 8.0 | 8.0 | 8.0 | 8.0 | 8.0 |
| Polyoxyethylene alkyl ether (C12-18 EOp = 20) | 5.0 | 5.0 | 5.0 | 5.0 | 5.0 | 5.0 | 5.0 | 5.0 | 5.0 | 5.0 | 5.0 | 5.0 | 5.0 |
| Soap (C12-18) | 1.0 | 1.0 | 1.0 | 1.0 | 1.0 | 1.0 | 1.0 | 1.0 | 1.0 | 1.0 | 1.0 | 1.0 | 1.0 |
| Sodium tripolyphosphate | — | — | — | — | — | — | — | 30 | 15 | — | — | 35 | — |
| Zeolite 4A | — | — | — | — | — | — | — | — | — | 15 | — | — | — |

TABLE 6-continued

|  | Detergent Composition 1- | | | | | | | | | | | Comparative Detergent Composition | |
|---|---|---|---|---|---|---|---|---|---|---|---|---|---|
|  | 50 | 51 | 52 | 53 | 54 | 55 | 56 | 57 | 58 | 59 | 60 | 1-9 | 1-10 |
| NTA 3Na | — | — | — | — | — | — | — | — | — | — | 15 | — | — |
| Sodium carbonate | Bal. | Bal. | Bal. | Bal. | Bal. | Bal. | Bal. | Bal. | Bal. | Bal. | Bal. | Bal. | Bal. |
| Sodium silicate | 3 | 3 | 3 | 3 | 3 | 3 | 3 | 3 | 3 | 3 | 3 | 3 | 3 |
| Sodium sulfate | 3 | 3 | 3 | 3 | 3 | 3 | 3 | 3 | 3 | 3 | 3 | 3 | 3 |
| CMC-Na | 1 | 1 | 1 | 1 | 1 | 1 | 1 | 1 | 1 | 1 | 1 | 1 | 1 |
| PB.4H$_2$O | 18 | 18 | 18 | 18 | 18 | 18 | 18 | 18 | 18 | 18 | 18 | 18 | 18 |
| TAED | 2 | 2 | 2 | 2 | 2 | 2 | 2 | 2 | 2 | 2 | 2 | 2 | 2 |
| Water | 5 | 5 | 5 | 5 | 5 | 5 | 5 | 5 | 5 | 5 | 5 | 5 | 5 |
| Ion Exchange Material A | 35 | — | — | — | — | — | — | 5 | 20 | 20 | 20 | — | — |
| Ion Exchange Material B | — | 35 | — | — | — | — | — | — | — | — | — | — | — |
| Ion Exchange Material C | — | — | 35 | — | — | — | — | — | — | — | — | — | — |
| Ion Exchange Material D | — | — | — | 35 | — | — | — | — | — | — | — | — | — |
| Ion Exchange Material E | — | — | — | — | 35 | — | — | — | — | — | — | — | — |
| Ion Exchange Material F | — | — | — | — | — | 35 | — | — | — | — | — | — | — |
| Dterging Rate (%) | 70.5 | 71.8 | 70.6 | 69.3 | 72.2 | 70.1 | 69.8 | 71.2 | 71.3 | 70.3 | 70.2 | 53.2 | |

Test Example 6

The washing test is carried out in the same manner as in Test Example 1 except that Detergent Compositions 1-61 through 1-68, Detergent Compositions 1-69 through 1-73 and Comparative Detergent Compositions 1-11 through 1-14 are used. The results thereof are shown together with the total amounts of the detergent composition, the used amounts thereof, the degree of concentration and pHs before and after washing in Tables 7 and 8.

In Table 7, in order to clearly distinguish the differences in composition ratios from Detergent Compositions 1-68 and Comparative Detergent Compositions 1-11 and 1-12, whose total amounts on 100 parts by weight, the total amounts of Detergent Compositions 1-61 through 1-67 are 75 parts by weight.

Similarly, in Table 8, in order to clearly distinguish the differences in composition ratios with Detergent Compositions 1-73 and Comparative Detergent Compositions 1-13 and 1-14, whose total amounts are 100 parts by weight, the total amounts of Detergent Compositions 1-69 through 1-72 are 80 parts by weight.

TABLE 7

|  | Detergent Composition 1- | | | | | | | | Comparative Detergent Composition | |
|---|---|---|---|---|---|---|---|---|---|---|
|  | 61 | 62 | 63 | 64 | 65 | 66 | 67 | 68 | 1-11 | 1-12 |
| LAS-Na (C12-14) | 25 | 25 | 25 | 25 | 25 | 25 | 25 | 25 | 25 | 25 |
| AS-Na (C12-18) | 7 | 7 | 7 | 7 | 7 | 7 | 7 | 7 | 7 | 7 |
| Tallow soap (C12-20) | 3 | 3 | 3 | 3 | 3 | 3 | 3 | 3 | 3 | 3 |
| Zeolite 4A | — | — | — | — | — | — | — | — | 30 | — |
| Trisodium citrate.2H$_2$O | — | — | — | — | — | — | — | — | — | 30 |
| Ion Exchange Material A | 30 | — | — | — | — | — | — | 30 | — | — |
| Ion Exchange Material B | — | 30 | — | — | — | — | — | — | — | — |
| Ion Exchange Material C | — | — | 30 | — | — | — | — | — | — | — |
| Ion Exchange Material D | — | — | — | 30 | — | — | — | — | — | — |
| Ion Exchange Material E | — | — | — | — | 30 | — | — | — | — | — |
| Ion Exchange Material F | — | — | — | — | — | 30 | — | — | — | — |
| Ion Exchange Material G | — | — | — | — | — | — | 30 | — | — | — |
| Sodium carbonate | 4 | 4 | 4 | 4 | 4 | 4 | 4 | 27 | 27 | 27 |
| Sodium silicate (JIS No. 2) | 1 | 1 | 1 | 1 | 1 | 1 | 1 | 3 | 3 | 3 |
| Water | 5 | 5 | 5 | 5 | 5 | 5 | 5 | 5 | 5 | 5 |
| Total Amount | 75 | 75 | 75 | 75 | 75 | 75 | 75 | 100 | 100 | 100 |
| Used Amount g/30 liter | 18.8 | 18.8 | 18.8 | 18.8 | 18.8 | 18.8 | 18.8 | 25 | 25 | 25 |
| Degree of Concentration | 1.33 | 1.33 | 1.33 | 1.33 | 1.33 | 1.33 | 1.33 | 1 | 1 | 1 |
| pH before Washing | 10.8 | 10.8 | 10.8 | 10.9 | 10.8 | 10.7 | 10.7 | 10.8 | 10.6 | 10.6 |
| pH after Washing | 10.2 | 10.4 | 10.4 | 10.4 | 10.2 | 10.2 | 10.2 | 10.3 | 9.9 | 10.0 |
| Deterging Rate (%) | 66.9 | 67.8 | 66.4 | 64.8 | 65.1 | 65.2 | 66.0 | 66.9 | 65.7 | 65.2 |

TABLE 8

|  | Detergent Composition No. 1- | | | | | Comparative Detergent Composition | |
|---|---|---|---|---|---|---|---|
|  | 69 | 70 | 71 | 72 | 73 | 1-13 | 1-14 |
| Polyoxyethylene primary alcohol C12 alkyl ether EOp = 8 | 28 | 25 | — | 28 | 28 | 28 | 28 |
| Polyoxyethylene secondary alcohol C12-14 alkyl ether EOp = 7 | — | — | 28 | — | — | — | — |
| Fatty acid diethanolamide (C12-16) | — | 3 | — | — | — | — | — |

TABLE 8-continued

|  | Detergent Composition No. 1- | | | | | Comparative Detergent Composition | |
|---|---|---|---|---|---|---|---|
|  | 69 | 70 | 71 | 72 | 73 | 1-13 | 1-14 |
| Zeolite 4A | — | — | — | — | — | 20 | — |
| Sodium tripolyphosphate | — | — | — | — | — | — | 20 |
| Trisodium citrate.2H$_2$O | — | — | — | — | — | — | — |
| Sodium carbonate | 5 | 5 | 5 | 5 | 25 | 25 | 25 |
| Amorphous silica | 20 | 20 | 20 | 20 | 20 | 20 | 20 |
| CMC-Na | 2 | 2 | 2 | 2 | 2 | 2 | 2 |
| Water | 5 | 5 | 5 | 5 | 5 | 5 | 5 |
| Ion Exchange Material A | 20 | — | — | — | — | — | — |
| Ion Exchange Material E | — | 20 | — | — | — | — | — |
| Ion Exchange Material F | — | — | 20 | — | — | — | — |
| Ion Exchange Material G | — | — | — | 20 | 20 | — | — |
| Total Amount | 80 | 80 | 80 | 80 | 100 | 100 | 100 |
| Used Amount g/30 liter | 20 | 20 | 20 | 20 | 20 | 25 | 25 |
| Degree of Concentration | 1.25 | 1.25 | 1.25 | 1.25 | 1 | 1 | 1 |
| pH before Washing | 10.7 | 10.7 | 10.8 | 10.7 | 10.8 | 10.6 | 10.6 |
| pH after Washing | 10.3 | 10.3 | 10.4 | 10.4 | 10.4 | 10.1 | 10.0 |
| Derging Rate (%) | 68.7 | 67.9 | 68.9 | 68.5 | 68.8 | 68.4 | 68.7 |

From the results shown in Tables 2 through 8, it is seen that the detergent composition of the present invention offers washing rates equivalent to those obtained using zeolite, a conventional ion exchange material for detergents (Comparative Detergent Compositions 1—1, 1-3, 1-5, 1-7 and 1-9). Also, in comparison with the absence of the synthesized inorganic ion exchange material (Comparative Detergent Compositions 1-2, 1-4, 1-6, 1-8, 1-10), fairly improved washing rates are obtained.

From the results shown in Tables 7 and 8, it is seen that the detergent compositions of the present invention (Detergent Compositions 1-46 through 1-73) offers equivalent washing performance with lower amounts of use, in comparison with conventional formulations (Comparative Detergent Compositions 1-11 through 1-14). This is because the synthesized inorganic ion exchange material of the present invention is of multiple functions excellent in both ion exchange capacity and alkaline capacity, and because its use makes it possible to obtain an equivalent washing performance with smaller amounts of use than the total amount of the ion exchange material and alkali agent used separately in considerable amounts in conventional formulations.

Detergent Compositions 2-1 through 2-13

The synthesized inorganic ion exchange materials A, E, F and G obtained in the above Examples are used to prepare the detergent compositions of the present invention having the compositions shown in Tables 9 through 11 by the method described below. The synthesized inorganic ion exchange materials A, E, F and G are, respectively, the synthesized inorganic ion exchange materials obtained in Examples 3, 5, 12 and 38.

Specifically, for Detergent Compositions 2-1 through 2-6 and Detergent Compositions 2-11 through 2-13, the components other than the synthesized inorganic ion exchange material are prepared as an aqueous slurry of 60% solid amount, which is spray dried to yield grains, which are granulated in the presence of a corresponding amount of inorganic ion exchange material powder in a mixer granulator. For Detergent Compositions 2-7 through 2-10, the starting material powder is placed in a tumbling mixer granulator and subjected to mixing granulation while gradually introducing a liquid nonionic surfactant and an aqueous polymeric solution (about 40% by weight).

Powdery detergent compositions of average grain size of 200 to 500 μm are thus obtained.

The following polymer (copolymer) is used.

A: Sodium polyacrylate (weight-average molecular weight: 10,000)

B: Sodium salt of maleate/acrylate copolymer (monomer ratio: 30/70; weight-average molecular weight: 70,000)

C: Sodium salt of maleate/isobutylene copolymer (monomer ratio: 50/50; weight-average molecular weight: 10,000)

D: Sodium salt of maleate/methacrylate copolymer (monomer ratio: 70/30; weight-average molecular weight: 50,000)

E: Potassium salt of hydrolyzate of maleate/vinyl acetate copolymer (monomer ratio: 50/50; weight-average molecular weight: 7,000)

Comparative Detergent Compositions 2-1 through 2-9

The detergent compositions are prepared in the same manner as in Detergent Compositions except that only one the synthesized inorganic ion exchange material powder according to the present invention and the polymer are used at once to provide compositions shown in Tables 8 through 11.

Specifically, Comparative Detergent Compositions 2-1 through 2-3 and Comparative Detergent Compositions 2-7 through 2-9 are prepared by granulating in the same manner as in Detergent Compositions 2-1 through 2-6. Comparative Detergent Compositions 2-4 through 2-6 are prepared by granulating in the same manner as in Detergent Compositions 2-7 through 2-10.

Test Example 7

Detergent Compositions 2-1 through 2-6 and Comparative Detergent Compositions 2-1 through 2-3 are used to carry out a deterging test under the following conditions:

(Preparation of Artificially Stained Cloth)

"Kanuma sekigyoku soil" for horticultural use is dried at 120° C.±5° C. for 4 hours and then finely pulverized. 150 mesh (100 μm)-passed soil particles are dried at 120° C.±5° C. for 2 hours. 150 g of the soil particles is dispersed in 1 liter of tetrachloroethylene. A calico #2023 is contacted with the dispersion and brushed. After removal of the dispersion, excessive mud remaining on the cloth is removed (Japanese Patent Laid-Open No. 26473/1980).

Test pieces having a size of 10 cm×10 cm are prepared and subjected to the test.

(Deterging Conditions)

Washing is carried out using a twin tub type washing machine ("Ginga," manufactured by Toshiba Corporation) by washing at a temperature of 20° C. for 10 minutes in 3° DH (Ca/Mg=3/1) water having a detergent concentration of 0.0833%; rinsing with running water for 8 minutes.

(Calculation of Deterging Rate)

Reflectivities of the original cloth before the washing and those of the stained cloth before and after the washing are measured at 460 mμ by means of an automatic recording colorimeter (manufactured by Shimadzu Corporation), and the deterging rate D(%) is calculated in the same manner as in Test Example 1. The results thereof are shown in Table 9.

TABLE 9

|  | Detergent Composition 2- | | | | | | Comparative Detergent Composition | | |
|---|---|---|---|---|---|---|---|---|---|
|  | 1 | 2 | 3 | 4 | 5 | 6 | 2-1 | 2-2 | 2-3 |
| LAS-Na(C12–14) | 25 | 25 | 25 | 16 | 27 | 25 | 25 | 25 | 25 |
| AS-Na (C12–18) | 7 | 7 | 7 | — | — | — | 7 | 7 | 7 |
| AOS-K (C12–18) | — | — | — | 16 | — | 7 | — | — | — |
| α-SFE Na(C14–18) | — | — | — | — | 5 | — | — | — | — |
| Zeolite 4A | — | — | — | — | — | — | — | 30 | 30 |
| Ion Exchange Material A | 30 | 30 | 30 | — | — | — | 30 | — | — |
| Ion Exchange Material E | — | — | — | 30 | — | — | — | — | — |
| Ion Exchange Material F | — | — | — | — | 30 | — | — | — | — |
| Ion Exchange Material G | — | — | — | — | — | 30 | — | — | — |
| Sodium carbonate | Bal. | Bal. | Bal. | Bal. | Bal. | Bal. | Bal. | Bal. | Bal. |
| Sodium silicate(JIS No. 2) | 4 | 4 | 4 | 4 | 4 | 4 | 4 | 4 | 4 |
| Polymer A | 3 | — | — | 3 | 3 | 3 | — | 3 | — |
| Polymer B | — | 3 | — | — | — | — | — | — | — |
| Polymer C | — | — | 3 | — | — | — | — | — | — |
| Water | 5 | 5 | 5 | 5 | 5 | 5 | 5 | 5 | 5 |
| Deterging Rate (%) | 60.1 | 60.1 | 60.8 | 58.9 | 58.8 | 59.2 | 55.5 | 59.1 | 54.0 |

Test Example 8

The washing test is carried out in the same manner as in Test Example 7 except that Detergent Compositions 2-7 through 2-10 and Comparative Detergent Compositions 2-4 through 2-6 are used, and that the deterging conditions are changed as shown below:

(Deterging Conditions)

Washing is carried out using a fully automatic washing machine ("Aisaigo," manufactured by Matsushita Electric Industrial Co., Ltd.) by washing in a standard cycle at a temperature of 20° C. in 3.5° DH (Ca/Mg=3/1) water having a detergent concentration of 0.0833%. The results thereof are shown together in Table 10.

TABLE 10

|  | Detergent Composition 2- | | | | Comparative Detergent Composition | | |
|---|---|---|---|---|---|---|---|
|  | 7 | 8 | 9 | 10 | 2-4 | 2-5 | 2-6 |
| Polyoxyethylene primary alcohol C12 alkyl ether EOp = 8 | 25 | 25 | — | 25 | 25 | 25 | 25 |
| Polyoxyethylene synthetic oxoalcohol C11-15 alkyl ether EOp = 7 | — | — | 20 | — | — | — | — |
| Soap (C12–20) | 1 | 1 | 0.5 | 1 | 1 | 1 | 1 |
| Zeolite 4A | — | — | — | 10 | — | 35 | 35 |

TABLE 10-continued

|  | Detergent Composition 2- | | | | Comparative Detergent Composition | | |
|---|---|---|---|---|---|---|---|
|  | 7 | 8 | 9 | 10 | 2-4 | 2-5 | 2-6 |
| Ion Exchange Material A | 35 | 35 | 42 | 25 | 35 | — | — |
| Sodium carbonate | Bal. | Bal. | Bal. | Bal. | Bal. | Bal. | Bal |
| Amorphous silica | 10 | 10 | 8 | 10 | 10 | 10 | 10 |
| Polymer D | 4 | — | 2 | 4 | — | 4 | — |
| Polymer E | — | 4 | 1 | — | — | — | — |
| Water | 5 | 5 | 5 | 5 | 5 | 5 | 5 |
| Deterging Rate (%) | 60.2 | 60.0 | 58.8 | 59.1 | 46.2 | 57.7 | 46.0 |

Test Example 9

The washing test is carried out in the same manner as in Test Example 7 except that Detergent Compositions 2-11 through 2-13 and Comparative Detergent Compositions 2-7 through 2-9 are used, and that the deterging conditions are changed as shown below:

(Deterging Conditions)

Washing is carried out using a fully automatic washing machine ("Model LA5580XT," manufactured by Whirlpool, U.S.A.) by washing in a standard cycle at a temperature of 35° C. in 8° DH (Ca/Mg=2/1) water having a detergent concentration of 0.1%. The results thereof are shown together in Table 11.

TABLE 11

|  | Detergent Composition 2- | | | Comparative Detergent Composition | | |
|---|---|---|---|---|---|---|
|  | 11 | 12 | 13 | 2-7 | 2-8 | 2-9 |
| LAS-Na | 13 | 13 | 13 | 13 | 13 | 13 |
| AS-Na | 5 | 5 | 5 | 5 | 5 | 5 |
| Soap | 1 | 1 | 1 | 1 | 1 | 1 |
| Polyoxyethylene alkyl ether C12–15 EOp = 8 | 2 | 2 | 2 | 2 | 2 | 2 |
| Sodium tripolyphosphate | — | — | 10 | 40 | 40 | — |
| Sodium carbonate | Bal. | Bal. | Bal. | Bal. | Bal. | Bal |
| Sodium silicate (JIS No. 1) | 3 | 3 | 3 | 3 | 3 | 3 |
| Water | 5 | 5 | 5 | 5 | 5 | 5 |
| Ion Exchange Material E | 40 | 40 | 30 | — | — | 40 |
| Polymer A | 2 | — | 2 | 2 | — | — |
| Polymer B | — | 2 | — | — | — | — |
| Deterging Rate (%) | 60.2 | 61.1 | 61.5 | 61.8 | 61.6 | 57. |

As is shown from the above results, the detergent compositions of the present invention offer fairly improved washing rates for mud stains, in comparison with the case where neither the synthesized inorganic ion exchange material nor (co)polymer of the present invention is used (Comparative Detergent Compositions 2-3 and 2-6) and the case where the (co)polymer alone of the present invention is not used (Comparative Detergent Compositions 2-1, 2-4 and 2-9).

Also, in comparison with the case where zeolite, a conventional ion exchange material for detergents, and the (co)polymer of the present invention are used (Comparative Detergent Compositions 2-2 and 2-5), equivalent or slightly improved washing rates for mud stains are obtained. Also, in comparison with the case where sodium tripolyphosphate, a conventional builder, (Comparative Detergent Compositions 2-7 and 2-8), nearly equivalent washing rates are obtained.

Detergent Compositions 3-1 through 3-23

Starting material powders, including the synthesized inorganic ion exchange materials A, E, F and G obtained in the above Examples and oil-absorbing carriers having the properties shown in Tables 12 and 13, are placed in a batch kneader (Bench Kneader PNV-1 manufactured by Irie Shokai) in amounts according to the detergent composition, and a liquid nonionic surfactant is gradually introduced thereinto to yield a powdery detergent compound of an average grain size of 350 to 450 μm. A surface modifying agent is added in an amount corresponding to the formulation composition to obtain a detergent composition of the present invention (final detergent product) having the composition shown in Tables 14 and 15.

TABLE 12

| Kind | pH of 5% Water Dispersion | Amount of Absorbed Oil (ml/100 g) | SiO$_2$ Content (% by wt.) |
|---|---|---|---|
| TOKUSIL AL-1 TM (Tokuyama Soda Co., Ltd.) | 9.2 | 255 | 94 |
| NIPSIL NA TM (Nippon Silica Ind.) | 10.2 | 245 | 93 |
| TIXOLEX 25 TM (Kofran Chemical) | 9.8 | 235 | 72 |
| CARPLEX #100 TM (Shionogi Pharmacy) | 10.4 | 230 | 93 |
| SIPERNAT D 10 TM (Degussa AG) | 10.3 | 240 | 98 |
| TOKUSIL NR TM (Tokuyama Soda Co., Ltd.) | 5.8 | 280 | 94 |
| FLORITE RN TM (Tokuyama Soda Co., Ltd.) | 8.1 | 380 | 61 |
| TIXOSIL 38 TM (Kofran Chemical) | 6.5 | 260 | 90 |

TABLE 12-continued

| Kind | pH of 5% Water Dispersion | Amount of Absorbed Oil (ml/100 g) | SiO$_2$ Content (% by wt.) |
|---|---|---|---|
| TOKUSIL NR TM (Tokuyama Soda Co., Ltd.) | 5.8 | 280 | 94 |
| FLORITE RN TM (Tokuyama Soda Co., Ltd.) | 8.1 | 380 | 61 |
| TIXOSIL 38 TM (Kofran Chemical) | 6.5 | 260 | 90 |

Here, the pH of the 5% water dispersion and the amount of oil absorbed are determined according to JIS K 6220. Also, the amount of the oil-absorbing carrier dissolved in a 2% aqueous NaOH solution is determined by dispersing 10 g of the oil-absorbing carrier in 100 ml of a 2% aqueous NaOH solution, stirring the dispersion for 16 hours while the temperature is kept at 25° C. and determining SiO$_2$ in the filtrate by colorimetric determination [as for the colorimetric determination, refer to Yukagaku, Vol. 25, p. 156 (1976)]. Namely, the amount of the oil-absorbing carrier dissolved in the aqueous NaOH solution calculated from the SiO$_2$ content of the oil-absorbing carrier which is determined by elementary analysis in advance is calculated.

Comparative Detergent Compositions 3-1 through 3-3

The detergent compositions having the compositions shown in Tables 14 and 15 are prepared in the same manner as in Detergent Compositions described above except that Zeolite 4A is used in place of the synthesized inorganic ion exchange material powder and that the oil-absorbing carrier is omitted.

Test Example 10

Detergent Compositions 3-1 through 3-23 and Comparative Detergent Compositions 3-1 through 3—3 are tested for solubility change upon storage as follows:

Each powdery detergent composition is placed in a Petri dish and left to stand at 30° C. and 50% RH for 3 days, after which a 0.83 g sample is taken and added to 1 liter of tap water at 10° C., followed by stirring with a magnetic stirrer for 10 minutes. The mixture is then filtered through a 200-mesh metal gauze and dried, after which the filtration residue rate (%) is determined. The results are shown in Tables 14 and 15.

Test Example 11

Detergent Compositions 3-1 through 3-23 and Comparative Detergent Compositions 3-1 through 3—3 are used to carry out a deterging test for stains caused by fatty acids under the following conditions:

(Preparation of Artificially Stained Cloth)

Cotton test pieces of 10 cm×10 cm stained with paraffins and fatty acids having the following compositions and trace amounts of carbon black are prepared.

| Oleic acid | 20% |
|---|---|
| Palmitic acid | 20% |
| Liquid and solid paraffins | 60% |

(Deterging Conditions)

Washing is carried out using a Turgotometer ("Model 400," manufactured by Ueshima Seisakusho) by washing at a rotational speed of 100 rpm, at a temperature of 35° C. for 15 minutes in 8° DH (calcium hard water) water having a detergent concentration of 0.1% by weight, followed by rinsing with tap water for 5 minutes.

(Calculation of Deterging Rate)

The deterging rate D(%) is calculated in the same manner as in Test Example 1. The results thereof are shown in Tables 14 and 15.

in solubility with time is poorer, though the washing rate is equivalent or slightly lower.

Detergent Compositions 4-1 through 4-18

The synthesized inorganic ion exchange materials A, E, F and G obtained in the above Examples are used to prepare the detergent compositions of the present invention having the compositions shown in Tables 16 and 17 by the method described below.

TABLE 14

| Component | Detergent Composition 3- | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| (a) | | | | | | | | | | | | | |
| Dodecyl alcohol ethoxylate | 24 | 24 | 24 | 24 | 24 | 24 | 24 | 24 | — | 15 | 24 | 24 | 24 |
| Synthetic primary alcohol ethoxylate | — | — | — | — | — | — | — | — | 20 | — | — | — | — |
| (b) | | | | | | | | | | | | | |
| Ion Exchange Material A | 30 | 30 | 30 | 30 | 30 | 30 | 30 | 30 | 45 | 55 | — | — | — |
| Ion Exchange Material E | — | — | — | — | — | — | — | — | — | — | 30 | — | — |
| Ion Exchange Material F | — | — | — | — | — | — | — | — | — | — | — | 30 | — |
| Ion Exchange Material G | — | — | — | — | — | — | — | — | — | — | — | — | 30 |
| (c) | | | | | | | | | | | | | |
| TOKUSIL AL-1 TM | 10 | — | — | — | — | — | — | 5 | — | — | — | — | — |
| NIPSIL NAT TM | — | 10.5 | — | — | — | — | — | — | — | — | — | — | — |
| TIXOLEX 25 TM | — | — | 10.5 | — | — | — | — | — | — | 10 | — | — | — |
| CARPLEX #100 TM | — | — | — | 11 | — | — | — | — | — | — | — | — | — |
| SIPERNAT D 10 TM | — | — | — | — | 10.5 | — | — | — | — | — | — | — | — |
| TOKUSIL NR TM | — | — | — | — | — | 10 | — | — | — | — | — | — | — |
| FLORITE RN TM | — | — | — | — | — | — | 7.5 | — | — | — | — | — | — |
| TIXOSIL 38 TM | — | — | — | — | — | — | — | 10.5 | — | — | — | — | — |
| Sodium carbonate | Bal. | Bal. | Bal. | Bal. | Bal. | Bal. | Ba. | Bal. | Bal. | Bal. | Bal. | Bal. | Bal. |
| Water | 5 | 5 | 5 | 5 | 5 | 5 | 5 | 5 | 5 | 5 | 5 | 5 | 5 |
| Solubility Change upon Storage (%) | 0.4 | 0.4 | 0.3 | 0.3 | 0.3 | 0.8 | 0.9 | 0.9 | 0.3 | 0.4 | 0.5 | 0.5 | 0.5 |
| Deterging Rate of Fatty Acid Stains (%) | 72.1 | 72.2 | 71.6 | 71.5 | 72.0 | 72.6 | 72.1 | 71.8 | 73.3 | 70.4 | 70.1 | 70.0 | 71.0 |

TABLE 15

| Component | Detergent Composition 3- | | | | | | | | | | Comparative Detergent Composition | | |
|---|---|---|---|---|---|---|---|---|---|---|---|---|---|
| | 14 | 15 | 16 | 17 | 18 | 19 | 20 | 21 | 22 | 23 | 3-1 | 3-2 | 3-3 |
| (a) | | | | | | | | | | | | | |
| Dodecyl alcohol ethoxylate | — | — | — | — | — | — | — | — | 20 | 20 | 10 | 20 | 20 |
| Synthetic alcohol ethoxylate | 24 | 24 | 24 | 24 | 24 | 24 | 24 | 24 | — | — | — | — | — |
| (b) | | | | | | | | | | | | | |
| Ion Exchange Material A | 30 | — | — | — | 30 | — | — | — | 50 | 50 | 55 | — | — |
| Ion Exchange Material B | — | 30 | — | — | — | 30 | — | — | — | — | — | — | — |
| Ion Exchange Material F | — | — | 30 | — | — | — | 30 | — | — | — | — | — | — |
| Ion Exchange Material G | — | — | — | 30 | — | — | — | 30 | — | — | — | — | — |
| Zeolite 4A | — | — | — | — | — | — | — | — | — | — | — | 30 | 30 |
| Sodium silicate(JIS No.1) | — | — | — | — | — | — | — | — | — | — | — | 10 | 10 |
| (c) | | | | | | | | | | | | | |
| PERLITE TM | 20 | 20 | 20 | 20 | — | — | — | — | 15 | — | — | 15 | — |
| Na-Mordenite | — | — | — | — | 16 | 16 | 16 | 16 | — | 12 | — | — | 12 |
| Sodium carbonate | Bal. | Bal. | Bal. | Bal. | Bal. | Bal. | Bal. | Bal. | Bal. | Bal. | Bal. | Bal. | Bal. |
| Water | 3 | 3 | 3 | 3 | 3 | 3 | 3 | 3 | 3 | 3 | 3 | 3 | 3 |
| Solubility Change upon Storage (%) | 0.2 | 0.2 | 0.3 | 0.2 | 0.2 | 0.2 | 0.2 | 0.2 | 0.3 | 0.3 | 0.3 | 1.6 | 1.7 |
| Deterging Rate of Fatty Acid Stains (%) | 72.1 | 71.0 | 70.3 | 70.6 | 71.2 | 71.6 | 71.5 | 70.9 | 72.4 | 71.8 | 63.2 | 70.1 | 70.2 |

As is seen from the above results, the detergent compositions of the present invention (Detergent Compositions 3-1 through 3-23) are excellent in change in solubility with time and washing power for dirt caused by fatty acids.

On the other hand, when zeolite, etc., a conventional ion exchange material for detergents, is used, (Comparative Detergent Compositions 3-2 and 3—3), the change Specifically, for Detergent Compositions 4-1 through 4-10, the components, other than the synthesized inorganic ion exchange materials and the bleaching components, are prepared as a slurry of 60% solid content, and then spray dried to yield grains, and then granulated in the presence of a corresponding amount of inorganic ion exchange material powder in a mixer granulator, followed by mixing the bleaching agent components and the bleaching activator components thereinto to prepare each detergent powder. For Detergent Compositions 4-11 through 4-18, the starting material powder is placed in a tumbling mixer granulator and subjected to mixing granulation while gradually introducing a liquid nonionic surfactant, followed by mixing the bleaching agent components and the bleaching activator components thereinto to prepare each detergent powder.

Powdery detergent compositions of average grain size of 200 to 500 μm are thus obtained.

The following bleaching activators are used.

Bleaching Activator [1]

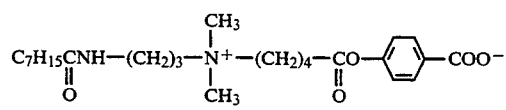

Bleaching Activator [2]
Sodium nonanoyloxybenzenesulfonate

Bleaching Activator [3]

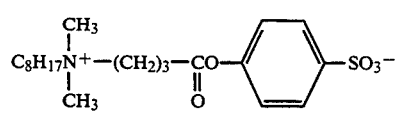

Bleaching Activator [4]
Tetraacetylethylenediamine (TAED)

Comparative Detergent Compositions 4-1 through 4-9

The detergent compositions having the compositions shown in Tables 16 and 17 are prepared in the same manner as in Detergent Compositions except that the synthesized inorganic ion exchange material powder is omitted.

Test Example 12

Detergent Compositions 4-1 through 4-18 and Comparative Detergent Compositions 4-1 through 4-9 are used to carry out a deterging test under the following conditions:

(Preparation of cloth artificially stained with black tea)

To 1 liter of water, 10 tea bags (20 g) produced by Brooke Bond and 50 g of sugar are added, and the mixture is boiled for 10 minutes. The tea bags are then taken out, and the remaining solution is filled up to a total quantity of 1 liter. After cooling, the solution is placed in a vat, and a piece of desired cloth of 10×55 cm is immersed therein for 10 seconds for each of the top and back faces, passed through a roller, and kept standing to dryness in air to yield a sample of black-tea-stained cloth.

(Deterging Conditions)

Washing is carried out using a Turgotometer by washing by immersing in tap water having a detergent concentration of 0.42% at a temperature of 20° C. with a liquor ratio of 1/12 for 1 hour, followed by washing in tap water having a detergent concentration of 0.083% at a temperature of 20° C. and a liquor ratio of 1/60 for 1 hour for 10 minutes.

(Calculation of Bleaching Rate)

The bleaching rate is calculated by measuring reflectivities of the original cloth before the washing and those of the stained cloth before and after the washing in the same manner as in Test Example 1 to evaluate bleaching properties.

The results thereof are shown together in Tables 16 and 17.

TABLE 16

| Component | Detergent Composition 4- | | | | | | | | Comparative Detergent Composition | | | Detergent Composition 4- | | Comparative Detergent Composition | |
|---|---|---|---|---|---|---|---|---|---|---|---|---|---|---|---|
| | 1 | 2 | 3 | 4 | 5 | 6 | 7 | 8 | 4-1 | 4-2 | 4-3 | 9 | 10 | 4-4 | 4-5 |
| (a) | | | | | | | | | | | | | | | |
| LAS-Na(C12-14) | 25 | 25 | 25 | 25 | 16 | 27 | 25 | 25 | 25 | 25 | 25 | 25 | 25 | 25 | 25 |
| AS-Na (C12-18) | 7 | 7 | 7 | 7 | — | — | 7 | 7 | 7 | 7 | 7 | 7 | 7 | 7 | 7 |
| AOS-K (C14-18) | — | — | — | — | 16 | — | — | — | — | — | — | — | — | — | — |
| SFE-Na(C14-18) | — | — | — | — | — | 5 | — | — | — | — | — | — | — | — | — |
| Tallow Soap(C12-20) | 2 | 2 | 2 | 2 | 2 | 2 | 2 | 2 | 2 | 2 | 2 | 2 | 2 | 2 | 2 |
| (b) | | | | | | | | | | | | | | | |
| Ion Exchange Material A | 25 | — | — | — | 25 | 25 | 15 | 15 | — | — | — | 25 | 25 | — | — |
| Ion Exchange Material B | — | 25 | — | — | — | — | — | — | — | — | — | — | — | — | — |
| Ion Exchange Material F | — | — | 25 | — | — | — | — | — | — | — | — | — | — | — | — |
| Ion Exchange Material G | — | — | — | 25 | — | — | — | — | — | — | — | — | — | — | — |
| (c) | | | | | | | | | | | | | | | |
| Sodium perborate hydrate | — | — | — | — | — | 10 | — | — | — | — | — | — | — | — | — |
| Sodium percarbonate | 10 | 10 | 10 | 10 | 10 | — | 10 | 10 | 10 | 10 | 10 | 6 | 6 | 6 | 6 |
| Zeolite 4A | — | — | — | — | — | — | 10 | — | 25 | — | — | — | — | 25 | — |
| Trisodium citrate dihydrate | — | — | — | — | — | — | — | 10 | — | 25 | — | — | — | — | 25 |
| Sodium carbonate | Bal. | Bal. | Bal. | Bal. | Bal. | Bal. | Bal. | Bal. | Bal. | Bal. | Bal. | Bal. | Bal. | Bal. | Bal. |
| Sodium silicate(JIS No. 2) | 5 | 5 | 5 | 5 | 5 | 5 | 5 | 5 | 5 | 5 | 5 | 5 | 5 | 5 | 5 |
| 1-hydroxyethylidene 1,1-diphosphonic acid sodium salt | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Bleaching Activator [1] | — | — | — | — | — | — | — | — | — | — | — | 3 | — | 3 | — |
| Bleaching Activator [2] | — | — | — | — | — | — | — | — | — | — | — | — | 3 | — | 3 |
| Water | 5 | 5 | 5 | 5 | 5 | 5 | 5 | 5 | 5 | 5 | 5 | 5 | 5 | 5 | 5 |
| Bleaching Rate (%) | 10.9 | 10.9 | 10.3 | 10.8 | 9.1 | 8.9 | 10.0 | 9.9 | 6.8 | 7.0 | 6.0 | 34.3 | 18.8 | 29.8 | 14.9 |

TABLE 17

| Component | Detergent Composition 4- | | | | | | Comparative Detergent Composition | | Detergent Composition 4- | | Comparative Detergent Composition | |
|---|---|---|---|---|---|---|---|---|---|---|---|---|
| | 11 | 12 | 13 | 14 | 15 | 16 | 4-6 | 4-7 | 17 | 18 | 4-8 | 4-9 |
| (a) | | | | | | | | | | | | |
| Polyoxyethylene synthetic alcohol C12-14 ether EOp = 7 | 24 | 24 | 24 | 24 | — | 24 | 24 | 24 | 24 | 24 | 24 | 24 |
| Polyoxyethylene dodecyl ether EOp = 8 | — | — | — | — | 20 | — | — | — | — | — | — | — |
| (b) | | | | | | | | | | | | |
| Ion Exchange Material A | 32 | — | — | — | 30 | 20 | — | — | 32 | 32 | — | — |
| Ion Exchange Material E | — | 32 | — | — | — | — | — | — | — | — | — | — |
| Ion Exchange Material F | — | — | 32 | — | — | — | — | — | — | — | — | — |
| Ion Exchange Material G | — | — | — | 32 | — | — | — | — | — | — | — | — |
| (c) | | | | | | | | | | | | |
| Sodium percarbonate | 8 | 8 | 8 | 8 | — | 8 | 8 | 8 | 6 | 6 | 6 | 6 |
| Sodium perborate tetrahydrate | — | — | — | — | 8 | — | — | — | — | — | — | — |
| Zeolite 4A | — | — | — | — | — | 12 | 32 | — | — | — | 32 | 32 |
| Sodium carbonate | Bal. | Bal. | Bal. | Bal. | Bal. | Bal. | Bal. | Bal. | ← | ← | ← | ← |
| amorphous silica | 5 | 5 | 5 | 5 | 4 | 5 | 5 | 5 | 5 | 5 | 5 | 5 |
| Sodium α-hydroxyacrylate (W = 30000) | 0.8 | 0.8 | 0.8 | 0.8 | 0.8 | 0.8 | 0.8 | 0.8 | 0.8 | 0.8 | 0.8 | 0.8 |
| Bleaching Activator [3] | — | — | — | — | — | — | — | — | 2.5 | — | 2.5 | — |
| Bleaching Activator [4] | — | — | — | — | — | — | — | — | — | 2.5 | — | 2.5 |
| Water | 3 | 3 | 3 | 3 | 3 | 3 | 3 | 3 | 3 | 3 | 3 | 3 |
| Bleaching Rate (%) | 11.2 | 10.9 | 10.7 | 11.2 | 10.1 | 10.6 | 7.7 | 7.2 | 39.9 | 17.8 | 31.8 | 15.1 |

As is clear from these results in Tables 16 and 17, the detergent compositions of the present invention (Detergent Compositions 4-1 through 4-18) offer higher bleaching rates than in the case where zeolite, a conventional ion exchange material for detergents, is used (Comparative Detergent Compositions 4-1, 4—4, 4-6, 4-8 and 4-9). Also, in comparison with the case where trisodium citrate, dihydrate is used (Comparative Detergent Compositions 4-2 and 4-5) and the case where no synthesized ion exchange material is used (Comparative Detergent Compositions 4-3 and 4-7), higher bleaching rates are obtained in the present invention.

Detergent Composition 5-1 through 5-127

Detergent Compositions 5-1 through 5-127 are prepared in the same manner as in each of Detergent Compositions 1—1 through 4-18 described above except that a part of sodium sulfate or sodium carbonate is replaced with arbitrarily chosen components shown below, and the similar tests are carried out. When compared to the case where the arbitrarily chosen components are not contained, the deterging ability of equivalent to or higher than those of Detergent Compositions 1—1 through 4-18 can be achieved.

In Detergent Compositions 5-1 through 5-127, an excellent enzyme stability during storage can be achieved.

[Arbitrarily Chosen Component]

| Enzyme | Protease ("Savinase TM," manufactured by NOVO Nordisk Bioindustry, Ltd.) | 0.3% by weight |
|---|---|---|
| | Cellulase | 0.8% by weight |
| | ("Alkaline cellulase K" disclosed in EP 265832) | |
| | Amilase ("Termamyl TM," manufactured by NOVO Nordisk Bioindustry, Ltd.) | 0.05% by weight |
| | Lipase ("Lipolase TM," manufactured by NOVO Nordisk Bioindustry, Ltd.) | 0.05% by weight |
| | Florescent dye (DM-type, manufactured by Sumitomo Chemical Co., Ltd.) | 0.5% by weight |
| | Tallow soap (of carbon number 12 to 18) | 1.0% by weight |
| | Perfume | 0.5% by weight |
| | Total | 3.2% by weight |

EXAMPLE 101

No. 2 sodium silicate ($SiO_2/Na_2O=2.55$; moisture content: 59.9%), sodium hydroxide, potassium hydroxide, anhydrous calcium carbonate and magnesium hydroxide are mixed to provide the composition shown in Table 18. The mixture is baked at a temperature of 700° C. for 3 hours to obtain an inorganic ion exchange material powder 101. In the X-ray diffraction, this powder exhibits a peak corresponding to the spacing of $d=2.84\pm0.05$ Å, and the intensity ratio of this peak to the peak of $d=4.00\pm0.05$ Å is 0.6. In the Raman spectrophotometry, the powder exhibits peaks at 972 cm$^{-1}$, 1077 cm$^{-1}$ and 1059 cm$^{-1}$. The intensity ratios of these peaks are, respectively, $I_{972}/I_{1059}=0.40$ and $I_{1077}/I_{1059}=0.07$. The powder material has a high cationic exchange capacity of 317 $CaCO_3$ mg/g.

TABLE 18

| Ion Exchange Material Powder (Inventive Examples) | $M_2O$ | K/Na | M'O | y/x | z/x | Mg/Ca | Intensity Ratio of X-Ray Diffraction Peaks | Raman Peak Intensity Ratio | | Cationic Exchange Capacity $CaCO_3$ mg/g |
|---|---|---|---|---|---|---|---|---|---|---|
| | | | | | | | | $I_{968}/I_{1058}$ | $I_{1078}/I_{1058}$ | |
| 101 | $Na_2O \cdot K_2O$ | 0.15 | CaO·MgO | 1.85 | 0.15 | 0.05 | 0.6 | 0.40 | 0.07 | 317 |
| 102 | $Na_2O \cdot K_2O$ | 0.03 | CaO·MgO | 1.70 | 0.02 | 0.02 | 0.4 | 0.08 | — | 306 |
| 103 | $Na_2O \cdot K_2O$ | 0.25 | CaO·MgO | 1.60 | 0.40 | 0.33 | 1.5 | 3.48 | 0.53 | 281 |
| 104 | $Na_2O \cdot K_2O$ | 1.25 | CaO·MgO | 1.50 | 0.15 | 3.00 | 2.3 | 10.8 | 1.45 | 258 |
| 105 | $Na_2O \cdot K_2O$ | 0.06 | CaO·MgO | 1.75 | 0.08 | 0.25 | 0.8 | 0.40 | — | 301 |
| 106 | $Na_2O \cdot K_2O$ | 0.80 | CaO·MgO | 1.75 | 0.01 | 0.15 | 0.5 | 0.52 | 0.78 | 322 |
| 107 | $Na_2O \cdot K_2O$ | 2.50 | CaO·MgO | 1.60 | 0.10 | 1.25 | 6.3 | 2.08 | 3.33 | 311 |
| 108 | $Na_2O \cdot K_2O$ | 0.50 | CaO·MgO | 1.40 | 0.95 | 0.80 | 2.0 | 89.3 | 0.29 | 262 |

EXAMPLES 102 AND 103

Inorganic ion exchange material powders 102 and 103 are obtained by baking at 600° C. in the same manner as in Example 101 except that No. 1 sodium silicate ($SiO_2/Na_2O=2.14$; moisture content: 44.9%) is used in the place of No. 2 sodium silicate. The obtained powders are analyzed for X-ray diffraction, Raman spectrum and cationic exchange capacity. The results of the analyses are given in Table 18. Both of these powder materials exhibit a peak corresponding to d=2.84±0.05 Å in the X-ray diffraction pattern and peaks at 1058±6 cm$^{-1}$ and 968±6 cm$^{-1}$ and optionally 1078±6 cm$^{-1}$ in the Raman spectra, and they show a high cationic exchange capacity.

EXAMPLES 104 AND 105

Inorganic ion exchange material powders 104 and 105 are obtained by baking at 600° C. in the same manner as in Example 101 except that magnesium carbonate is used in the place of magnesium hydroxide. The obtained powders are analyzed for X-ray diffraction, Raman spectrum and cationic exchange capacity. The results of the analyses are given in Table 18. Both of these powder materials exhibit a peak corresponding to d=2.84±0.05 Å in the X-ray diffraction pattern and peaks at 1058±6 cm$^{-1}$ and 968±6 cm$^{-1}$ and optionally 1078±6 cm$^{-1}$ in the Raman spectra, and they show a high cationic exchange capacity.

EXAMPLES 106 THROUGH 108

Inorganic ion exchange material powders 106, 107 and 108 are obtained by baking at 650° C. in the same manner as in Example 101 except that powdery No. 1 sodium silicate ($SiO_2/Na_2O=2.11$; moisture content: 22.1%) is used in the place of No. 2 sodium silicate. The obtained powders are analyzed for X-ray diffraction, Raman spectrum and cationic exchange capacity. The results of the analyses are given in Table 18. All of the powder materials exhibit a peak corresponding to d=2.84±0.05 Å in the X-ray diffraction pattern and peaks at 1058±6 cm$^{-1}$ and 968±6 cm$^{-1}$ and optionally 1078±6 cm$^{-1}$ in the Raman spectra, and they show a high cationic exchange capacity.

EXAMPLES 109 THROUGH 111

Inorganic ion exchange material powders 109, 110 and 111 are obtained by baking at 700° C. in the same manner as in Example 101 except that powdery 325 mesh-passed silica rock powder ($SiO_2$ purity 99.9%) and aqueous sodium hydroxide solution are used in the place of No. 2 sodium silicate. The obtained powders are analyzed for X-ray diffraction, Raman spectrum and cationic exchange capacity. The results of the analyses are given in Table 19. All of the powder materials exhibit a peak corresponding to d=2.84±0.05 Å in the X-ray diffraction pattern and peaks at 1058±6 cm$^{-1}$ and 968±6 cm$^{-1}$ and optionally 1078±6 cm$^{-1}$ in the Raman spectra, and they show a high cationic exchange capacity.

TABLE 19

| Ion Exchange Material Powder (Inventive Examples) | $M_2O$ | K/Na | M'O | y/x | z/x | Mg/Ca | Intensity Ratio of X-Ray Diffraction Peaks | Raman Peak Intensity Ratio | | Cationic Exchange Capacity $CaCO_3$ mg/g |
|---|---|---|---|---|---|---|---|---|---|---|
| | | | | | | | | $I_{968}/I_{1058}$ | $I_{1078}/I_{1058}$ | |
| 109 | $Na_2O \cdot K_2O$ | 7.50 | CaO·MgO | 1.90 | 0.60 | 1.00 | 7.5 | 0.06 | 4.88 | 281 |
| 110 | $Na_2O \cdot K_2O$ | 0.50 | CaO·MgO | 1.55 | 0.35 | 8.00 | 1.6 | 20.7 | 1.48 | 323 |
| 111 | $Na_2O \cdot K_2O$ | 0.30 | CaO·MgO | 1.65 | 0.05 | 2.00 | 1.7 | 4.57 | 1.11 | 348 |
| 112 | $Na_2O \cdot K_2O$ | 0.04 | CaO·MgO | 1.80 | 0.02 | 0.01 | 1.0 | 1.36 | 0.08 | 310 |
| 113 | $Na_2O \cdot K_2O$ | 0.20 | CaO·MgO | 1.45 | 0.10 | 0.10 | 1.4 | 67.4 | 0.69 | 568 |
| 114 | $Na_2O \cdot K_2O$ | 2.00 | CaO·MgO | 1.50 | 0.30 | 9.00 | 2.8 | 43.7 | 1.90 | 498 |
| 115 | $Na_2O \cdot K_2O$ | 0.01 | CaO·MgO | 1.75 | 0.01 | 0.50 | 0.5 | 0.49 | — | 328 |
| 116 | $Na_2O \cdot K_2O$ | 0.75 | CaO·MgO | 1.70 | 0.50 | 0.03 | 1.5 | 0.88 | 2.48 | 345 |
| 117 | $Na_2O \cdot K_2O$ | 0.40 | CaO·MgO | 1.65 | 0.01 | 5.00 | 1.4 | 2.02 | 0.88 | 381 |
| 118 | $Na_2O \cdot K_2O$ | 3.30 | CaO·MgO | 1.70 | 0,10 | 0.80 | 4.2 | 0.56 | 3.87 | 325 |
| 119 | $Na_2O \cdot K_2O$ | 5.00 | CaO·MgO | 1.60 | 0.75 | 7.50 | 9.3 | 14.9 | 2.10 | 361 |
| 120 | $Na_2O \cdot K_2O$ | 3.00 | CaO·MgO | 1.55 | 0.05 | 3.00 | 2.5 | 21.3 | 1.08 | 488 |

EXAMPLES 112 THROUGH 114

Silica rock powder, potassium hydroxide, calcium carbonate and magnesium hydroxide are mixed using a type V mixer to provide the compositions as shown in Table 19. This mixture is melted at a temperature of 1300° C. for 8 hours, followed by rapid cooling to obtain cullets. After milling the cullets, cullets on a 100-mesh sieve are subjected to a hydrothermal treatment at a pressure of 3 kg/cm$^2$ for 1 hour using an autoclave to yield water glass. Each water glass obtained is baked at 650° C. for 1 hour to obtain inorganic ion exchange material powders 112, 113 and 114. The obtained powders are, analyzed for X-ray diffraction, Raman spectrum and cationic exchange capacity. The results are given in Table 19. All of these powder materials exhibit a peak corresponding to d=2.84±0.05 Å in the X-ray diffraction pattern and peaks at 1058±6 cm$^{-1}$ and 968±6 cm$^{-1}$ and optionally 1078±6 cm$^{-1}$ in the Raman spectra, and they show a high cationic exchange capacity.

EXAMPLES 115 THROUGH 117

Inorganic ion exchange material powders 115, 116 and 117 are obtained in the same manner as in Example 112 except that powdery silica sand (SiO$_2$ purity 99.7%) is used in the place of silica rock powder. The obtained powders are analyzed for X-ray diffraction, Raman spectrum and cationic exchange capacity. The results of the analyses are given in Table 19. All of the powder materials exhibit a peak corresponding to d=2.84±0.05 Å in the X-ray diffraction pattern and peaks at 1058±6 cm$^{-1}$ and 968±6 cm$^{-1}$ and optionally 1078±6 cm$^{-1}$ in the Raman spectra, and they show a high cationic exchange capacity.

EXAMPLES 118 THROUGH 120

Inorganic ion exchange material powders 118, 119 and 120 are obtained in the same manner as in Example 112 except that magnesium carbonate is used in the place of magnesium hydroxide. The obtained powders are analyzed for X-ray diffraction, Raman spectrum and cationic exchange capacity. The results of the analyses are given in Table 19. All of the powder materials exhibit a peak corresponding to d=2.84±0.05 Å in the X-ray diffraction pattern and peaks at 1058±6 cm$^{-1}$ and 968±6 cm$^{-1}$ and optionally 1078±6 cm$^{-1}$ in the Raman spectra, and they show a high cationic exchange capacity.

Comparative Example 6

No. 2 sodium silicate and sodium hydroxide are mixed to provide the compositions shown in Table 20. The mixture is baked at a temperature of 700° C. to obtain a comparative ion exchange material powder 6. The powder is analyzed by X-ray diffraction and shows no peak corresponding to d=2.84±0.05 Å. The Raman spectrophotometry fails to confirm the peak at 1078±6 cm$^{-1}$, only showing slight peaks at 968±6 cm$^{-1}$. The cationic exchange capacity of the comparative powder material is 224 CaCO$_3$ mg/g, falling in the range of not more than 250 CaCO$_3$ mg/g.

Comparative Example 7

Slaked lime is mixed in an aqueous solution of sodium silicate, and this mixture is subjected to a hydrothermal treatment in an autoclave at a pressure of 9 kg/cm$^2$ for 20 hours to yield a comparative ion exchange material powder 7 of the composition shown in Table 20. The powder is analyzed by X-ray diffraction and shows no peak corresponding to d=2.84±0.05 Å. The Raman spectrophotometry fails to confirm the peak at 1078±6 cm$^{-1}$. The cationic exchange capacity of the comparative powder material is found to be low.

Comparative Example 8

Magnesium hydroxide and lithium hydroxide are mixed in an aqueous solution of sodium silicate, and this mixture is subjected to a hydrothermal treatment in an autoclave at a temperature of 180° C. for 20 hours to yield a comparative ion exchange material powder 8 of the composition shown in Table 20. The powder is analyzed by X-ray diffraction and shows no peak corresponding to d=2.84±0.05 Å. The Raman spectrophotometry fails to confirm the peak at 1078±6 cm$^{-1}$. The cationic exchange capacity of the comparative powder material is found to be low.

TABLE 20

| Ion Exchange Material Powder (Inventive Examples) | M$_2$O | K/Na | M'O | y/x | z/x | Mg/Ca | Intensity Ratio of X-Ray Diffraction Peaks | Raman Peak Intensity Ratio | | Cationic Exchange Capacity CaCO$_3$ mg/g |
|---|---|---|---|---|---|---|---|---|---|---|
| | | | | | | | | $I_{968}/I_{1058}$ | $I_{1078}/I_{1058}$ | |
| 6 | Na$_2$O | — | — | 2.0 | — | — | -*1 | 0.07 | -*2 | 224 |
| 7 | Na$_2$O | — | CaO | 4.0 | 1.5 | — | -*1 | 0.01 | -*2 | 175 |
| 8 | Na$_2$O Li$_2$O | — | MgO | 2.5 | 1.5 | — | -*1 | 0.01 | -*2 | 58 |

*1 No peak corresponding to d = 2.84 ± 0.05 Å
*2 No peak at 1078 ± 6 cm$^{-1}$

Preparation Example of Detergent Compositions

Detergent compositions having compositions shown in Table 21 are prepared by the following methods. Here, Detergent Compositions A and B are the present invention products containing the inorganic ion exchange materials of the present invention, and Detergent Composition C is a comparative product which does not contain the inorganic ion exchange material of the present invention.

Specifically, powdery starting materials comprising carbonate, sodium sulfate, amorphous silica and inorganic ion exchange material are placed in a tumbling mixer granulator (Lödige mixer), and polyoxyethylene dodecyl ether and polyethylene glycol are added thereto to yield powdery detergent compositions of an average grain size of 368 to 412 μm. Similarly, detergent compositions having compositions shown in Table 22 are prepared, wherein Detergent Compositions D and E contain the inorganic ion exchange materials of the present invention, and Detergent Compositions F and G contain zeolite 4A and trisodium citrate.2H$_2$O as the comparative ion exchange materials.

TABLE 21

| | Detergent Composition | | |
|---|---|---|---|
| | A (Present invention) | B (Present invention) | C (Comparative example) |
| Polyoxyethylene dodecyl ether (EOP = 8) | 25 | 25 | 25 |
| Sodium carbonate | 6 | 6 | 35 |
| Sodium sulfate | Bal. | Bal. | Bal. |
| Amorphous silica (TOKUSIL TM) | 15 | 15 | 15 |
| Polyethylene glycol (MW = 6000) | 2 | 2 | 2 |

TABLE 21-continued

| | Detergent Composition | | |
|---|---|---|---|
| | A (Present invention) | B (Present invention) | C (Comparative example) |
| Inorganic ion exchange material 102 | 30 | | |
| Inorganic ion exchange material 107 | | 30 | |
| Water | 3 | 3 | 3 |
| Deterging Rate (%) for | | | |
| cloth stained with sebum | 72.1 | 73.0 | 58.1 |
| cloth stained with mud and dirt | 69.5 | 69.8 | 56.2 |

TABLE 22

| | Detergent Composition | | | |
|---|---|---|---|---|
| | D | E | F | G |
| Polyoxyethylene dodecyl ether (EOP = 8) | 25 | 25 | 25 | 25 |
| Tallow soap | 1 | 1 | 1 | 1 |
| Sodium carbonate | 5 | 5 | 26 | 26 |
| Amorphous silica (TOKUSIL ™) | 15 | 15 | 15 | 15 |
| Zeolite 4A | 5 | 3 | 30 | 15 |
| Trisodium citrate.2H$_2$O | | 2 | | 15 |
| Inorganic ion exchange material 101 | 26 | | | |
| Inorganic ion exchange material 102 | | 26 | | |
| Water | 3 | 3 | 3 | 3 |
| Total | 80 | 80 | 100 | 100 |
| pH before washing | 10.7 | 10.6 | 10.6 | 10.6 |
| pH after washing | 10.4 | 10.4 | 10.4 | 10.4 |
| Deterging Rate (%) for cloth stained with sebum | 72.3 | 72.5 | 72.0 | 72.4 |

Note: To clearly distinguish the difference in composition ratios from Detergent Compositions F and G, whose total amounts are 100 parts by weight, the total amounts of Detergent Compositiotns D and E are 80 parts by weight.

Similarly, detergent compositions having compositions shown in Table 23 are prepared, wherein Detergent Compositions H and I are the present invention products containing the inorganic ion exchange materials of the present invention, and Detergent Composition J is a comparative product containing comparative ion exchange material powder. Here, a dry powder is obtained by preparing an aqueous slurry containing components other than the inorganic ion exchange material at 60° C., and then drying the obtained aqueous slurry using a spray-drying machine. The obtained dry powder is placed in a centrifugal tumbling granulator (high-speed mixer), and a small amount of water is added thereto and granulated to yield powdery detergent composition of an average grain size of 396 to 418 μm.

TABLE 23

| | Detergent Composition | | |
|---|---|---|---|
| | H (Present invention) | I (Present invention) | J (Comparative example) |
| LAS-Na (C = 12.2) | 26 | 26 | 26 |
| AS-Na (C = 14) | | 6 | 6 |
| α-SFE-Na (C = 16) | 3 | | |
| AOS-NA (C = 12~16) | 3 | | |
| JIS No. 2 sodium silicate | 5 | 5 | 5 |
| Sodium carbonate | 6 | 6 | 6 |
| Sodium sulfate | Bal. | Bal. | Bal. |
| Polyethylene glycol (MW = 10000) | 2 | 2 | 2 |
| Water | 5 | 5 | 5 |
| Inorganic ion exchange material 102 | 30 | | |
| Inorganic ion exchange material 107 | | 30 | |
| Comparative ion exchange material powder 6 | | | 30 |
| Deterging Rate (%) for | | | |
| cloth stained with sebum | 72.5 | 73.0 | 65.1 |
| cloth stained with mud and dirt | 70.6 | 70.9 | 64.2 |

Test Example 13

Detergent Compositions A through J obtained in the above-described Preparation Example of Detergent Compositions are used to carry out a deterging test by the following methods:

(1) Mud and dirt Stained Clothes (Artificially Stained Clothes):

"Kanuma sekigyoku soil" for horticultural use is dried at 120° C.±5° C. for 4 hours and then finely pulverized. 150 mesh (100 μm)-passed soil particles are dried at 120° C.±5° C. for 2 hours. 150 g of the soil is dispersed in 1000 liters of tetrachloroethylene. A calico #2023 cloth is contacted with the dispersion and brushed. After removal of the dispersion, excessively adhered stain is removed (Japanese Patent Laid-Open No. 55-26473).

(2) Sebum/Carbon Dirt Stained Clothes (Artificially Stained Clothes):

(Model Sebum/Carbon Dirt Composition)

| | |
|---|---|
| Carbon black | 15% |
| Cotton seed oil | 60% |
| Cholesterol | 5% |
| Oleic acid | 5% |
| Palmitic acid | 5% |
| Liquid paraffin | 10% |

1 kg of the above-described composition is dissolved and dispersed in 80 liters of tetrachloroethylene. A calico #2023 cloth is immersed therein to adhere the stains, and tetrachloroethylene is removed by drying.

(3) Deterging Conditions

To 1 liter of aqueous solution of detergents for evaluation, five 10 cm×10 cm pieces each of mud-dirt stained cotton clothe and sebum/carbon dirt stained cotton cloth are placed therein, and they are washed using a turgometer at 100 rpm under the following deterging conditions:

(Deterging Conditions)

| | |
|---|---|
| Deterging Time | 10 minutes |
| Concentration of Detergent | 0.133% |
| Hardness of Water | 40 |
| Water Temperature | 20° C. |
| Rinsing | In tap water for 5 minutes |

(4) Evaluation Method of Deterging Test

Reflectivities of the original cloth before staining and those of the stained cloth before and after the washing are measured at 460 nm by means of an automatic recording colorimeter (manufactured by Shimadzu Corporation), and the deterging rate (%) is calculated by the following equation.

$$\text{Deterging Rate (\%)} = \frac{\text{Reflectivity after washing} - \text{Reflectivity before washing}}{\text{Reflectivity of the original cloth} - \text{Reflectivity before washing}} \times 100$$

The obtained results are shown in the bottom column of Tables 21 through 23. It has been confirmed that excellent washing performance can be achieved by using the detergent compositions of the present invention. Since the inorganic ion exchange material of the present invention has a high alkaline capacity as well as a high ion exchange capacity, it can exhibit a high washing performance even if the amount of alkalinity adjusting agent such as sodium carbonate is greatly reduced.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synthesized crystalline ion exchange material having a chain structure and comprising a composition represented by the following general formula (A) in an anhydride form:

$$xM_2O \cdot ySiO_2 \cdot zM'O, \quad (A)$$

wherein M represents Na and/or K; M' represents Ca and/or Mg; y/x is 0.5 to 2.0; and z/x is 0.005 to 1.0, said chain structure exhibiting at least one main scattering peak at $970 \pm 20$ cm$^{-1}$ in Raman spectra.

2. The synthesized crystalline ion exchange material according to claim 1, wherein a single main scattering peak in Raman spectra is present at $970 \pm 20$ cm$^{-1}$.

3. The synthesized crystalline ion exchange material according to claim 1, wherein two main scattering peaks in Raman spectra are present at both $970 \pm 20$ cm$^{-1}$ and $1070 \pm 30$ cm$^{-1}$.

4. The synthesized crystalline ion exchange material according to claim 3, wherein the ratio of a peak height at $970 \pm 20$ cm$^{-1}$ to a peak height at $1070 \pm 30$ cm$^{-1}$ is 0.1 to 100.

5. The synthesized crystalline ion exchange material according to claim 1, wherein the synthesized crystalline ion exchange material has a cationic exchange capacity of 200 to 600 mg CaCO$_3$/g.

6. The synthesized crystalline ion exchange material according to claim 1, wherein the amount of Si dissolved in water is not more than 120 mg/g, when calculated as SiO$_2$.

7. A hydrate of the synthesized crystalline ion exchange material of any one of claims 1 to 6.

8. A detergent composition containing the synthesized crystalline ion exchange material of claim 1 and/or a hydrate thereof, and a surfactant.

9. The detergent composition according to claim 8, wherein said surfactant is nonionic.

10. The detergent composition according to claim 9, comprising:
   (a) 12 to 50% by weight of the nonionic surfactant;
   (b) 0.5 to 70% by weight of the synthesized crystalline ion exchange material and/or the hydrate thereof; and
   (c) 5 to 30% by weight of a porous oil-absorbing carrier having an oil-absorbing capacity of not less than 80 ml/100 g.

11. The detergent composition according to claim 8, further containing a polymer or a copolymer having a repeating unit represented by the following formula:

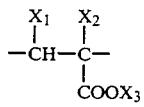

wherein X$_1$ represents methyl group, hydrogen atom or COOX$_3$ group; X$_2$ represents methyl group, hydrogen atom or hydroxyl Group; and X$_3$ represents hydrogen atom, an alkali metal element, an alkaline earth metal element, NH$_4$ group or ethanolamine group.

12. The detergent composition according to claim 8, further containing 0.5 to 40% by weight of an oxygen-based bleaching agent.

13. The detergent composition according to claim 12, wherein said oxygen-based bleaching agent is at least one member selected from the group consisting of sodium percarbonate, sodium perborate monohydrate and sodium perborate tetrahydrate.

14. The detergent composition according to claim 12 or 13, further containing a bleaching activator which is at least one member selected from the group consisting of:
   (A) An organic peracid precursor which produces an organic peracid having an N+ group upon reaction with hydrogen peroxide;
   (B) An organic peracid precursor which produces an organic peracid upon reaction with hydrogen peroxide wherein the leaving group is phenolsulfonic acid or a salt thereof; and
   (C) An organic peracid precursor which produces a peracetic acid upon reaction with hydrogen peroxide.

15. The detergent composition according to claim 8, further containing an enzyme.

16. The detergent composition according to claim 8, wherein the surfactant is present in an amount of 1 to 60% by weight, based on the whole composition.

17. The synthesized crystalline ion exchange material according to claim 1, wherein y/x is 1.0 to 1.8 and z/x is 0.01 to 0.9.

18. The synthesized crystalline ion exchange material according to claim 1, wherein y/x is 1.0 to 1.8 and z/x is 0.01 to 0.58.

19. The synthesized crystalline ion exchange material according to claim 2, wherein y/x is 1.0 to 1.8 and z/x is 0.01 to 0.9.

20. The synthesized crystalline ion exchange material according to claim 2, wherein y/x is 1.0 to 1.8 and z/x is 0.01 to 0.58.

21. The detergent composition according to claim 8, wherein in said synthesized crystalline ion exchange material the ratio of y/x is 1.0 to 1.8 and z/x is 0.01 to 0.9.

22. The detergent composition according to claim 8, wherein in said synthesized crystalline ion exchange material the ratio of y/x is 1.0 to 1.8 and z/x is 0.01 to 0.58.

23. A synthesized crystalline ion exchange material comprising a composition represented by the following general formula (A') in anhydride form:

$$xM_2O \cdot ySiO_2 \cdot zM'O, \qquad (A')$$

wherein M represents Na and/or K; M' represents Ca and/or Mg; y/x is 1.4 to 1.9; z/x is 0.005 to 1.0; K/Na in $M_2O$ is 0 to 8.0; and Mg/Ca in M'O is 0 to 10, wherein said synthesized crystalline ion exchange material exhibits an X-ray diffraction pattern such that the intensity ratio of a peak corresponding to $d=2.84\pm0.05$ Å to a peak corresponding to $d=4.00\pm0.05$ Å is 10/100 to 100/10, d being calculated from the equation $2d.\sin\theta = n\gamma$, wherein n is equal to 1, and $\gamma$ is 1.54 Å, the characteristic X-ray wavelength of $CuK\alpha$.

24. The synthesized crystalline ion exchange material according to claim 23, wherein the synthesized crystalline ion exchange material exhibits main scattering peaks at $968\pm6$ cm$^{-1}$ and $1058\pm6$ cm$^{-1}$, or at $968\pm6$ cm$^{-1}$, $1058\pm6$ cm$^{-1}$ and $1078\pm6$ cm$^{-1}$ in Raman spectra in the range of from 900 to 1200 cm$^{-1}$.

25. The synthesized crystalline ion exchange material according to claim 24, wherein said synthesized crystalline ion exchange material has an intensity ratio of the scattering peak at $968\pm6$ cm$^{-1}$ to the scattering peak at $1058\pm6$ cm$^{-1}$ of 0.05 to 100, or has two intensity ratios, wherein one intensity ratio of the scattering peak at $968\pm6$ cm$^{-1}$ to the scattering peak at $1058\pm6$ cm$^{-1}$ is 0.05 to 100, and the other intensity ratio of the scattering peak at $1078\pm6$ cm$^{-1}$ to the scattering peak at $1058\pm6$ cm$^{-1}$ is 0.05 to 200.

26. The synthesized crystalline ion exchange material according to any one of claims 23 to 25, wherein the cationic exchanging capacity of the synthesized crystalline ion exchange material is 250 to 600 mg $CaCO_3$/g.

27. A hydrate containing the synthesized crystalline ion exchange material of any one of claims 23 to 26.

28. A detergent composition containing the synthesized crystalline ion exchange material according to any one of claims 23 to 27.

* * * * *

UNITED STATES PATENT AND TRADEMARK OFFICE
CERTIFICATE OF CORRECTION

PATENT NO. : 5,427,711
DATED : June 27, 1995
INVENTOR(S) : Sakaguchi et al

It is certified that error appears in the above-indentified patent and that said Letters Patent is hereby corrected as shown below:

In column 4, line 41, change "$Q_1$ and $Q_2$" to --$Q_2$ and $Q_3$--.

Signed and Sealed this

Twelfth Day of March, 1996

Attest:

BRUCE LEHMAN

*Attesting Officer*  *Commissioner of Patents and Trademarks*